(12) United States Patent
Sameshima et al.

(10) Patent No.: US 6,619,943 B1
(45) Date of Patent: Sep. 16, 2003

(54) IN-MOLD FOAM MOLDING APPARATUS WITH MOVABLE PARTITIONING MEMBERS

(75) Inventors: Masahiko Sameshima, Settsu (JP); Yoshiyuki Kobayashi, Kitakatsuragi-gun (JP); Kenji Yamaguchi, Mishima-gun (JP)

(73) Assignee: Kaneka Corporation, Osaka (JP)

( * ) Notice: Subject to any disclaimer, the term of this patent is extended or adjusted under 35 U.S.C. 154(b) by 56 days.

(21) Appl. No.: 09/671,582

(22) Filed: Sep. 28, 2000

(30) Foreign Application Priority Data

| Sep. 29, 1999 | (JP) | 11-277440 |
| Nov. 17, 1999 | (JP) | 11-327512 |
| Nov. 17, 1999 | (JP) | 11-327513 |
| Nov. 29, 1999 | (JP) | 11-337091 |

(51) Int. Cl.⁷ .............................................. B29C 44/04
(52) U.S. Cl. ............... 425/130; 425/185; 425/186; 425/192 R; 425/588; 425/DIG. 247; 425/817 R
(58) Field of Search .......................... 425/4 R, 817 R, 425/130, 185, 186, 190, 192 R, 556, 588, 444, DIG. 247

(56) References Cited

U.S. PATENT DOCUMENTS

| 3,423,490 A | * | 1/1969 | Trogdon et al. | 264/245 |
| 4,608,213 A | * | 8/1986 | Kurumizawa et al. | 249/129 |
| 4,734,230 A | * | 3/1988 | Rhodes et al. | 264/250 |
| 5,164,257 A | * | 11/1992 | Haardt et al. | 428/310.5 |

FOREIGN PATENT DOCUMENTS

| JP | S54-060366 | 5/1979 |
| JP | S57-174223 | 10/1982 |
| JP | H10-193375 | 8/1998 |

* cited by examiner

Primary Examiner—Robert Davis
Assistant Examiner—Joseph S Del Sole
(74) Attorney, Agent, or Firm—Armstrong, Westerman & Hattori, LLP

(57) ABSTRACT

There is provided an in-mold foam molding apparatus affording a significantly simpler design for a molding apparatus capable of molding molded portions comprising bead starting materials having different properties into a unitary molded article, and effectively preventing various drawbacks associated with the provision of partitioning members; and an in-mold foam molded article devoid of flash projecting from its visible surfaces. There are provided partitioning members (32), (40) for partitioning into a plurality of partitioned mold chambers a mold cavity (13) defined by a core mold (11) and a cavity mold (12), these partitioning members (32), (40) being arranged such that at least a portion of the plurality of partitioned molding sections (11*a*), (11*b*) constituting the partitioned mold chambers within the core mold (11) are unitary, and filling units are provided to each partitioned mold chamber for filling thereof with a bead starting material, adjacent partitioned mold chambers being fillable with bead starting materials of different properties.

21 Claims, 33 Drawing Sheets

FIG.2
(a)
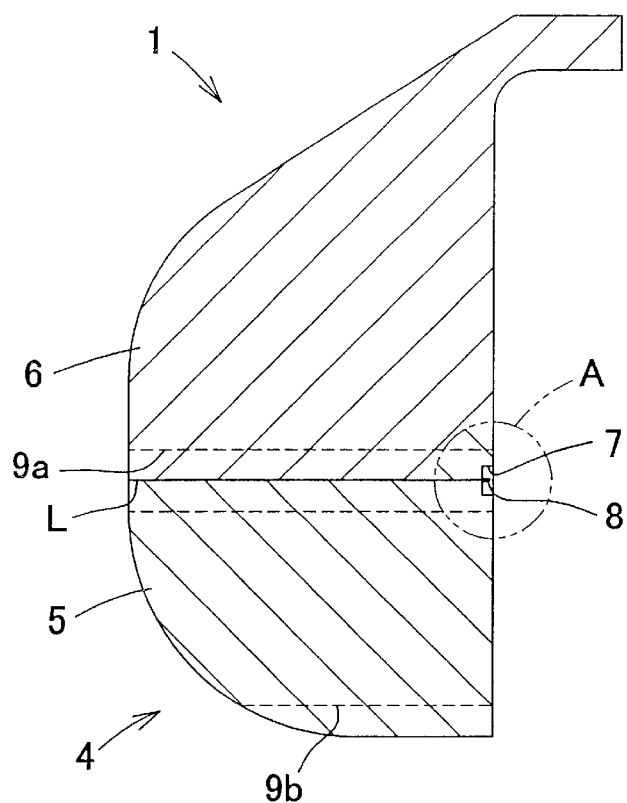
(b)
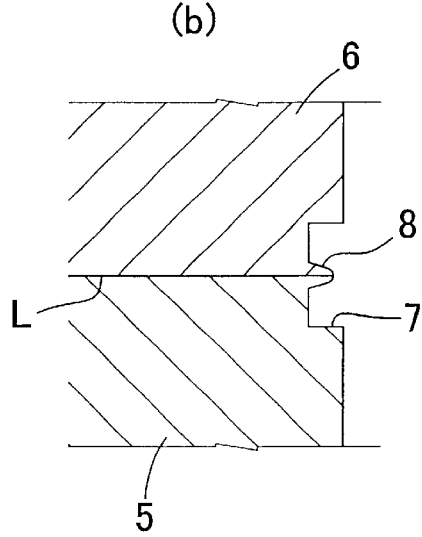

FIG.7
(a)
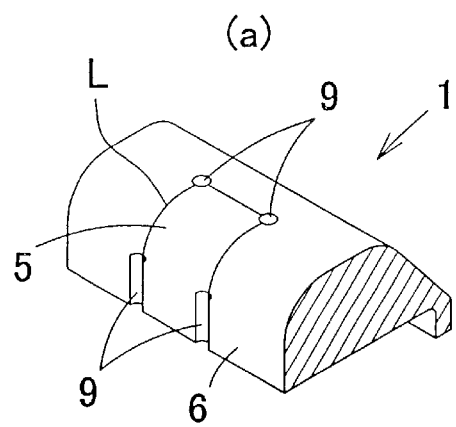
(b)
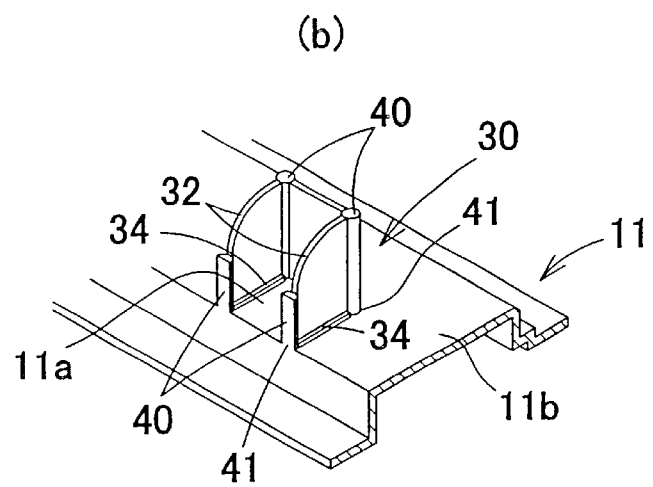
(c)
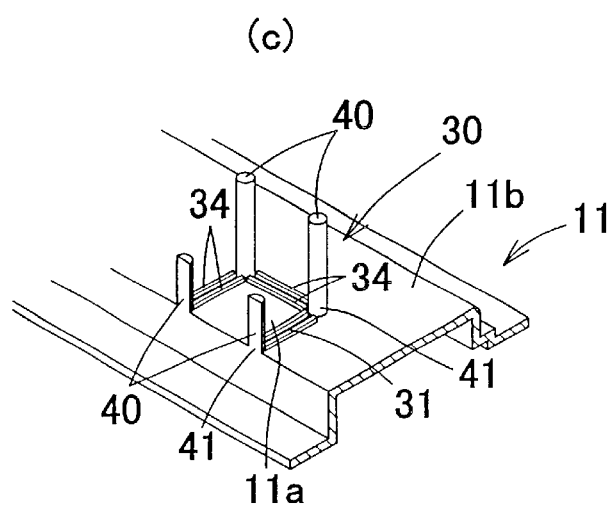

FIG.10
(a)
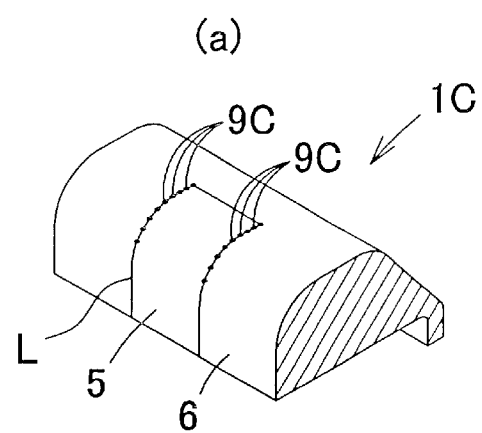
(b)
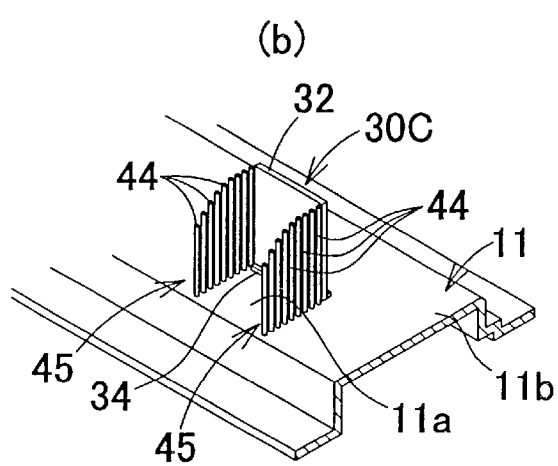
(c)
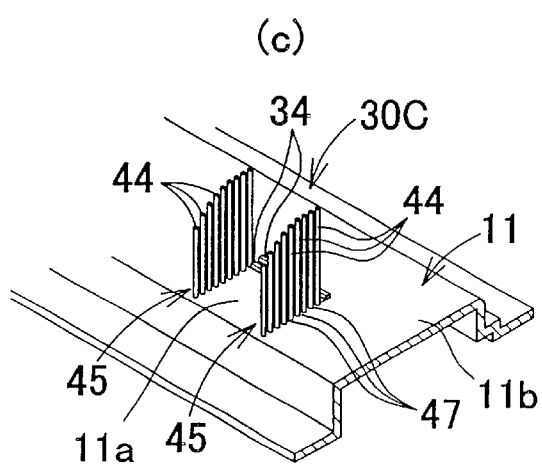

FIG.11
(a)
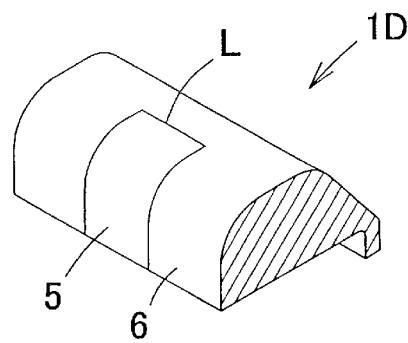
(b)
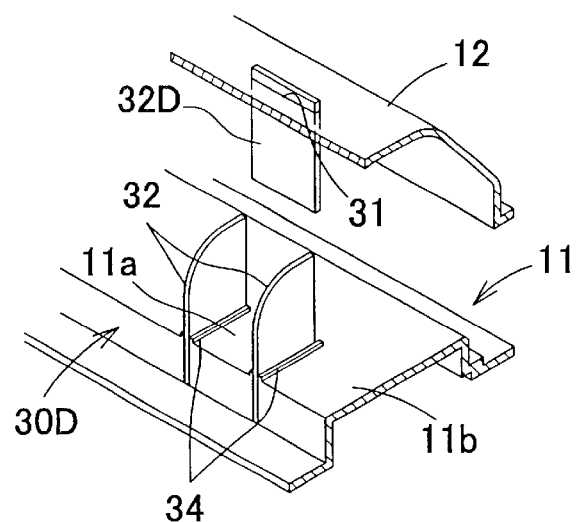
(c)
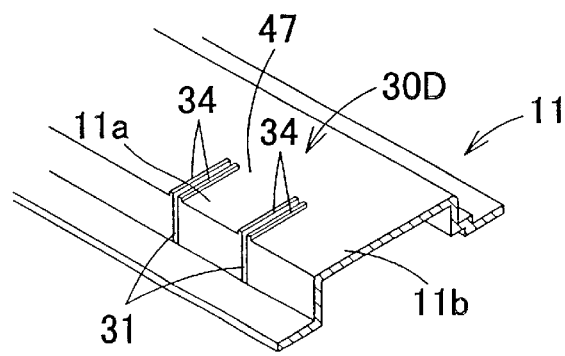

FIG.13
(a)
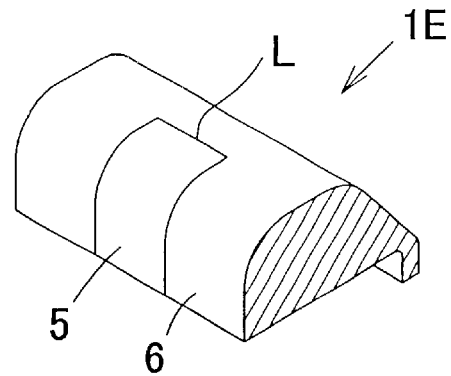
(b)
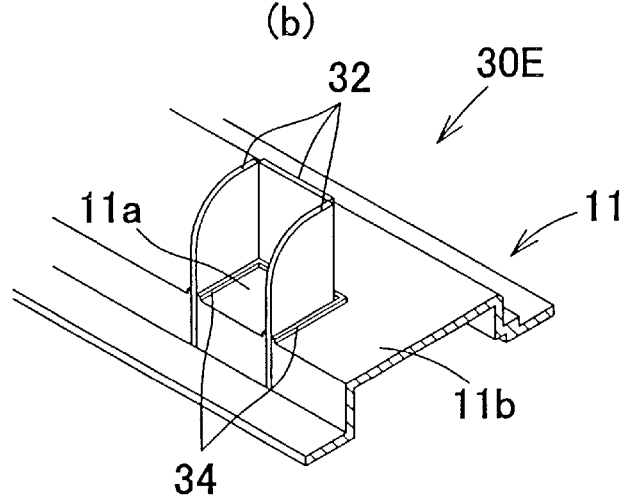
(c)
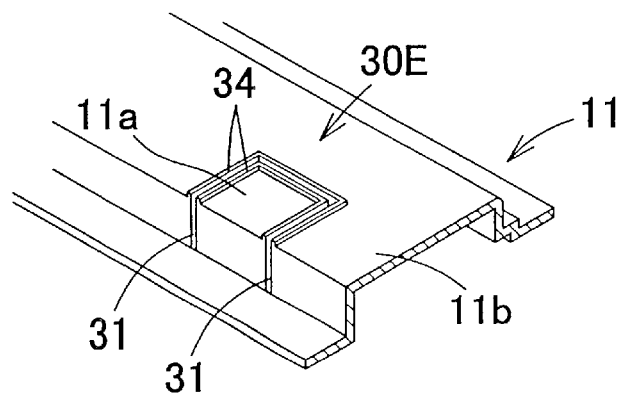

FIG.23
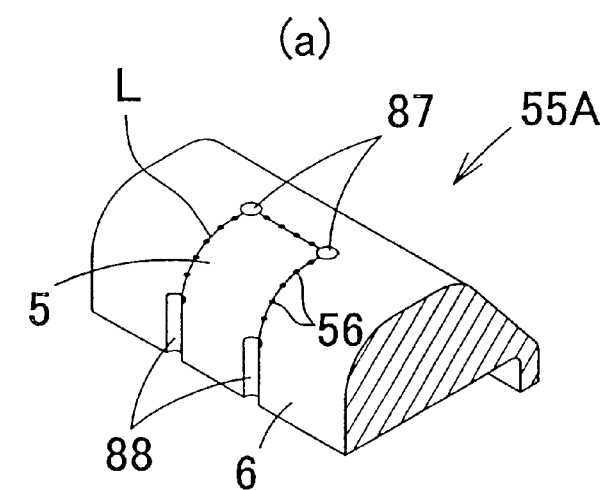
(a)
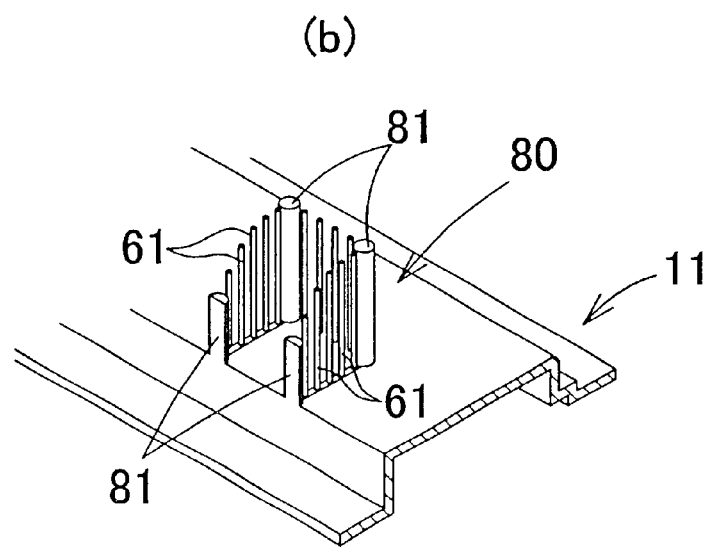
(b)

FIG.24
(a)
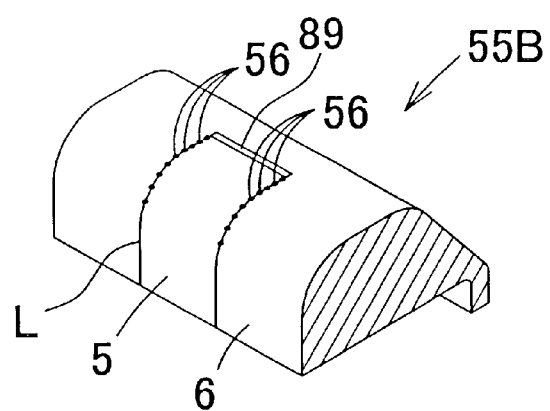
(b)
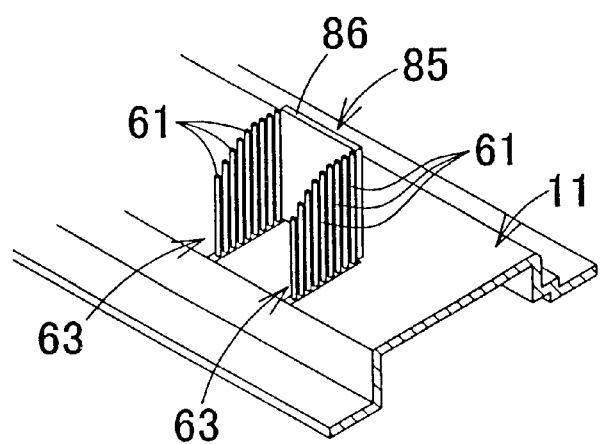

FIG.34
(a)
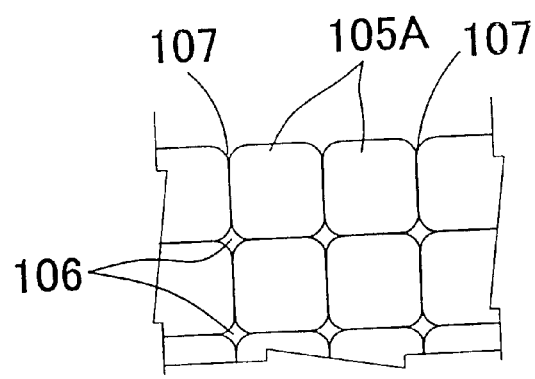
(b)
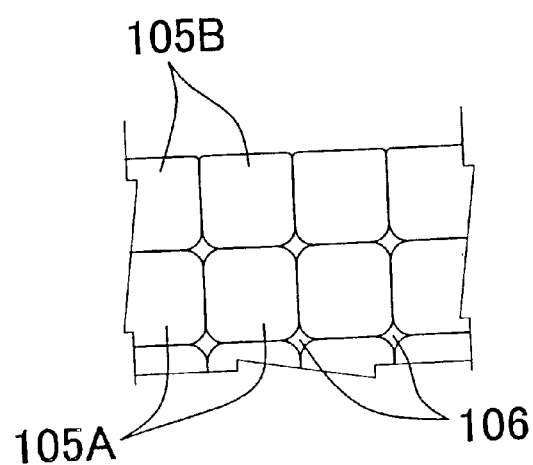

FIG.38
PRIOR ART
(a)
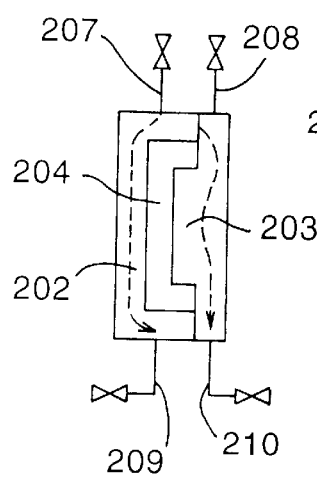
(b)
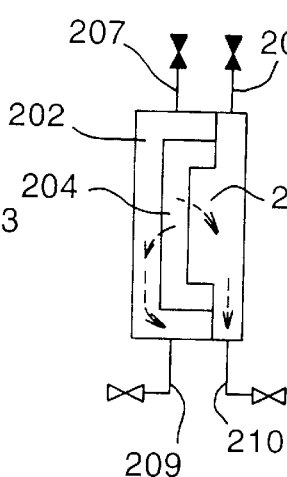
(c)
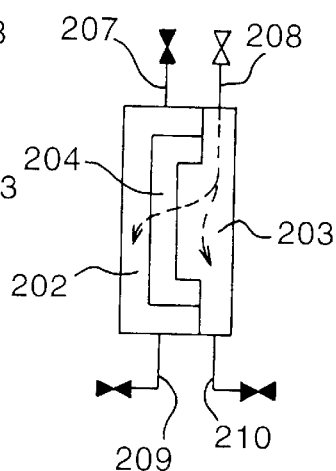
(d)
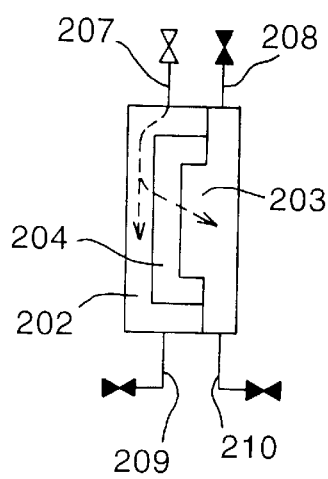
(e)
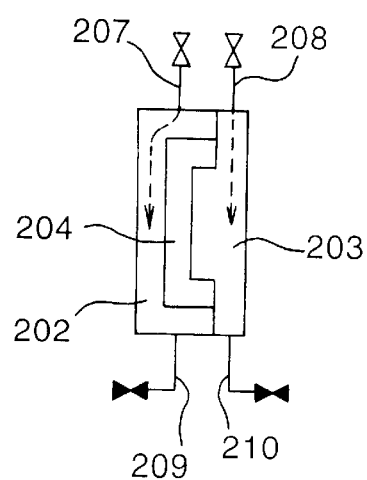

IN-MOLD FOAM MOLDING APPARATUS WITH MOVABLE PARTITIONING MEMBERS

BACKGROUND OF THE INVENTION

1. Field of the Invention

The present invention relates to an in-mold foam molding apparatus and method suitable for molding into a unitary molding molded portions comprising bead starting materials having different properties, and to in-mold foam molded articles.

2. Description of the Related Art

An in-mold foam molding apparatus for fabricating moldings from bead starting materials consisting of thermoplastic synthetic resin is taught, for example, in U.S. Pat. No. 5,164,257, which discloses an in-mold foam molding technique wherein the mold is provided with moveable partitioning members that are retractable from the mold cavity via actuators such as air cylinders, the mold cavity being partitioned into a plurality of partitioned mold chambers by means of these moveable partitioning members, with filling devices for supplying bead starting materials to the individual partitioned mold chambers being connected therewith individually, whereby with the mold cavity partitioned by the moveable partitioning members, adjacent partitioned mold chambers can be filled with bead starting materials having, for example, different degrees of expansion, and once so filled the moveable partitioning members can be retracted and steam supplied to the interior of the mold cavity in order to heat and weld the bead starting materials into a molded article.

In molded articles molded by means of this in-mold foam molding technique, by varying the bead starting materials used for different regions of a molded article it is possible to fabricate a molded article having, for example, different mechanical properties in different regions thereof. This has the advantage of being able to improve functionality and quality in molded articles, which are used as cores for car bumpers and cushioning materials for packaging of household electronics, furniture, and the like.

In the in-mold foam molding apparatus disclosed in the cited U.S. publication, it is necessary to provide actuators for retracting the partitioning members, and thus a larger number of partitioned mold chambers will require a correspondingly complicated drive system for the partitioning members, resulting in the problem of higher fabrication costs for the in-mold foam molding apparatus.

Further, if filling compression in adjacent partitioned mold chambers is not controlled in such a way as prevent pressure differentials from forming, there is a risk of a partitioning member deforming due to the pressure differential. Another problem is that the flow of air used for filling is obstructed by the partitioning members, depressing ease with which the mold may be filled with the bead starting materials.

In this in-mold foam molding apparatus, since passage orifices are formed in the mold so that the partitioning members may be retracted through these passage orifices, there is the additional problem that flash forms on the surface of the molded article around these passage orifices for the following two reasons.

(1) Reason 1

In order to prevent the bead starting materials from infiltrating, the wall of the passage orifice and the partitioning member will ideally be designed with as narrow a gap as possible therebetween, but this arrangement creates the problem of deformation or breakage of a partitioning member or inability to retract a partitioning member due to contact with the inside wall of a passage orifice resulting from expansion or contraction of the mold. Specifically, the mold expands when the bead starting materials are steam heated and contracts during cooling with cooling water. Where passage orifices like those described earlier are provided, mold strength is lower in the portions bordering the passage orifices, so strain in the mold becomes concentrated at the passage orifices, and is compensated for by expansion and contraction of the width of the apertures of the passage orifices. Where the passage orifices are of "L" or "C" configuration, lower mold strength in a specific direction will result in shape deformation of passage orifices. Expansion/contraction or deformation of passage orifices may result in deformation or breakage of a partitioning member through contact with the inside wall of a passage orifice. Where the mold is split into a plurality of molding sections by the passage orifices with the plurality of molding sections being fixed by means of screws or the like to an attachment plate, it will be a simple matter to form passage orifices in the mold, but expansion or contraction of the mold will result in shifting of the locations at which the mold segments are attached to the attachment plate, so that there will be significant deviation in the width of the passage orifice apertures. This phenomenon becomes more pronounced with larger mold dimensions or longer passage orifices, and represents a significant problem for in-mold foam molding apparatuses equipped with partitioning members. For such reasons, the partitioning member and the wall of the passage orifice are designed with a large gap therebetween, notwithstanding the fact that it is recognized that flash will form on the surface of the molded article around the passage orifices.

(2) Reason 2

Partitioning member distal edge shape is designed to conform to the shape of the inside surface of the mold, but as shape is not always the same as that of the inside surface of a mold provided with passage orifices, it may occur that when a partitioning member is retracted after filling the mold with bead starting materials, the partitioning member recesses partway into its passage orifice so that th e interior of the passage orifice communicates with the mold cavity. Since the width of the passage orifice apertures is designed to be smaller than the diameter of the bead starting materials in order to prevent bead starting materials from infiltrating into passage orifices, merely retracting the partitioning members will not result i n bead starting materials infiltrating into passage orifices, but when the bead starting materials are heated and welded by delivering steam to the mold cavity, softening and expansion of the bead starting materials may result in partial infiltration into passage orifices, producing long, thin flash projecting out at locations on the molded article corresponding to the locations of passage orifices.

Flash is not a particular problem for molded articles of which only rough dimensional accuracy on the surface is required, but represents a product defect for molded articles subject to strict requirements. For example, in car bumpers, it is common practice to affix an in-mold foam molded core to the front face of front beam of the car, and to then arrange a synthetic resin cover member so as to cover the core. With car bumpers of this type, flash must be removed from the core after molding in order to prevent problems such as inability to secure the core to the proper location on the mounting face of the front beam or inability to secure the cover member at the proper location on the vehicle body due to the presence of a gap between core and front beam or core and cover member.

Japanese Unexamined Patent Application H10-193375 discloses a molding apparatus for molding foam molded articles that have molded sections consisting of bead starting materials of different properties and that can be used as shock absorbent materials, the apparatus provided with fixed partitioning members situated at the boundaries of adjacent partitioned mold chambers, with these partitioning members defining spaces wherein the bead starting materials are fused. This molding apparatus is designed such that slits are formed in the molded article by the partitioning members, whereby the molded article can be split at the slits into smaller pieces by hand, thereby facilitating disposal or recycling of the molded article after use. However, the design of the molding apparatus disclosed in this publication is provided with these partitioning members situated along certain portions of the boundaries between adjacent partitioned mold chambers, in order to form slits in the molded article, and while the specifics of the partitioning arrangement for the other portions of the boundaries is not disclosed, it may be surmised that partitioning thereof is accomplished by means of partitioning members that are retractable from the mold, since fusion of the bead starting materials overall can be visually confirmed.

An in-mold foam molding apparatus of typical configuration for producing molded article from bead starting materials comprising thermoplastic synthetic resin is depicted in FIG. 35, wherein a set of opposing molds 200, 201 is provided, the two molds 200, 201 having chambers 202, 203 formed on their respective back faces and the two molds 200, 201 having respectively formed therein a multitude of air orifices 205, 206 whereby chambers 202, 203 communicate with a mold cavity 204 so that a service fluid, such as steam, may be delivered to molding cavity 204 via air orifices 205, 206 or vented from molding cavity 204. In this example, respective chambers 202, 203 are provided in the top portions thereof with top service orifices 207, 208 for delivering as heating steam or the like, and in the bottom portions thereof with bottom service orifices 209, 210 connecting to a vacuum pump or drain pipe so that steam may delivered to molding cavity 204.

In actual practice, as shown in FIGS. 36 and 37, the multitude of air orifices 205, 206 extending through molds 200, 201 are composed of core vents 211—capped tubular elements having an outside diameter of 7–12 mm and perforated by a plurality of air orifices 205, 206 comprising round orifices about 0.5 mm in diameter or slits about 0.5 mm wide—which fit within core vent mounting orifices 212 provided to molds 200, 201; and core vent holes 213 about 0.5 mm in diameter formed directly in molds 200, 201. Air orifices 205, 206 are arranged at 20–50 mm pitch on molds 200, 201.

In an in-mold foam molding apparatus of this kind, pre-expanded bead starting materials are packed into mold cavity 204, heated with steam to bring about expansion and fusion thereof, and then cooled and hardened to give a foam molded article of the desired configuration. The function of air orifices 205, 206 during foam molding is discussed further.

Japanese Unexamined Patent Application S57-174223 discloses a process diagram like that shown in FIG. 38 wherein (a) to (e) depict a preheating/evacuation process for replacing air in the mold and air between bead starting materials with steam, the specifics being described hereinbelow. In the drawing, solid black valve symbols indicate the closed state and white valve symbols indicate the open state.

(a) is an evacuation step wherein once the bead starting materials have been packed into the mold cavity 204 steam is delivered for a very brief period to chambers 202, 203 via top service orifices 207, 208, and air in the mold interior, and particularly in chambers 202, 203, is suctioned and evacuated therefrom via bottom service orifices 209, 210 to evacuate the interior. Here, chambers 202, 203 are brought to positive pressure by the steam, and steam penetrates between the bead starting materials via air orifices 205, 206.

(b) is a two-end evacuation step wherein top service orifices 207, 208 are closed while continuing the suction evacuation procedure to lower the pressure within the mold, whereby any air present between the bead starting materials is suctioned and evacuated via air orifices 205, 206 provided to both ends of the mold.

(c) is a one-sided preheating step wherein bottom service orifices 209, 210 are closed and steam is delivered for a brief period via the top service orifice 208 of one of the depressurized chambers 203. The supplied steam flows from air orifice 206 of mold 201, through the bead starting materials in mold cavity 204, and through air orifice 205 of mold 200 to reach chamber 202 on the opposite side, thereby heating the bead starting materials and all areas of molds 200, 201.

(d) is a one-sided preheating step wherein the direction of steam flow is reversed, wherein an analogous procedure is conducted, but from the chamber 202 side, whereby air present within mold cavity 204 is completely expelled and preheating is conducted while minimizing localized temperature differentials between the two molds 200, 201.

(e) is a fusing/heating step wherein steam for fusing/heating is supplied to both chambers 202, 203, thereby heating the molds 200, 201 and also heating the bead starting materials via the air orifices 205, 206 of the respective molds 200, 201 in order to complete expansion and fuse the beads together to produce a foam molded article.

The air orifices 205, 206 provided to molds 200, 201 function as passages for evacuating air present between the bead starting materials and as passages for delivering steam, and as such serve an important function in terms of producing a homogeneous foam molded article. On the other hand, the following problems have been noted.

(1) To compensate for lower mold strength resulting from the mold being perforated by a multitude of air orifices, mold wall thickness in molds consisting of aluminum alloys must be on the order of 8–12 mm, for example. However, this has the effect of increasing the heat capacity of the mold, lowering heat efficiency during heating/cooling so that the rate of temperature rise and temperature drop are slower, reducing the precision of control.

(2) Typically, a pair of molds is provided with some 2000 to 4000 air orifices, so the process of making the orifices is complicated and results in higher fabrication costs. Since the core vents are installed by hand in mounting orifices provided in the mold, the operation is quite complicated and damage to mold surfaces is unavoidable, thus requiring retouching.

(3) Since clogging of air orifices (core vents, core vent holes, etc.) by scale or the like can result in heating defects, mold release defects, or cooling defects, the core vents must be replaced or periodically subjected to high pressure washing or other maintenance procedure.

(4) Since air orifices leave marks on foam molded article surfaces, the visual appeal of molded articles suffers, and when the exterior surface is subjected to printing or the like, air orifice marks may impair printing.

(5) Since the foam molded article is cooled by spraying cooling water into the chamber after molding, water infiltrates into the molding cavity through the air orifices, resulting in water content of about 6–10% in the molded article, necessitating a drying process. Further, since cooling water comes into direct contact with the molded article, pure cooling water must be used in order to produce sanitary molded articles.

(6) As steam is passed from the chamber into the mold cavity to heat the bead starting materials under the same heating conditions in order to effect expansion/fusion thereof, molded articles produced in this way (hereinbelow referred to as isothermal molded articles) develop varying surface qualities depending upon the extent of fusion of the beads. Specifically, lower fusion rates are associated with poor surface qualities, whereas higher fusion rates associated with good surface qualities. For isothermal molded articles, higher bead fusion rates improve physical properties such as the mechanical strength of the molded article, but require longer heating, expansion/fusion times and cooling times, creating the problem of longer molding cycle times overall and reduced throughput.

For such reasons, in the molding technique described earlier, bead fusion rates are typically set to 40%–80%, for example, in order to assure good surface qualities and attractive appearance as well as assuring a fusion rate adequate to assure mechanical strength. However, even where mechanical strength requirements for a molded article are not particularly stringent, the need to assure an attractive appearance requires a moderately high fusion rate, which will result in a correspondingly longer molding cycle time and reduced throughput. Fusion rate as used herein is ascertained by splitting the molded article and observing the condition of the beads on the sectional face, specifically, by measuring the proportion of beads experiencing breakdown of the bead per se, deeming beads having cracking along the bead surface but without bursting of the bead per se to be unfused and deeming beads experiencing bursting of the bead per se into fragments to be fused.

The foam molding process described hereinabove is designed such that air orifices such as core vents and core vent holes are used to deliver steam, air, or other service fluids to the mold cavity or to evacuate same from the mold cavity during production of foam molded articles. However, as noted, the provision of air orifices creates number of problems.

With the goal of providing a fundamental solution to these problems, the inventors conducted extensive research concerning development of a foam molding process employing molds devoid of air orifices, and conducted tests of various kinds. While the goal is a mold "devoid of air orifices," it is of course necessary to provide, in lieu of core vents and core vent holes, passages for delivering/evacuating steam, air, or other service fluids to and from the mold cavity, which gives rise to the issue of where and how to form same, of the timing and conditions that should be employed in delivering service fluids to such passages, and a host of other issues that need to be addressed.

SUMMARY OF THE INVENTION

It is an object of invention to provide: a significantly simplified design for a molding apparatus capable of molding into a unitary molding molded portions comprising bead starting materials having different properties; an in-mold foam molding apparatus and method that obviate the various difficulties associated with the use of partitioning members; and an in-mold foam molded article devoid of flash protruding outwardly from the visible surfaces thereof.

In-mold Foam Molding Apparatus

The in-mold foam molding apparatus which pertains to the present invention comprises: a plurality of partitioning members for dividing into a plurality of partitioned mold chambers a mold cavity defined by a core mold and a cavity mold, at least some of the plurality of partitioned molding sections constituting the partitioned mold chambers within the mold being unitary; and filling devices for filling the partitioned mold chambers with bead starting materials, whereby adjacent partitioned mold chambers can be filled with bead starting materials having different properties.

In this in-mold foam molding apparatus, with the mold cavity partitioned into a plurality of partitioned mold chambers by partitioning members, adjacent partitioned mold chambers can be filled with bead starting materials having different properties, allowing the functionality and quality of molded articles to be improved through appropriate selection of partitioned mold chamber molding location and size, the properties of the bead starting materials packed therein, and so on. For example, bead starting materials with a low degree of expansion may be used in regions requiring strength so as to increase the strength/rigidity of the molded article, while bead starting materials with a high degree of expansion may be used in other regions in order to reduce the weight of the molded article, so as to impart both improved strength and reduced weight to the molded article.

Further, since at least some of the plurality of partitioned molding sections constituting the partitioned mold chambers within the mold are unitary, relative motion of adjacent partitioned molding sections due to mold expansion or contraction is prevented, improving the precision of molding.

Partitioning members include fixed partitioning members provided in fixed fashion to the mold, and moveable partitioning members retractably provided to the mold. In-mold foam molding apparatuses can be broadly classified into three types: those equipped with both fixed partitioning members and moveable partitioning members; those equipped with moveable partitioning members only; and those equipped with fixed partitioning members only.

First Type:

In-mold foam molding apparatus equipped with both fixed partitioning members and moveable partitioning members.

In this type of in-mold foam molding apparatus, the mold cavity is dividable into a plurality of partitioned mold chambers by means of moveable partitioning members extendable and retractable into and from the mold cavity through the core mold or cavity mold, and fixed partitioning members unitary with the core mold or cavity mold. Partitioned molding segments defined by the partitioned mold chambers within in the mold equipped with moveable partitioning members are unitarily formed at locations corresponding to the fixed partitioning members.

In this in-mold foam molding apparatus, with the mold cavity partitioned into a plurality of partitioned mold chambers by the moveable partitioning members and fixed partitioning members, bead starting materials having different properties can be packed into adjacent partitioned mold chambers to achieve the effects described earlier. During the process of molding a molded article, once the mold cavity has been filled with bead starting materials, the bead starting materials are heated and fused with steam. With this in-mold foam molding apparatus, since the moveable partitioning members are retractably provided within the mold cavity, by retracting the moveable partitioning members after the mold cavity has been filled with bead starting materials and prior to fusing together the bead starting materials with steam, it is possible to achieve sufficient bonding among bead starting materials at the interfaces of bead starting materials having different properties, and to thereby assure adequate molding strength at these interfaces.

Further, since partitioned molding segments defined by the partitioned mold chambers within the mold equipped with moveable partitioning members are unitarily formed at locations corresponding to the fixed partitioning members, relative motion of adjacent partitioned molding sections occurring with mold expansion or contraction is prevented, thereby preventing change in width in passage orifice apertures. The retractable configuration of the moveable partitioning members allows a simple linear configuration to be used for the passage orifices formed in the mold, and the passage orifices can be made shorter, preventing expansion/contraction of passage orifice aperture width or deformation of the passage orifices due to mold expansion or contraction, and assuring smooth movement of the moveable partitioning members.

The fixed partitioning member configuration is arbitrary and may take the form of a rod or wall, or a comb configuration provided with a plurality of teeth extending in cantilever fashion in the mold parting direction, arranged at intervals small enough to prevent passage of at least one variety of bead starting materials packed into adjacent partitioned mold chambers. The fixed partitioning members may be arranged at arbitrary locations provided that the locations thereof are aligned with the two ends or medial portion of the boundary of adjacent partitioned mold chambers. Where this boundary is square, fixed partitioning members of rod configuration may be arranged in corner portions of the boundary so as to provide linear configurations for passage orifices, and a fixed partitioning member of wall or comb configuration may be situated along at least one side of the boundary. Where the boundary is linear, fixed partitioning members may be arranged at the two ends or medial portion thereof.

Second Type:

In-mold foam molding apparatus equipped with moveable partitioning members only.

This in-mold foam molding apparatus comprises moveable partitioning members extendable and retractable into and from the mold cavity, for partitioning the mold cavity into a plurality of partitioned mold chambers. The plurality of moveable partitioning members which define the partitioned mold chambers are divided into two sets: first moveable partitioning members arranged on the core mold and second moveable partitioning members arranged on the cavity mold. The plurality of partitioned molding sections of the core mold which constitute the partitioned mold chambers are unitarily formed at locations corresponding to the second moveable partitioning members provided to the cavity mold, and the plurality of partitioned molding sections of the cavity mold which constitute the partitioned mold chambers are unitarily formed at locations corresponding to the first moveable partitioning members provided to the core mold.

As with the in-mold foam molding apparatus of the first type, with this in-mold foam molding apparatus, the functionality and quality of molded articles can be improved through appropriate selection of partitioned mold chamber molding location and size, the properties of the bead starting materials packed therein, and so on. By retracting the moveable partitioning members prior to fusing together the bead starting materials with steam, it is possible to achieve sufficient bonding among bead starting materials at the interfaces of bead starting materials having different properties, and to thereby assure adequate molding strength at these interfaces.

In this in-mold foam molding apparatus, the mold cavity is partitioned into a plurality of partitioned mold chambers by at least two first and second moveable partitioning members. Since first partitioning members are arranged on the core mold and second partitioning members are arranged on the cavity mold, a plurality of partitioned molding sections of the core mold are unitarily formed at locations corresponding to the second partitioning members provided to the cavity mold, and a plurality of partitioned molding sections of the cavity mold are unitarily formed at locations corresponding to the first partitioning members provided to the core mold.

As a result, relative motion of adjacent partitioned molding sections occurring with mold expansion or contraction is prevented, thereby preventing change in width in passage orifice apertures provided to the core mold and cavity mold for the purpose of guiding the moveable partitioning members during retraction thereof. A simple linear configuration can be adopted for the passage orifices, preventing expansion/contraction of passage orifice aperture width or deformation of passage orifices due to mold expansion or contraction, and assuring smooth movement of the moveable partitioning members. Additionally, with this in-mold foam molding apparatus, since the partitioned mold chambers are partitioned by means of moveable partitioning members exclusively, the molded article is devoid of through-holes at locations corresponding to fixed partitioning members, as occurs when fixed partitioning members are used, thereby avoiding loss of strength or diminished appearance of the molded article.

In preferred practice, a core mold or cavity mold provided with moveable partitioning members will be further provided with passage orifices for the purpose of passage of the moveable partitioning members, and projecting portions that project into the mold cavity will be formed along the passage orifice, with the passage orifice aperture leading into the mold cavity being situated medially in the cross direction of these projecting portions. Flash projecting outward from a visible surface of a molded article is produced when bead starting materials infiltrate into the passage orifice apertures, which communicate with the mold cavity when the moveable partitioning members are retracted. With the present in-mold foam molding apparatus, however, projecting portions that project into the mold cavity are formed along the passage orifice, with the passage orifice aperture leading into the mold cavity being situated medially in the cross direction of the projecting portions, these projecting portions forming a recess in the molded article, whereby the flash projects from the back end of the recess. Thus, by selecting the depth of the recess so as to be deeper than the height of the flash, it is possible to produce a molded article that, while having flash, is devoid of flash projecting outwardly from visible surfaces of the molded article. This obviates the need for subsequent flash removal processes, allows the molded article to be attached tightly to the mounting face of a mounting object at the proper location with substantially no gap therebetween, and allows the molded article to be sheathed tightly by a cover member tightly attached thereto with substantially no gap therebetween.

The flash countermeasure described above may be implemented in in-mold foam molding apparatuses of other configurations having moveable partitioning members. The in-mold foam molding apparatus herein provided with this flash countermeasure is provided with moveable partitioning members for partitioning the mold cavity into a plurality of partitioned mold chambers, these members being extendable into and retractable from the mold cavity through passage orifices provided to either the core mold or the cavity mold or both, with projecting portions that project into the mold cavity being formed along the passage orifices provided to the mold(s), and the passage orifice leading into the mold cavity being situated medially in the cross direction of these projecting portions.

With this in-mold foam molding apparatus, with the mold cavity partitioned into a plurality of partitioned mold chambers by partitioning members, adjacent partitioned mold chambers can be filled with bead starting materials having different properties, allowing the functionality and quality of molded articles to be improved through appropriate selection of partitioned mold chamber molding location and size, the properties of the bead starting materials packed therein, and so on. For example, bead starting materials with a low degree of expansion may be used in regions requiring strength so as to increase the strength/rigidity of the molded article, while bead starting materials with a high degree of expansion may be used in other regions in order to reduce the weight of the molded article, so as to impart both improved strength and reduced weight to the molded article.

During the process of molding a molded article, once the mold cavity has been filled with bead starting materials, the bead starting materials are heated and fused with steam. With this in-mold foam molding apparatus, since the moveable partitioning members are retractably provided within the mold cavity, by retracting the moveable partitioning members after the mold cavity has been filled with bead starting materials and prior to fusing together the bead starting materials with steam, it is possible to achieve sufficient bonding among bead starting materials at the interfaces of bead starting materials having different properties, and to thereby assure adequate molding strength at these interfaces.

Further, as noted, flash projecting outward from a visible surface of a molded article is produced when bead starting materials infiltrate into the passage orifice apertures, which communicate with the mold cavity when the moveable partitioning members are retracted. With the present in-mold foam molding apparatus, however, projecting portions that project into the mold cavity are formed along the passage orifices provided to the mold, with the passage orifice opening into the mold cavity being situated medially in the cross direction of the projecting portions, whereby, as described previously, flash projecting outwardly from visible surfaces of the molded article can be eliminated.

In preferred practice, the width of the passage orifice aperture will be smaller than the diameter of the bead starting materials. Where passage orifice aperture width is greater than the diameter of the bead starting materials, bead starting materials will tend to infiltrate into the passage orifices, resulting in a large amount of flash; accordingly, in order to minimize infiltration of bead starting materials into the passage orifices, the width of the passage orifice aperture will be smaller than the diameter of the bead starting materials.

Further, in preferred practice, the height of the projecting portions will be greater than the height of flash formed by the passage orifice. Since flash narrows towards its distal edge, even if the distal edge portion thereof should protrude out to some extent from a visible surface of a molded article, this distal edge portion will deform and be forced into the recess when the molded article is sheathed with a cover member, for example, so that no gap is formed between the molded article and the cover member. However, where the height of the projecting portions is greater than the height of the flash formed by the passage orifice, it can be assured that flash formed by the passage orifice will not project outward from a visible surface of the molded article.

Another possible countermeasure for flash is to design the length of the moveable partitioning members such that, with the moveable partitioning members retracted, the front edge of the moveable partitioning member is coplanar with, or projects beyond the inside face of mold into the mold cavity of the mold provided with the moveable partitioning members.

With this in-mold foam molding apparatus, as with the preceding in-mold foam molding apparatus, the functionality and quality of molded articles to be improved through appropriate selection of partitioned mold chamber molding location and size, the properties of the bead starting materials packed therein, and so on; and by retracting the partitioning members prior to fusing together the bead starting materials, it is possible to achieve sufficient bonding among bead starting materials at the interfaces of bead starting materials having different properties, and to thereby assure adequate molding strength at these interfaces.

Further, since the moveable partitioning members are of length such that, when retracted, the front edge of the moveable partitioning member is coplanar with, or projects beyond the inside face of mold into the mold cavity of the mold provided with the moveable partitioning members, passage orifices are prevented from communicating with the mold cavity when the moveable partitioning members are retracted, thus preventing bead starting materials from filling the passage orifices, thus preventing flash. Thus, when the molded article is sheathed with a cover member or the like, the absence of flash allows the cover member to be secured attached about the outside of the molded article.

As noted, moveable partitioning members may be of comb configuration. Where partitioning members of comb form are moveable, it is necessary to provide the mold with a multitude of passage orifices for passage of the teeth, which makes fabrication of the mold rather complicated. Accordingly, a plate configuration is preferred.

Moveable partitioning members may alternatively consist of plate members having formed therein through-holes or slits of a size that does not allow the bead starting materials to pass. In this case, adjacent partitioned mold chambers communicate via the through-holes or slits provided to the moveable partitioning members, preventing the moveable partitioning members from hindering expulsion of the air used to fill the mold with bead starting materials.

Third type:

In-mold foam molding apparatus equipped with fixed partitioning members only.

In this in-mold foam molding apparatus, fixed partitioning members attached in fixed fashion to the core mold, cavity mold, or both, partition the mold cavity into a plurality of partitioned mold chambers, each partitioned mold chamber being provided with a filling device whereby adjacent partitioned mold chambers can be filled with bead starting materials having different properties. The fixed partitioning members are of comb configuration provided with a plurality of teeth extending in cantilever fashion in the mold parting direction, arranged at intervals small enough to prevent passage of at least one variety of bead starting materials packed into adjacent partitioned mold chambers.

In this in-mold foam molding apparatus, with the mold cavity being partitioned into a plurality of partitioned mold chambers by the fixed partitioning members, adjacent partitioned mold chambers can be filled with bead starting materials having different properties, allowing the functionality and quality of molded articles to be improved through appropriate selection of partitioned mold chamber molding location and size, the properties of the bead starting materials packed therein, and so on. For example, bead starting materials with a low degree of expansion may be used in regions requiring strength so as to increase the strength/rigidity of the molded article, while bead starting materials with a high degree of expansion may be used in other regions in order to reduce the weight of the molded article, so as to impart both improved strength and reduced weight to the molded article.

While molded articles molded by means of this in-mold foam molding apparatus will have formed therein through-holes or wells at locations corresponding to the teeth of the fixed partitioning members, the fixed provision of fixed partitioning members has the following advantages.

(1) The need for a drive system to drive the partitioning members is obviated, allowing the design of the in-mold foam molding apparatus to be appreciably simplified, reducing the costs of fabricating the in-mold foam molding apparatus.

(2) Since the fixed partitioning member attachment locations can be changed, the partitioned zones within the mold cavity can be easily changed to accommodate modifications in molding design and the like.

(3) Since bead starting materials of different properties filling adjacent partitioned mold chambers fuse to a sufficient extent through the spaces between the teeth, adequate bond strength between molded portions consisting of bead starting materials of different properties in a molded article is assured.

(4) Since the need to provide the mold with passage orifices for passage of partitioning members is obviated, the problem of flash formation due to infiltration of bead starting materials into the passage orifices or infiltration between a passage orifice and the partitioning members situated therein is prevented. Localized reductions in mold strength due to the passage orifices is prevented, and molding precision may be improved.

Suitable teeth are rod-like elements 1 to 10 mm in diameter. As noted, with this in-mold foam molding apparatus, through-holes or wells are formed in the molded article by the teeth, so where tooth diameter exceeds 10 mm, through-holes or wells of appreciable size will form, reducing the strength of the molded article and adversely affecting its appearance. Where tooth diameter is smaller than 1 mm, the teeth will not have adequate strength and may break or deform.

The gaps between the teeth should be equal to 30–90% of the diameter of the bead starting materials whose passage is to be prevented. If gaps between adjacent teeth are too small, adequate fusion of bead starting materials contained in adjacent partitioned mold chambers situated to either side of the teeth cannot be assured, resulting in diminished strength at the interface. Bead starting materials consisting of poly- olefin resins are softer than bead starting materials consisting of polystyrene resins, and if the gaps between adjacent teeth are too large the bead starting materials may pass between the teeth of the partitioning member and enter the adjacent partitioned mold chamber.

In preferred practice, the teeth will be fabricated of an elastically deformable material. That is, in order to prevent deformation of the teeth due to filling pressure, expansion pressure, or the like, it is ordinarily desirable to make the sectional area thereof rather large in order to increase rigidity, but this has the result of large through-holes or wells being formed in the molded article, causing diminished appearance and lowered strength in the molded article. By fabricating the teeth from an elastically deformable material, the teeth can be designed to recover to their original shape after undergoing deformation of the teeth due to filling pressure, expansion pressure, or the like, thus preventing molding defects due to plastic deformation of the teeth, while at the same time minimizing the sectional area of each tooth, whereby diminished appearance and lowered strength in molded articles may be held in check. The tooth configuration described here may be employed in in-mold foam molding apparatuses of the first type where toothed members are employed as the fixed partitioning members.

In preferred practice, the teeth will be arranged in a rectangular wave, triangular wave, or sine wave arrangement. With this design, boundaries of adjacent molded sections formed in the molded article by adjacent partitioned mold chambers will be imparted with a rectangular wave, triangular wave, or sine wave configuration. This maximizes the area of contact between adjacent molded sections, improving bond strength at the interfaces in the molded article.

To improve release of the molded article, fixed partitioning members will preferably be fixed to a mold having an ejector pin. Depending on mold configuration, a molded article may remain on the mold devoid of an ejector pin when the molds are parted, resulting in failure to release. With the present in-mold foam molding apparatus, however, the molded article is held engaged by the teeth when the molds are parted, and thus remains on the mold provided with the fixed partitioning members. Thus, release failure in the nature of that described above may be effectively prevented by fixing the fixed partitioning members to a mold having an ejector pin.

In preferred practice, fixed partitioning members will be composed of first fixed partitioning members fixed to a mold having an ejector pin and second fixed partitioning members fixed to the mold devoid of an ejector pin. With this arrangement, when the molds are parted to release the molded article, as the teeth of the first fixed partitioning members and the teeth of the second fixed partitioning members pull apart from each other, the molded article disengages from the second fixed partitioning members and is held skewered on the teeth of the first fixed partitioning members, whereby the molded article is released from the mold having the second fixed partitioning members affixed thereto and remains on the mold having the first fixed partitioning members affixed thereto. Thus, when the molded article is released through the agency of the ejector pin, as regards the teeth, it is sufficient simply to extract the molded article from the teeth of the first fixed partitioning members, thereby providing markedly easier release than is the case where the molded article must be extracted from both sets of teeth. Further, when the molds are parted to release the molded article, as the teeth of the first and second fixed partitioning members pull apart from each other, areas of adhesion between the molded article and the teeth of the first fixed partitioning member on which the molded article remains are separated to a certain extent, thereby facilitating release of the molded article by the ejector pin.

Where the fixed partitioning members are composed of first fixed partitioning members fixed to a mold having an ejector pin and second fixed partitioning members fixed to the mold devoid of an ejector pin, in preferred practice the teeth of the first fixed partitioning members and the teeth of the second fixed partitioning members will be arranged in alternating fashion, or the number of teeth of the first fixed partitioning members fixed to the mold having an ejector pin will be greater than the number of teeth of the second fixed partitioning members fixed to the mold devoid of an ejector pin. The former configuration affords good balance when the teeth of the first fixed partitioning members and the teeth of the second fixed partitioning members are pulled apart from each other as the molds are parted, preventing the molded article from being subjected to unnecessary force. The latter configuration assures that the molded article will be held retained on the mold having an ejector pin.

In preferred practice, the gaps between the teeth of the first fixed partitioning members and the second fixed partitioning members will be such that at least one of the bead starting materials being used cannot pass therethrough. By doing so, passage of bead starting materials between adjacent partitioned mold chambers can be prevented, even without extending the distal ends of the teeth of the first fixed partitioning members and the second fixed partitioning members as far as the inside wall of the other mold, simply by overlapping by a certain extent the distal ends of the teeth of the two sets of fixed partitioning members in the axial direction of the teeth. It is therefore possible to make the teeth of the two sets of fixed partitioning members shorter, thereby improving release of the molded article and minimizing the action of bending moment on the teeth, whereby teeth of smaller diameter can be used so that the diameter of the wells formed in the molded article by the teeth is smaller. Since tooth length may be set roughly, it can readily be modified in accordance with a change in the shape of the molded article or the like, and in cases where a crack is maintained between the two molds as they are filled with the bead starting materials (such in cracked filling), by designing the lap of the teeth of the two sets of fixed partitioning members to exceed the width of the crack, adjacent partitioned mold chambers can be kept partitioned.

While tooth configuration may be selected arbitrarily, by providing to the distal end or medial portion of fixed partitioning members fixed to the ejector pin-equipped mold a release-resistance increasing portion for the purpose of increasing resistance to release of the molded article from the teeth, it is possible to assure that when the molds are parted, the molded article remains on the mold having an ejector pin.

In-mold Foam Molding Method

The first in-mold foam molding method which pertains to the invention employs an in-mold foam molding apparatus comprising: a core mold and a cavity mold that are devoid of air orifices (such as core vents and core vent holes) in those molding sections used for molding prominent areas of the outside face of a molded article; and moveable partitioning members that partition the mold cavity so as to prevent passage of the bead starting materials, these moveable partitioning members being retractable from the mold cavity by means of drive means. With the mold cavity partitioned into a plurality of partitioned mold chambers by the moveable partitioning members, bead starting materials of different properties are packed into adjacent partitioned mold chambers, and when these are filled with bead starting materials, the moveable partitioning members are retracted while supplying steam to the bead starting materials to fuse them together.

In this molding method, the in-mold foam molding apparatus used comprises a core mold and a cavity mold that are devoid of air orifices (such as core vents and core vent holes), whereby marks produced on the molded article surface by air orifices are situated in obscured areas of the molded article surface, thereby improving the attractiveness of the molded article surface.

Further, in this molding method, air orifices may be dispensed with entirely or substantially entirely, and the flows of service fluid to the rear chamber of the core mold, the rear chamber of the cavity mold, and the mold cavity may be controlled separately. For example, where heating conditions in these spaces are manipulated independently through control of a steam service fluid, the surface qualities of the bead starting material portions contacting the core mold and cavity mold within the filled mold cavity can be controlled through the agency of steam delivered to the two chambers, while heating, expansion, and fusion of the bead starting materials filling the mold cavity can be controlled through the agency of steam delivered to the mold cavity, whereby fusion of the bead starting materials can be controlled independently of surface qualities. In this way, fusion in a molded article can be held to a lower level, shortening the molding cycle time and producing a molded article with an attractive surface, thereby achieving both good throughput and high product value.

In preferred practice, the bead starting materials will comprise polyolefin resin bead starting materials in order to assure that the bead starting materials are adequately packed into the mold cavity. Specifically, in terms of achieving accurate control of the supply of service fluid to the two chambers and to the mold cavity, it is ideal in the present molding method for the molds to be devoid of air orifices; however, this arrangement results in a susceptibility to turbulence in the air used for filling the bead starting materials, creating a concern that packing of bead starting materials may suffer. Bead starting materials consisting of polyolefin resins, however, are soft materials and are moreover highly gas permeable, so for a given expansion factor, polyolefin resin bead starting materials experience appreciably more particle shape deformation, contributing to improved packing, so that an overall decline in packing is effectively prevented.

Further, with this molding method, with the mold cavity partitioned into a plurality of partitioned mold chambers by means of moveable partitioning members, adjacent partitioned mold chambers may be filled with bead starting materials of different properties, allowing each partitioned mold chamber to be filled with bead starting materials of different properties. For example, bead starting materials with a low degree of expansion may be used in regions requiring strength so as to increase the strength/rigidity of the molded article, while bead starting materials with a high degree of expansion may be used in other regions in order to reduce the weight of the molded article, so as to impart both improved strength and reduced weight to the molded article. Since the moveable partitioning members are retractable from the mold cavity by drive means, once the mold cavity has been filled with the bead starting materials, the partitioning members can be withdrawn to allow the bead starting materials to be heated and fused with steam, thereby affording adequate bonding even at the interfaces between bead starting materials of different properties. The smooth transition between the two types of bead starting materials prevents the appearance of the molded article from suffering.

The second in-mold foam molding method which pertains to the invention employs an in-mold foam molding apparatus comprising: a core mold and a cavity mold that are devoid of air orifices (such as core vents and core vent holes) in those molding sections used for molding prominent areas of the outside face of a molded article; and fixed partitioning members of comb configuration having a plurality of teeth for partitioning the mold cavity so as to prevent passage of the bead starting materials, these fixed partitioning members being fixed to the core mold or cavity mold with the teeth thereof arranged in the direction of mold parting. Bead starting materials of different properties are packed into adjacent partitioned mold chambers defined within the mold cavity by the fixed partitioning members, and steam is then supplied to the bead starting materials to heat and fuse them together.

This molding method affords the same advantages as the first molding method described previously. In distinction from the first molding method, however, fixed partitioning members are fixedly provided to the core mold or cavity mold, so that the bead starting materials must be heated and fused with the fixed partitioning members in situ within the mold cavity, and as a result through-holes are produced in the molded article at locations corresponding to those of the teeth. However, the need for a drive mechanism for driving the partitioning members is obviated, as is the need for a sealing structure between the mold and the partitioning members, so the design of the in-mold foam molding apparatus can be greatly simplified, significantly reducing the costs entailed in fabrication thereof. Further, the partitioned areas in the mold cavity can be readily modified by changing the locations at which the fixed partitioning members are attached, allowing for easy adaptation to changes in molding design and the like.

The air orifices in the core mold and cavity mold may be dispensed with entirely or substantially entirely. This affords precision control of heating conditions for the three spaces, namely, the rear chamber of the core mold, the rear chamber of the cavity mold, and the mold cavity, and affords an attractive molding surface free from marks produced by air orifices. Further, the lack of air orifices prevents cooling water sprayed into the two chambers during cooling from contacting the molded article, thus preventing a rise in the water contact of the molded article due to contact with cooling water. Since cooling water does not come into direct contact with the molded article, sanitary molded articles can be obtained.

The third in-mold foam molding method which pertains to the invention employs the in-mold foam molding apparatus recited in any of claims 1 to 13, wherein with the mold cavity partitioned into a plurality of partitioned mold chambers by moveable partitioning members extended therein, bead starting materials are packed into the mold cavity such that at least adjacent partitioned mold chambers are filled with bead starting materials of different properties, and when these are filled with bead starting materials, the moveable partitioning members are retracted until the bead starting materials are fused together by means of steam supplied thereto.

This molding method employs an in-mold foam molding apparatus of the first or second type, wherein with the mold cavity partitioned into a plurality of partitioned mold chambers by means of moveable partitioning members and fixed partitioning members, and bead starting materials are packed into the mold cavity such that at least adjacent partitioned mold chambers are filled with bead starting materials of different properties, whereby functionality and quality of molded articles may be improved through appropriate selection of partitioned mold chamber molding location and size, the properties of the bead starting materials packed therein, and so on. For example, bead starting materials with a low degree of expansion may be used in regions requiring strength so as to increase the strength/rigidity of the molded article, while bead starting materials with a high degree of expansion may be used in other regions in order to reduce the weight of the molded article, so as to impart both improved strength and reduced weight to the molded article.

Further, after filling with the bead starting materials, the moveable partitioning members are retracted until the bead starting materials are fused together by means of steam supplied thereto, thereby affording adequate bonding at interfaces between bead starting materials of different qualities and assuring adequate molding strength at these interfaces.

Further, the use of an in-mold foam molding apparatus of the first or second type wherein adjacent partitioned mold chambers are unitary prevents relative motion of adjacent partitioned molding sections due to mold expansion or contraction and prevents changes in the width of the passage orifices. The configuration of the passage orifices provided to the mold for passage of the moveable partitioning members can be simplified, for example, to a linear configuration, and expansion/contraction of passage orifice aperture width or deformation of passage orifices due to mold expansion or contraction can be prevented, assuring smooth movement of the moveable partitioning members.

In preferred practice, according to this third molding method, the mold cavity will first be filled with bead starting materials, the moveable partitioning members will be retracted, and the bead starting materials will then be heated and fused. The timing at which the moveable partitioning members are retracted may be selected arbitrarily provided that retraction occurs at some point after packing the bead starting materials and before the bead starting materials become fused together by steam supplied thereto. In actual practice, the timing at which the bead starting materials are fused together by the steam will differ depending on the size of the molded article, and will also vary by area within the molding cavity, with steam temperature, and other factors, making it difficult to achieve specific timing. Accordingly, in preferred practice the moveable partitioning members will be retracted after packing the bead starting materials and before delivering steam to the mold cavity.

The fourth in-mold foam molding method which pertains to the invention employs the in-mold foam molding apparatus recited in any of claims 14 to 24, and additionally employs as the bead starting materials bead starting materials that cannot pass through the teeth. With the core mold and cavity mold shut so that the mold cavity is partitioned into a plurality of partitioned mold chambers by fixed partitioning members, these bead starting materials fill the partitioned mold chambers in such a way that at least adjacent partitioned mold chambers are filled with bead starting materials of different properties.

Since this molding method employs an in-mold foam molding apparatus of the third type, the advantages thereof are analogous to those described earlier. Additionally, since the bead starting materials are of a size that does not allow passage through the teeth of the fixed partitioning members, the plurality of partitioned mold chambers can be filled with bead starting materials of different properties, and bead starting materials can be packed in without prolonging the time needed to pack in the bead starting materials.

The fifth in-mold foam molding method which pertains to the invention employs the in-mold foam molding apparatus recited in any of claims 14 to 24, and additionally employs as the bead starting materials a first bead starting material that cannot pass through the teeth and a second bead starting material that can pass through the teeth. With the core mold and cavity mold shut so that the mold cavity is partitioned into a plurality of partitioned mold chambers by fixed partitioning members, the first bead starting material is packed in, followed by the second bead starting material, packing the bead starting materials into the partitioned mold chambers in such a way that at least adjacent partitioned mold chambers are filled with bead starting materials of different properties.

Since this molding method employs an in-mold foam molding apparatus of the third type, the advantages thereof are analogous to those described earlier. Additionally, since a first bead starting material that cannot pass through the teeth is packed first, followed by a second bead starting material that can pass through the teeth, while the filling process is more time consuming, improved bond strength between the first beads and the second beads is afforded, since a portion of the second beads pass through the teeth and migrate to adjacent partitioned mold chambers.

Adjacent partitioned mold chambers partitioned by means of partitioning members are filled with bead starting materials of different properties, which may conceivably be bead starting materials having different degrees of expansion. For example, bead starting materials with a low degree of expansion may be used in regions requiring strength so as to increase the strength/rigidity of the molded article, while bead starting materials with a high degree of expansion may be used in other regions in order to reduce the weight of the molded article, so as to impart both improved strength and reduced weight to the molded article.

In-mold Foam Molded Article

The first in-mold foam molded article which pertains to the invention has formed thereon a recess extending along an exterior face of an interface of molded portions molded from bead starting materials of different properties, with flash being formed on the bottom face of the recess so as to not project outward from visible surfaces of the molded article.

In this molded article, flash does not project outward from visible surfaces of the molded article, obviating the need for a finishing process to remove flash or the like, and allowing the molded article to be attached tightly to the mounting face of a mounting object at the proper location with substantially no gap therebetween and allowing the molded article to be sheathed tightly by a cover member tightly attached thereto with substantially no gap therebetween. Molded articles of this kind can be fabricated by means of the in-mold foam molding apparatus described hereinabove provided with projecting portions situated along the passage orifice.

The second in-mold foam molded article which pertains to the invention has a plurality of molded portions molded from bead starting materials of different properties, and has formed therein a plurality of through-holes or wells situated at predetermined intervals along the interfaces of the molded portions and extending in the direction of mold parting.

Molded articles of this kind are molded using an in-mold foam molding apparatus provided with teeth, the through-holes or wells being situated at locations corresponding to those of the teeth. Thus, the design of the in-mold foam molding apparatus can be simplified, and the need to provide the mold with passage orifices for extending and retracting the partitioning members vis-à-vis the mold cavity in the manner described earlier is obviated, whereby formation of flash projecting from visible surfaces of the molded article by passage orifices is eliminated.

In preferred practice, those exterior portions of an interface that are devoid of through-holes or wells will have formed therein a recess extending along the interface so that flash formed on the bottom of the recess does not project out from visible surfaces of the molded article. In molded articles of this kind, flash does not project out from visible surfaces of the molded article, thereby obviating the need for a finishing process to remove flash or the like, and allowing the molded article to be attached tightly to the mounting face of a mounting object at the proper location with substantially no gap therebetween and allowing the molded article to be sheathed tightly by a cover member tightly attached thereto with substantially no gap therebetween.

In preferred practice, interfaces between molded sections will have a rectangular wave, triangular wave, or sine wave configuration. This maximizes the area of contact between adjacent molded sections, improving bond strength and improving the strength of the molded article.

A specific example of an in-mold foam molded article is a core for an automobile bumper. Automobile bumper cores of this kind must be capable of efficiently absorbing shock occurring during frontal impact of the automobile (frontal impact), shock occurring with offset impact, and shock occurring with frontal impact on the diagonal (diagonal impact). In addition, in order to hold down vehicle weight, the weight of the core must be as light as possible. In the automobile bumper core which pertains to the present invention, portions of the core susceptible to localized impact stress during automobile frontal collisions of various kinds are composed of low-expansion portions consisting of a bead starting material having a low degree of expansion, while other portions are composed of high-expansion portions consisting of a bead starting material having a high degree of expansion, thereby minimizing core weight while providing effective absorption of energy of impact in the case of offset impact or diagonal impact.

BRIEF DESCRIPTION OF THE DRAWINGS

FIG. 2(a) is a sectional view taken along line S1—S1 in FIG. 1 and FIG. 2(b) is an enlarged sectional view of principal portion A in FIG. 2(a);

FIG. 7(a) is a perspective view of a core pertaining to a first embodiment, and FIG. 7(b) and FIG. 7(c) are illustrative diagrams of a molding apparatus for molding the core;

FIG. 10(a) is a perspective view of yet another core design and FIG. 10(b) and FIG. 10(c) are illustrative diagrams of a molding apparatus for molding the core;

FIG. 11(a) is a perspective view of yet another core design and FIG. 11(b) and FIG. 11(c) are illustrative diagrams of a molding apparatus for molding the core;

FIG. 13(a) is a perspective view of yet another core design and FIG. 13(b) and FIG. 13(c) are illustrative diagrams of a molding apparatus for molding the core;

FIG. 23(a) is a perspective view of yet another core design and FIG. 23(b) is an illustrative diagram of a molding apparatus for molding the core;

FIG. 24(a) is a perspective view of yet another core design and FIG. 24(b) is an illustrative diagram of a molding apparatus for molding the core;

FIGS. 34(a) and 34(b) are an illustrative diagram of molding surface properties and internal rate of fusion;

FIGS. 38(a) through 38(e) are illustrative diagrams of a foam molding method of the conventional art.

DESCRIPTION OF THE PREFERRED EMBODIMENTS

The embodiments of the invention are described hereinbelow making reference to the accompanying drawings. The embodiments describe working of the invention in an in-mold foam molded article which is core for an automobile bumper, and an in-mold foam molding apparatus and in-mold foam molding method for molding same.

First Embodiment

This first embodiment relates to an in-mold foam molding apparatus of the first type, equipped with moveable partitioning members, and to an in-mold foam molding method and molded article.

Figure 1:
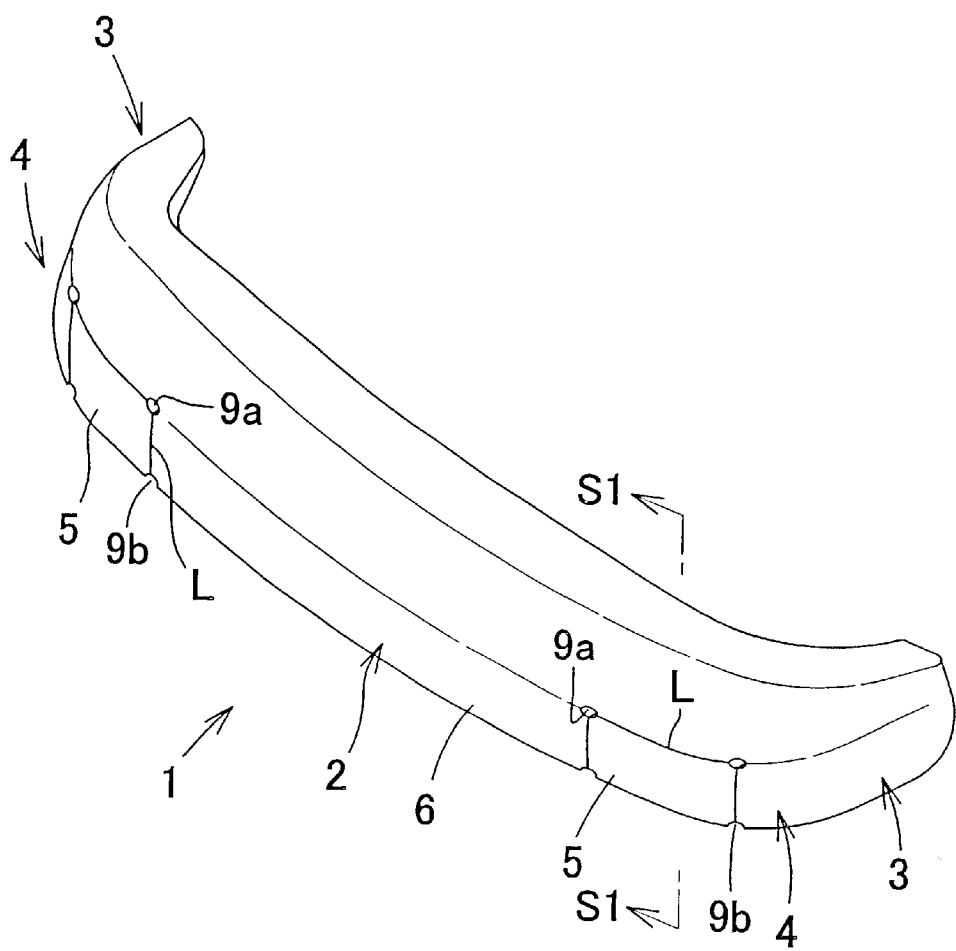
FIG. 1 is a perspective view of an automobile bumper core pertaining to a first embodiment.

A core for an automobile bumper consisting of an in-mold foam molded article is first described. Referring to FIGS. 1 and 2, a core 1 has a front impact absorbing portion 2 that curves gently backward at the two ends thereof, and side impact absorbing portions 3 that extend backward from the two ends of front impact absorbing portion 2. At the bottom half of each corner portion 4 extending from impact absorbing portion 2 to a side impact absorbing portion 3 is formed a low expansion portion 5 comprising bead starting materials with a low degree of expansion, the remaining portions being composed of a high expansion portion 6 comprising bead starting materials with a higher degree of expansion than low expansion portion 5.

The central portion of front impact absorbing portion 2 is for the purpose of absorbing energy of impact during frontal impact, and since this portion can be provided with a large pressure area for receiving the energy of impact, it comprises highly expanded, soft, lightweight bead starting materials. The two ends of front impact absorbing portion 2 and the side impact absorbing portions 3 are for the purpose of absorbing energy of impact during offset impact or diagonal impact, and since it is difficult to provide these portions with a large pressure area for receiving the energy of impact, there are provided low expansion portions 5 that, while heavier than other portions, comprise a rigid bead starting material having a low degree of expansion, whereby the core 1 may be reduced in weight while assuring adequate safety performance in collision during frontal impacts of various kinds. The length and height of low expansion portions 5 may be set to any desired size provided that core 1 will be able to adequately absorb the energy of any impact to which it is subjected. In the present embodiment, low expansion portions 5 are only provided in the bottom halves of corner portions 4 of core 1, but corner portions 4 could be composed entirely of a bead starting material having a low degree of expansion. The exterior shape and size of core 1 may be selected as appropriate for the car on which it will be used.

Referring to FIG. 2, on the back face of core 1 is formed a recess 7 that extends along the low expansion portion 5/high expansion portion 6 interface L. Flash 8 is formed on the bottom face of recess 7 but does not project out beyond the visible surface of core 1. The back face of core 1 will be secured to the front face of the front beam of the car, and since flash 8 is formed in such a way that it does not project out beyond the visible surface of core 1, without removing flash 8 from core 1, core 1 can nevertheless be tightly attached to the front face of the front beam without any gap therebetween.

The depth of recess 7 is selected with reference to the height of the flash 8 that forms on the bottom face of recess 7, in such a way that flash 8 does not project out beyond the visible surface of core 1. The width of recess 7 will preferably be as small as possible, but if too small, it will not be possible to assure adequate strength on the part of the projecting portion 34 provided to core mold 11 (see FIG. 3) for forming recess 7, as will be discussed later; accordingly, width should be on the order to 3 to 10 times the thickness of flash 8.

Figure 8:
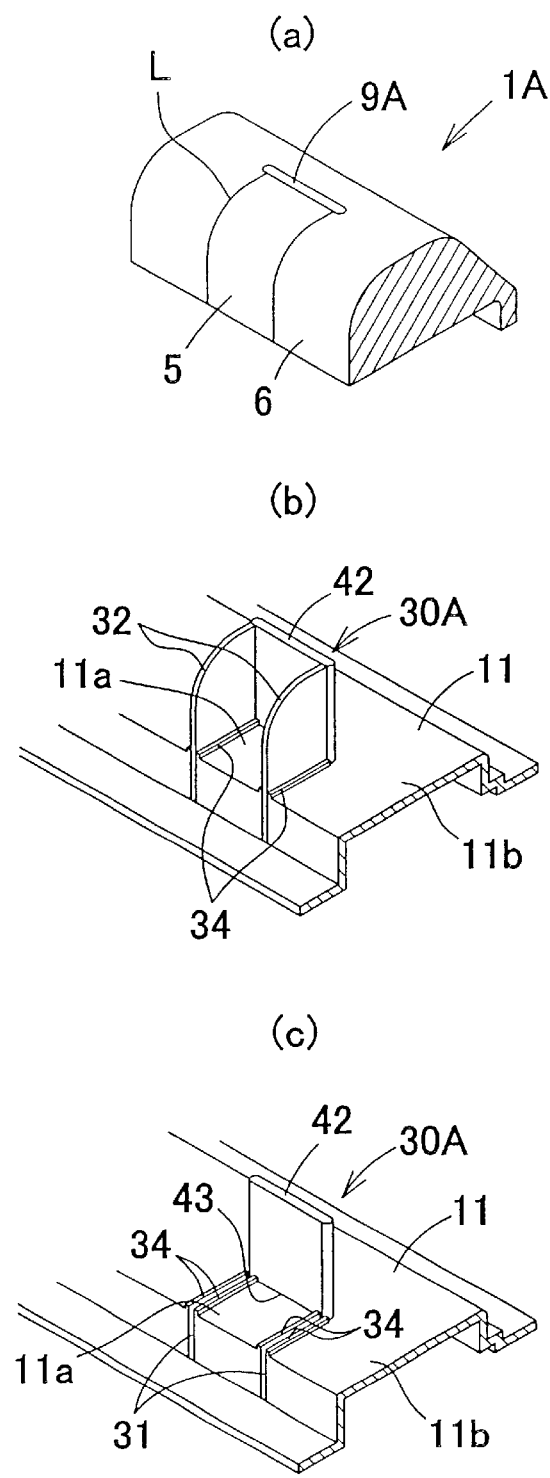
FIG. 8(a) is a perspective view of another core design and FIG. 8(b) and FIG. 8(c) are illustrative diagrams of a molding apparatus for molding the core.

As shown in FIG. 1 and FIG. 7(a), low expansion portion 5 and high expansion portion 6 are divided at an interface L of approximately "C" shaped configuration when viewed from the front. At the two top corner portions of interface L are formed through-holes 9a that penetrate backward through core 1, and at the bottom edge of interface L are formed recesses 9b that extend front-to-back. Through-holes 9a and recesses 9b are formed when core 1 is molded in in-mold foam molding apparatus 10, described later. Depending on the configuration of the fixed partitioning members provided to the molding apparatus, these through-holes may be produced at any location(s) along interface L to form, for example, a long narrow through-hole 9A of slit configuration, as shown in FIG. 8(a) or a plurality of through-holes 9B, 9C arranged in rows, as shown in FIGS. 9(a) and 10(a); or through-holes may be omitted, as shown in FIG. 11(a).

The configuration of interface L is not limited to a "C" shaped configuration viewed from the front, it being alternatively possible for the core to be divided along an interface of "L" shaped configuration viewed from the front, a linear configuration, or a curving configuration. While the present embodiment describes a core 1 for a car bumper, the invention may be embodied analogously in in-mold foam molded articles other than cores, provided that these molded articles have molded portions comprising bead starting materials of different properties. Depending on the molded article, bead starting materials differing in properties other than their expansion factor, e.g., bead starting materials differing in properties such as the bulk density of the beads, cell diameter, bead diameter, material, and the like, may be employed to produce molded articles suitable for the conditions under which they will be used.

The materials for the bead starting materials may be selected with reference to factors such as the conditions under which the fabricated molded article will be used. Examples are polystyrene synthetic resin materials as well as polyethylene resins, polypropylene resin materials, and other polyolefin resin materials, and copolymers of these synthetic resin materials.

The expansion factor of the bead starting materials will depend on the material of the bead starting materials, but in preferred practice will be within the range of 3 to 150. Specifically, for bead starting materials comprising polystyrene synthetic resin materials, the factor is 3 to 100 (preferably 3 to 80), and for bead starting materials comprising polyolefin resin materials, the factor is 3 to 90 (preferably 3 to 60). In preferred practice, bead size is 1 to 10 mm, and preferably 2.0 to 8 mm.

Specific examples of polyolefin resin materials are ethylene-propylene random polypropylene resin, ethylene-propylene block polypropylene resin, homo polypropylene ethylene-propylene-butene random terpolymer, linear low-density polyethylene (LLDPE), crosslinked low-density polyethylene (LDPE), and so on.

In bead starting materials comprising polyolefin resin materials, cell size smaller than 100 $\mu$m is associated with poor surface elongation during molding and susceptibility to sinkage, resulting in poor appearance of the visible faces. Above 900 $\mu$m, cell diameter tends to become irregular, and surface texture becomes rough due to the large cell diameter, resulting in poor appearance of the visible faces. For these reasons, cell diameter is preferably within the range 100–900 $\mu$m, more preferably 150–700 $\mu$m, and most preferably 170–550 $\mu$m.

In preferred practice, the DSC 2'nd peak ratio will be 8%–60%. DSC 2'nd peak ratio refers to the area under the high temperature-end peak as a percentage of the total area under two DSC (differential scanning calorimetry) peaks (a high temperature-end and a high temperature-end) resulting from the crystal melting point of the base resin when the base resin is heated. Where this DSC 2'nd peak ratio is below 8%, permissible heating parameters for molding will be rather narrow, and molded articles will tend to shrink and be susceptible to sinkage. Where the ratio exceeds 60%, heating parameters will need to be significantly upped, necessitating a large scale molding unit, which is undesirable from an energy consumption standpoint as well. For these reasons, values ranging from 8–60%, preferably 10–50%, and especially 15–40% are preferred.

Where the percentage of closed cells is less than 65%, molded articles tend to shrink and experience appreciable sinkage, even where heating voltage is upped during molding to bring about fusion of the beads, thereby making it difficult to produce molded articles of the desired quality. Accordingly, values of 65% or above, preferably 75% or above, and especially 85% or above are preferred.

An in-mold foam molding apparatus 10 capable of molding this core 1 is now described.

Figure 3:
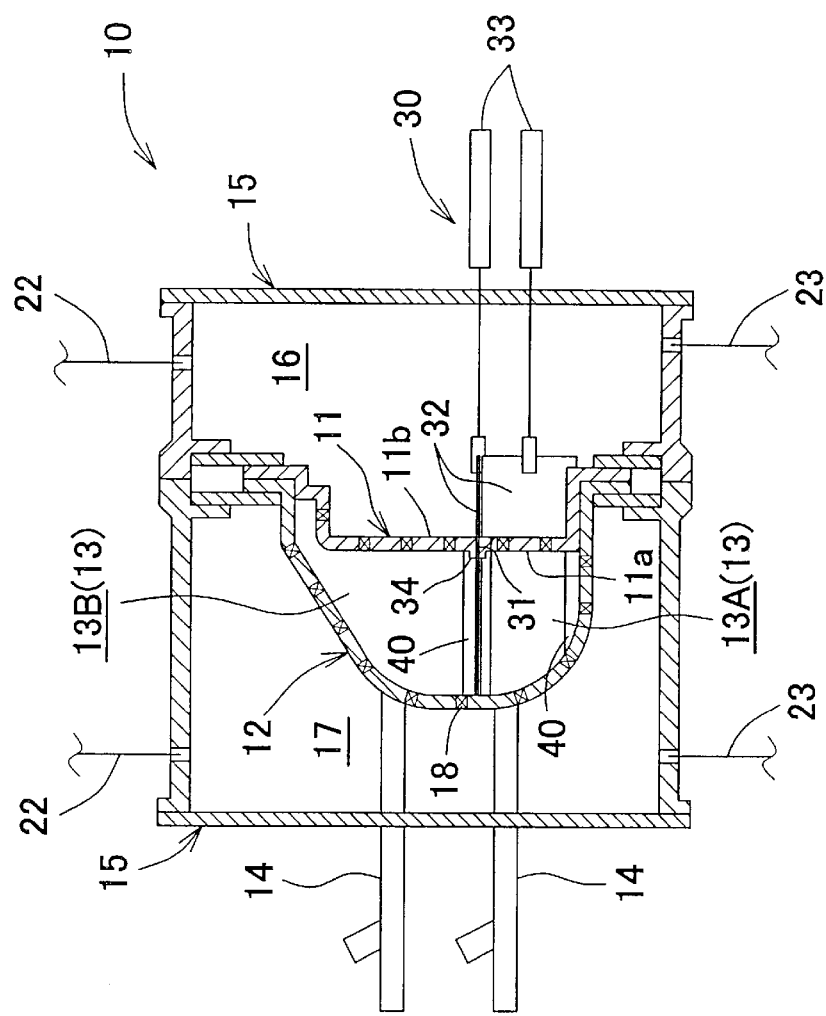
FIG. 3 is a longitudinal sectional view of an in-mold foam molding apparatus pertaining to a first embodiment.

Referring to FIG. 3, in-mold foam molding apparatus 10 comprises a set of molds composed of a core mold 11 and a cavity mold 12 situated in opposition; and a filling unit 14 for filling the mold cavity 13 defined by core mold 11 and cavity mold 12 with bead starting materials carried on an air stream.

Figure 4:
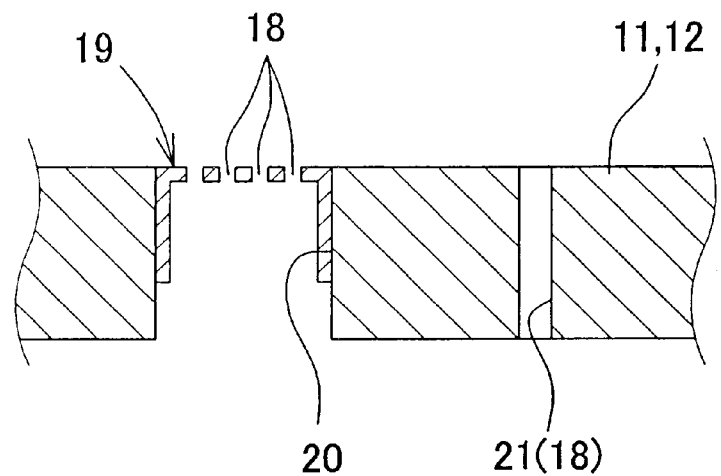
FIG. 4 is a longitudinal sectional view of a section of a mold containing air orifices.
Figure 5:
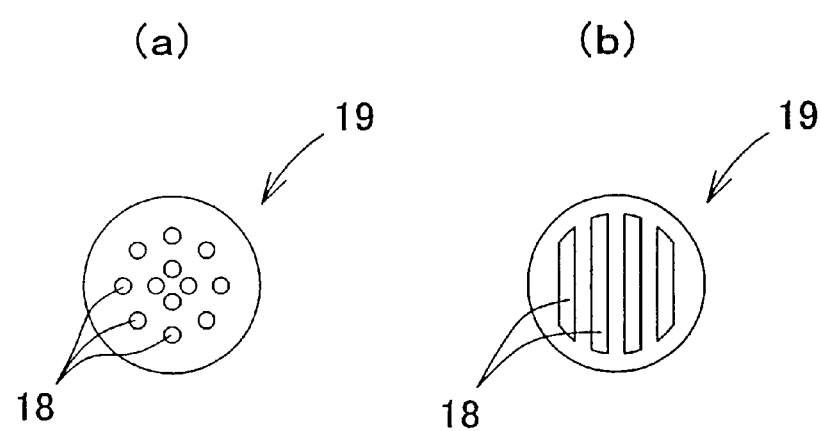
FIGS. 5(a) and 5(b) are frontal views of a core vent.

Core mold 11 and cavity mold 12 are each attached to a housing 15 having a rim-like frame and a back panel, and a set of chambers composed of a first chamber 16 and a second chamber 17 are defined to the rear of core mold 11 and cavity mold 12, respectively. A multitude of air orifices 18 providing communication between the two chambers 16, 17 and mold cavity 13 are formed in core mold 11 and cavity mold 12. In actual practice, as shown in FIGS. 4 and 5, air orifices 18 are composed of core vents 19—capped tubular elements having an outside diameter of 7–12 mm and provided with a plurality of air orifices 18 comprising round orifices about 0.5 mm in diameter or slits about 0.5 mm wide, which fit into core vent mounting orifices 20 provided to molds 11, 12—and core vent holes 21 about 0.5 mm in diameter formed directly in molds 11, 12.

First chamber 16 and second chamber 17 have connected thereto feed lines 22 for delivering service fluids, such as steam or compressed air, and also have connected thereto outlet lines 23 coupled to pressure reducing means or drain lines.

The interior of mold cavity 13 is partitioned by means of two sets of partitioning means 30 (for defining low expansion portions 5) into two partitioned mold chambers 13A for forming low expansion portions 5 and one partitioned mold chamber 13B for forming a high expansion portion 6. Filling units 14 for bead starting materials are connected to each of the partitioned mold chambers 13A, 13B so that adjacent partitioned mold chambers 13A, 13B may be filled with bead starting materials of different properties. In the present embodiment, mold cavity 13 is partitioned into three chambers for the purpose of molding a car bumper core 1, but partition configuration, the number of partitions, and partition location may be selected as desired depending on the molding being fabricated. Here, adjacent partitioned mold chambers 13A, 13B are filled with bead starting materials having different degrees of expansion, but may be filled with bead starting materials differing in other properties, such as bead bulk density, cell diameter, bead diameter, material, and the like, depending on the intended use for the molded article.

Turning now to a description of partitioning means 30, referring to FIGS. 3 and 7, low expansion portions 5 and high expansion portion 6 of core 1 are divided along an interface L of approximately "C" shaped configuration when viewed from the front, the core mold 11 being provided with rod-shaped fixed partitioning members 40 situated at locations (Th corresponding to the corners and bottom end of this interface L. Passage orifices 31 of long narrow slit shape are formed in core mold 11 between adjacent fixed partitioning members 40, and within passage orifices 31 are installed moveable partitioning members 32 that are extendable and retractable vis-à-vis mold cavity 13 via actuators 33, such as air cylinders, whereby mold cavity 13 may be partitioned into a plurality of partitioned mold chambers 13A, 13B by means of fixed partitioning members 40 and moveable partitioning members 32. Fixed partitioning members 40 and moveable partitioning member 32 may be provided to either the core mold 11 or the cavity mold 12; however, in preferred practice the moveable partitioning members 32 will not be provided to the mold provided with the filling units 14, so as to avoid complicated mold structure.

The passage orifice 31 aperture width is smaller than the bead diameter of the bead starting materials so as to prevent unwanted infiltration of bead starting materials into passage orifices 31. Specifically, it is 20–70% of bead starting material diameter. To prevent flash from forming, the gaps between moveable partitioning members 32 and core mold 11 should be as small as possible, e.g., 0.5–5 mm, although this will depend on the bead starting material expansion factor.

In preferred practice, moveable partitioning members 32 will be composed of tabular members comprising a metal material, synthetic resin material, or ceramic material; however, members of comb, picket fence, or mesh configuration are also possible. Extension and retraction of all three moveable partitioning members 32 may be driven by means of a single actuator such as an air cylinder. This has the advantage of reducing the number of actuators needed to extend and retract the moveable partitioning members 32.

Moveable partitioning member 32 thickness may be selected arbitrarily provided that strength is sufficient to withstand the bead filling pressure. In preferred practice, moveable partitioning members 32 will be as thin as possible in order to substantially eliminate any change in volume in mold cavity 13 when moveable partitioning members are retracted after the bead starting materials have been introduced.

When a core 1 is being molded using this in-mold foam molding apparatus 10, moveable partitioning members 32 are withdrawn back into passage orifices 31, and thus some of the bead starting materials packed into mold cavity 13 will infiltrate into passage orifices 31 during steam heating and fusion, producing along passage orifices 31 long narrow flash 8 that projects from core 1.

Figure 6:
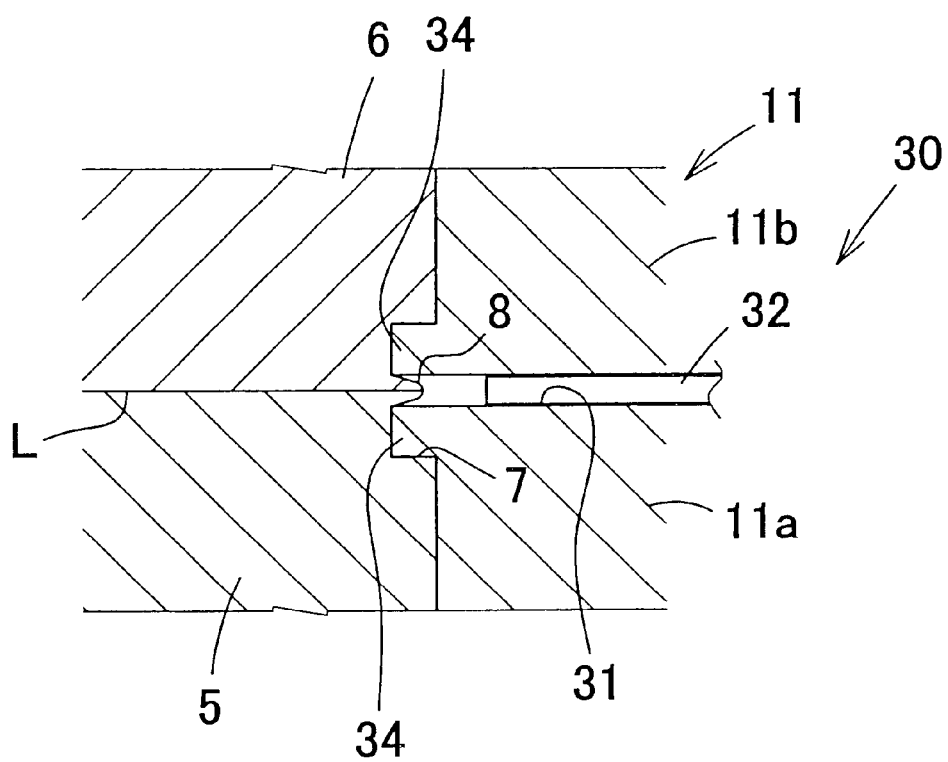
FIG. 6 is a longitudinal sectional view of a section of a mold containing a projecting portion.

As shown in FIGS. 3 and 6, a first element of the first embodiment resides in providing the core mold 11 (which has passage orifices 31 formed therein) with projecting portions 34 that project into the mold cavity 13 along passage orifices 31, with the opening of each passage orifice 31 on the mold cavity 13 side being situated medially in the cross direction of projecting portions 34, whereby flash 8 projects from the bottom face of the recess 7 produced by projecting portions 34 so that flash 8 does not project out from visible surfaces of core 1. Where passage orifices are provided to cavity mold 12, projecting portions situated along passage orifices are provided to cavity mold 12. The specific mechanism by which flash 8 forms will be described later in the discussion of the molding method.

In preferred practice, projecting portions 34 will be of unitary structure with core mold 11; however, they may be composed of discrete elements from core mold 11 and fixed to core mold 11 by means of welds, bolts, or the like. To improve release of the core 1, the cross section of projecting portions 34 is a trapezoid having a draft, or partially rounded (dome shaped).

The height of projecting portions 34 is greater than the height of the flash 8 formed by passage orifices 31, for example, 3–12 mm. Due to considerations pertaining to strength/rigidity of projecting portions 34, projecting portion 34 width is from 3 to 10 times passage orifice 31 width.

When a car bumper core 1 is fabricated using this in-mold foam molding apparatus 10, flash 8 forms on core 1 at locations corresponding to those of passage orifices 31. As shown in FIG. 2, however, this flash 8 projects from the bottom face of the recess 7 produced in core 1 by projecting portions 34 and as such does not project out from visible surfaces of core 1. Thus, without removing the flash 8 from core 1, core 1 can be tightly attached to the front face of a front beam with no gap therebetween, so processes for removing the flash 8 can be omitted with no adverse impact on car bumper quality, reducing fabrication costs of the core 1.

A second element of the first embodiment resides in the fact that partitioned molding sections 11a, 11b (see FIG. 7) defining adjacent partitioned mold chambers 13A, 13B in core mold 11 are unitary at medial locations of passage orifices 31 so as to prevent change in the aperture width of passage orifices 31 due to strain produced by expansion and contraction of core mold 11 caused by steam or cooling water.

Specifically, through unitary formation of fixed partitioning members 40 that extend towards the cavity mold 12 from locations on core mold 11 corresponding to corners and bottom edge of interface L to create partitioned molding sections 11a, 11b unified via the basal portions of fixed partitioning members 40 as connecting portions 41, relative motion of partitioned molding sections 11a, 11b is prevented so as to prevent change in the aperture width of passage orifices 31. The provision of fixed partitioning members 40 allows for a simple linear configuration to be used for passage orifices 31, thus effectively preventing expansion and contraction of the aperture width of passage orifices 31 and deformation of passage orifices 31 due to expansion and contraction of the core mold 11. By preventing expansion and contraction of the aperture width of passage orifices 31 and deformation of passage orifices 11 in this way, smooth extension/retraction motion of moveable partitioning members 32 is assured while allowing the aperture width of passage orifices 31 to be made narrower so as to prevent flash from forming due to infiltration of bead starting materials between moveable partitioning members 32 and the core mold 11.

Fixed partitioning members 40 may be shaped to any desired configuration, examples being the circular and semicircular rods shown in FIG. 7, or square or oval rods. As shown in FIGS. 1 and 7(a), fixed partitioning members 40 produce through-holes 9a and recesses 9b in core 1, so the cross section of fixed partitioning members 40 should be as small as possible so that through-holes 9a and recesses 9b are as small as possible. Fixed partitioning members 40 may be of unitary construction with core mold 11 or fabricated as discrete elements from core mold 11 and fixed to core mold 11 by welds, beads, etc. The side faces of fixed partitioning members 40 may be provided with guide recesses for guiding the edges of moveable partitioning members 32 in the extension/retraction direction thereof. In preferred practice, fixed partitioning members will be provided with draft to facilitate release of core 1.

The discussion now turns to other embodiments representing partial modifications of the design of the partitioning means 30.

(1) As with the partitioning means 30A depicted in FIGS. 8(b)(c), there may be provided in a unitary construction a fixed partitioning member 42 of wall form extending towards cavity mold 12 from a location corresponding to that of the top face of low expansion portion 5 in core mold 11, whereby inner and outer partitioned molding sections 11a, 11b are unified via the basal portion of fixed partitioning member 42 as a connecting portion 43, thus preventing change in the aperture width of passage orifice 31.

With this arrangement, shown in FIG. 8(a), fixed partitioning member 42 produces a through-hole 9A in core 1A, and thus as with the fixed partitioning members 40 described earlier, the cross section of fixed partitioning member 42 should be as small as possible in order to minimize the size of through-hole 9A. The side edges of fixed partitioning member 42 may be provided with guide recesses for guiding the edges of moveable partitioning members 32 in the extension/retraction direction thereof (2) As with the partitioning means 30B depicted in FIGS. 9(b)(c), there may be provided at a location corresponding to that of the top face of low expansion portion 5 in core mold 11 a fixed partitioning member 45 having a plurality of teeth 44 arranged in a row and extending towards cavity mold 12, whereby inner and outer partitioned molding sections 11a, 11b are unified via intervals between the teeth 44 of partitioning member 45 as connecting portions 46; or as with the partitioning means 30C depicted in FIGS. 10(b)(c), fixed partitioning members 45 may be provided at locations corresponding to the left and right side faces of low expansion portion 5 in core mold 11, whereby inner and outer mold 11, 12 sections are unified via portions between the teeth 44 in core mold 11 as connecting portions 46, thus preventing change in the aperture width of passage orifice 31.

Teeth 44 may be composed of members of long narrow rod or pipe form, and the exterior shape thereof may be a polygon, circle, oval, or any other exterior shape. The material for teeth 44 may be any material such as a metal material, synthetic resin material, or ceramic material, provided that the material can withstand the bead filling pressure and the heat to which it will be subjected during heating and fusing of the bead starting materials. Where partitioning means 30B or 30C is employed, through-holes 9B, 9C form in core 1B, 1C at locations corresponding to those of teeth 44, as shown in FIGS. 9(a) and 10(a), so tooth 44 diameter should ideally be as small as possible. Tooth 44 diameter is 1–10 mm for example, and preferably 1.5–5 mm. It is preferable for teeth 44 to narrow at their distal ends, since this improves release of core 1.

The gap between adjacent teeth 44 should be such that bead starting materials are not able to pass therethrough. If this gap is too small, adequate fusion of bead starting materials packed into adjacent partitioned mold chambers 13A, 13B cannot be assured and the strength of the molded article will be lowered, so a size equivalent to 30–90% of bead starting material diameter, and preferably 50–80%, is preferred. However, in cases where it is desirable to be able to split a molded article at the interfaces of portions of the molded article consisting of beads of different properties, teeth 44 may be given a large cross section, or teeth 44 may be of strip configuration, so as to narrow the gap between the teeth 44.

Figure 9:
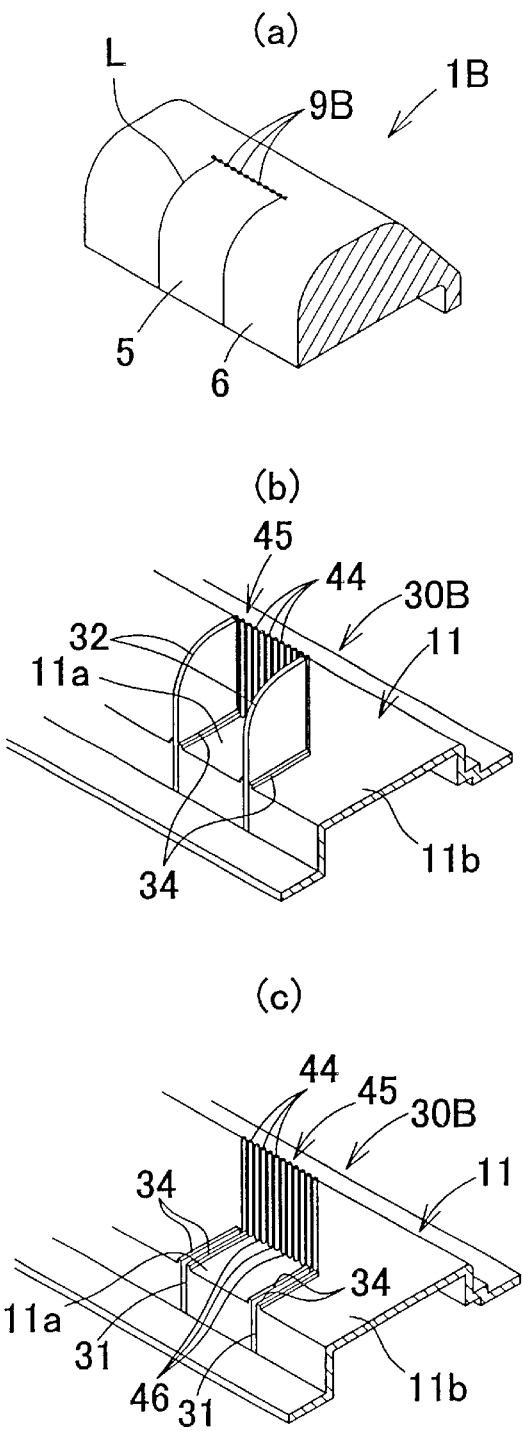
FIG. 9(a) is a perspective view of yet another core design and FIG. 9(b) and FIG. 9(c) are illustrative diagrams of a molding apparatus for molding the core.

In the partitioning means 30B, 30C depicted in FIGS. 9 and 10, a plurality of teeth 44 are implanted directly in core mold 11, but an alternative arrangement wherein a plurality of teeth 44 are implanted at a given spacing in a support member of rod or tabular form, which is then fixed to core mold 11, is also possible. Some of the plurality of teeth 44 may be implanted on the cavity mold 12. For example, a plurality of teeth 44 arranged in rows may be implanted in alternating fashion in core mold 11 and cavity mold 12.

(3) As with the partitioning means 30D depicted in FIGS. 11(b)(c), moveable partitioning members 32 provided at locations corresponding to the left and right side faces of low expansion portion 5 may be arranged in core mold 11, and a moveable partitioning member 32D may be arranged in cavity mold 12 at a location corresponding to that of the top face of low expansion portion 5, whereby inner and outer partitioned molding sections 11a, 11b are unified via a connecting portion 47 located in the portion of core mold 11 facing the moveable partitioning member 32D on the cavity mold 12, thus preventing change in the aperture width of passage orifice 31.

With this arrangement, there is no formation of through-holes, etc. at the interface of low expansion portion 5 and high expansion portion 6 in core 1D, so the appearance of core 1D is improved.

It is possible to situate some or all of fixed partitioning members 40, 42, 45 on the cavity mold 12. Where a plurality of partitioning means are employed in an in-mold foam molding apparatus a combination of partitioning means of different designs may be used.

In the present embodiment, low expansion portion 5 and high expansion portion 6 are divided along an interface L of "C" shaped configuration viewed from the front, but where another configuration, for example, an "L" shaped, crank, or linear configuration, is used, fixed partitioning members will basically be arranged at the two ends, corners, or sides of the interface so that the passage orifice is linear, or where the passage orifice is linear but also very long, fixed partitioning members will be arranged in medial portions thereof.

Figure 12:
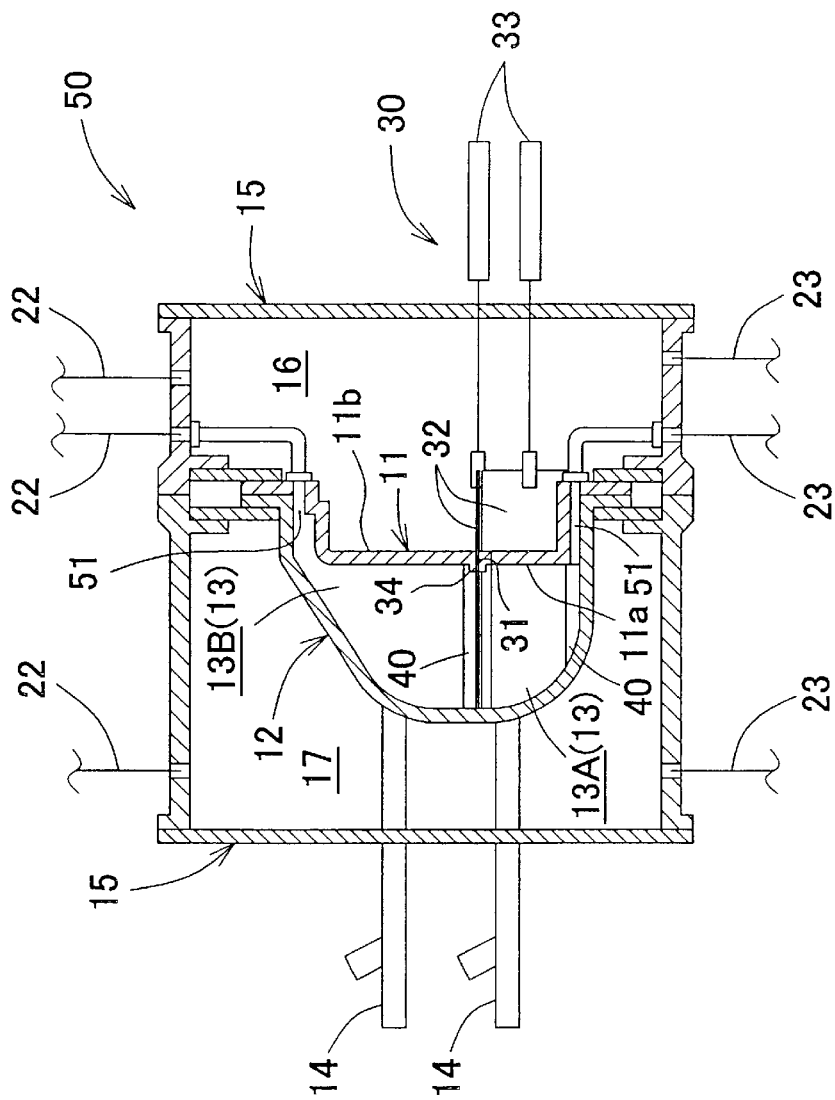
FIG. 12 is a longitudinal sectional view of a molding apparatus of another design.

In place of in-mold foam molding apparatus 10 it is alternatively possible to use the in-mold foam molding apparatus 50 depicted in FIG. 12, wherein the core mold 11 and cavity mold 12 are completely or largely devoid or air orifices 18. With this arrangement, even with the core mold 11 and cavity mold 12 closed, clearance 51 communicating with mold cavity 13 is formed at the parting line of the two molds 11, 12, whereby, via clearance 51 independently of the two chambers 16, 17, steam or other service fluid may be supplied to mold cavity 13, or a drain or the like may be outlet from mold cavity 13. With molding apparatus 50, it is possible to fabricate a core 1 having an attractive surface devoid of marks produced by air orifices 18, and to prevent the decline in strength in molds 11, 12 associated with formation of air orifices 18 therein, thereby allowing the walls of molds 11, 12 to be made thinner, reducing the heat capacity thereof. This has the effect of improving heating and cooling efficiency so as to improve the accuracy of temperature control; drastically reducing the costs associated with machining the air orifices 18 so as to reduce the fabrication costs of molds 11, 12; eliminating heating defects, release defects, and cooling defects due to clogging of air orifices 18, and obviating the need for maintenance operations such as replacement or periodic high pressure washing of the core vents 19; eliminating penetration of cooling water used in cooling processes into the mold cavity 13 so that the water content of core 1 can be held to about 0.5–2% (versus 6–10% in the conventional art), thus obviating the need for a drying process, contributing to shorter cycle time; and providing other advantages.

As molds 11, 12 of in-mold foam molding apparatus 50 are devoid of air orifices 18 such as core vents 19 and core vent holes 21, the air used for the bead filling operation is expelled via clearance 51; since clearance 51 is present only over an extremely limited area, where tabular members are employed as the moveable partitioning members 32, it is desirable to provide the moveable partitioning members 32 with through-holes or slits of a size that does not allow passage of the bead starting materials, so that the air used for filling can be expelled smoothly. In partitioned mold chambers 13A, 13B, such through-holes or slits may be provided in greater numbers in portions that are not readily filled with bead starting materials than in other portions, so that these difficult-to-fill portions are adequately filled with bead starting materials.

In the present embodiment, the side face configuration of the distal edge of moveable partitioning member 32 differs from the side face configuration of the opening of passage orifice 31, but where the two are of identical configuration, formation of flange 8 on core 1 may be prevented by retracting moveable partitioning members 32 in such a way that the distal edges of moveable partitioning members 32 are situated coplanar with the openings and the openings of passage orifices 31 are entirely closed off by moveable partitioning members 32, or where these elements have approximately identical configuration, by retracting moveable partitioning members 32 in such a way that the distal edges of moveable partitioning members 32 are situated coplanar with the openings or project therefrom.

In the present embodiment, there are described in-mold foam molding apparatuses 10, 50 used for fabrication of an in-mold foam molded article for use as a car bumper core 1; however, the invention may be embodied analogously in molding apparatuses for fabricating molded articles other than cores 1.

An exemplary molding method for a core 1 employing the molding apparatus 10 shown in FIG. 3 is now described. First, to fill partitioned mold chambers 13A, 13B with bead starting materials, core mold 11 and cavity mold 12 are shut and moveable partitioning members 32 are extended therein so that mold cavity 13 is partitioned into a plurality of partitioned mold chambers 13A, 13B by means of moveable partitioning members 32 and fixed partitioning members 40.

Next, bead starting materials of different qualities, carried on a stream of air, are delivered individually to partitioned mold chambers 13A, 13B by filling units 14 to fill the mold cavity 13 with bead starting materials. In the present embodiment, for the purpose of molding a car bumper core 1, partitioned mold chambers 13A are filled with a bead starting material having an expansion factor of 5, and partitioned mold chamber 13B is filled with a bead starting material having an expansion factor of 20 (the expansion factor of the bead starting materials can be selected with reference to considerations such as the strength desired of the core 1). Depending on the intended use of the molded article, the chambers may be filled with bead starting materials differing in properties other than expansion factor, such as bead bulk density, cell diameter, bead diameter, material, and the like. Where polyolefin resin beads are employed as the bead starting materials, the expansion force of the bead starting materials may be increased by first placing the bead starting materials in an inclusion tank (not shown) and injecting a 0.03–0.2 MPa inorganic gas into the bead starting materials prior to packing the bead starting materials into the mold. Various filling methods known in the art, such as cracked filling, pressure filling, compression filling, or the like, may be employed in the bead filling operation.

Next, the moveable partitioning members 32 are completely retracted from the mold cavity 13 so that the bead starting materials filling adjacent partitioned mold chambers 13A, 13B come into contact with each other. At this time, some of the openings of passage orifices 31 are blocked by the front edges of the moveable partitioning members 32, while in others the front edges of the moveable partitioning members 32 are retracted into the passage orifices 31 so that the spaces within these passage orifices 31 communicate with mold cavity 13. However, since bead starting material diameter is greater than the aperture width of passage orifices 31, bead starting materials do not enter passage orifices 31 simply because the moveable partitioning members 32 situated therein have been retracted. The timing for retracting the moveable partitioning members 32 may be at any point after the bead filling operation during the bead starting material heating/fusing operation (described next), provided that the bead starting materials have not yet fused together.

Next, the bead starting materials are heated by delivering steam to the mold cavity 13 via the two chambers 16, 17 and air orifices 18, and steam pressure is then released to expand the bead starting materials, whereby the bead starting materials fuse together with substantially no spaces therebetween. At this time, some air remains in spaces between bead starting materials, reducing bonding, so an operation to replace the air in the two chambers 16, 17 and in mold cavity 13 with steam is performed in advance. Due to the expansion pressure created at this time, some of the bead starting materials infiltrate passage orifices 31, as shown in FIG. 6, forming flash 8 that projects from the outside surface of core 1; however, as passage orifices 31 open onto projecting portions 34, the flash 8 formed by passage orifices 31 forms on the bottom faces of the recesses 7 produced by projecting portions 34 and does not project from visible faces of core 1.

Next, cooling water is directed onto core mold 11 and cavity mold 12 from nozzles (not shown) to cool the core 1 within the mold cavity 13. Molds 11, 12 are then parted, with the core 1 remaining on the cavity mold 12. Core 1 is then released from cavity mold 12 by means of an ejector pin (not shown).

As noted, a core 1 produced in the preceding manner will be devoid of projecting flash 8 formed on the visible surfaces of core 1 by the passage orifices 31, whereby in the event that the back face of core 1 is attached to the front face of the front beam of a car without conducting a process for removing flash 8, the core 1 may nevertheless be attached tightly to the front face of the front beam with no gap therebetween, even in the absence of a process for removing flash 8. The process for removing flash 8 may therefore be dispensed with without any adverse effect on product quality, affording a simpler molding operation for core 1. Since molded article is conducted with the fixed partitioning members 40 left In situ within mold cavity 13, through-holes 9a and recesses 9b form in core 1 in locations corresponding to those of the fixed partitioning members 40, but, as noted, the provision of the fixed partitioning members 40 has the offsetting advantage of preventing expansion/contraction of passage orifice 31 aperture width and deformation of passage orifices 11 due to mold expansion or contraction, thereby assuring smooth movement of the moveable partitioning members 32 while at the same time allowing the passage orifice 31 apertures to be made narrower so as to prevent the formation of flash by infiltration of bead starting materials between the moveable partitioning members 32 and the core mold 11.

Where the in-mold foam molding apparatus 50 described earlier is employed, the core mold 11 and cavity mold 12 are devoid of air orifices 18 in those molding sections which mold prominent areas of the outside face of a core 1, so filling air delivered to the mold cavity 13 together with the bead starting materials during the bead filling operation is expelled from mold cavity 13 via clearance 51. To heat and fuse the bead starting materials with steam, steam is delivered to chambers 16, 17, and steam is also delivered to mold cavity 13 via clearance 51. The timing for retraction of the moveable partitioning members 32 can be the same as that in a molding method employing the air orifices 18 described earlier.

The preceding embodiment describes partitioning means furnished with both the first element, namely, the element of providing to the mold projecting portions 34 formed along the passage orifices 31 for moveable partitioning members 32 in order to prevent the formation of flash 8 projecting from visible surfaces of the core 1, and the second element, namely, the element of a unitary construction for partitioned molding sections 11a, 11b in order to prevent expansion/contraction and deformation of passage orifice 31 aperture width. However, the invention also encompasses means furnished with one or more of these elements.

Figure 14:
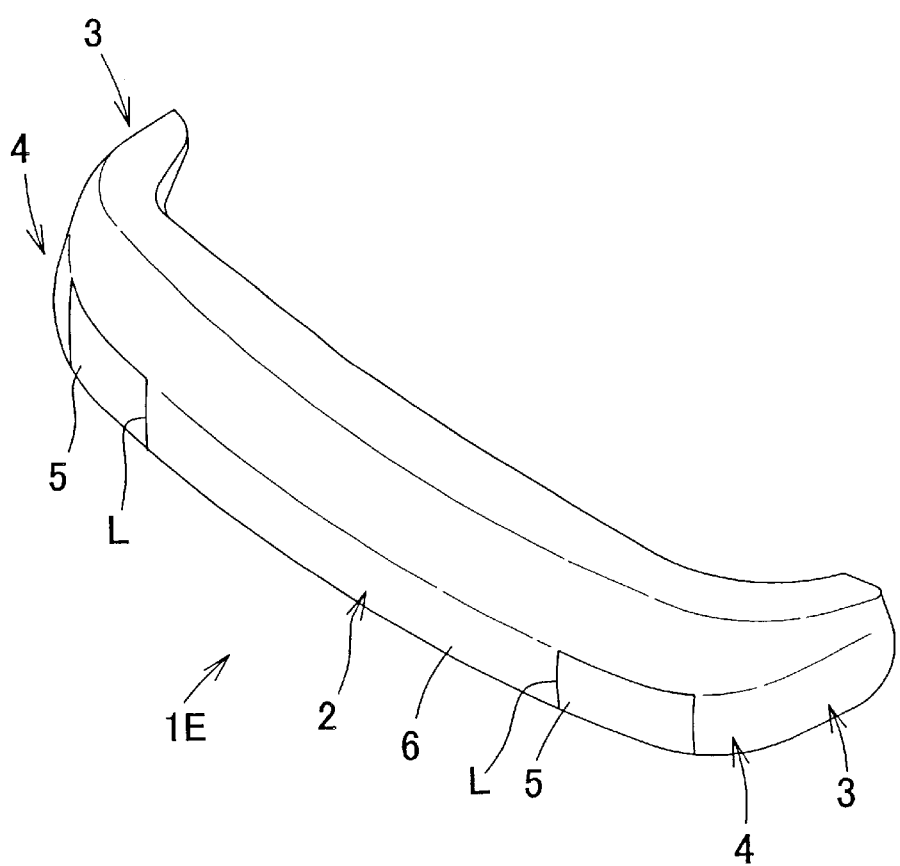
FIG. 14 is a perspective view of the above core.

For example, a molding apparatus having an arrangement known in the art, such as the partitioning means 30E depicted in FIGS. 13(b)(c) wherein the core mold 11 has formed therein a passage orifice 31 connected in an approximately "C" shaped configuration, with each side of passage orifice 31 having extendably/retractably installed therein a moveable partitioning member 32 situated facing a side edge thereof, may be additionally provided with the arrangement of the second element, namely, projection portions 34 formed along the passage orifices 31.

Where partitioning means 30E are employed, referring to FIGS. 13(a) and 14, the interface L of low expansion portion 5 and high expansion portion 6 in core 1E is devoid of through-holes and the like, so that the core 1E is improved in appearance. While expansion/contraction and deformation of passage orifice 31 cannot be prevented, an offsetting advantage is that flash 8 is prevented from projecting from visible surfaces of core 1, so the arrangement is effective for use in relatively small molding apparatuses which experience minimal expansion/contraction and deformation of passage orifice 31.

While the embodiment describes a molding method for molding a car bumper core 1, the invention may be embodied analogously in molding of in-mold foam molded articles other than cores 1.

Second Embodiment

According to a second embodiment, the mold cavity is partitioned into a plurality of partitioned mold chambers by means of fixed partitioning members exclusively. Elements analogous to those in the preceding first embodiment shall be assigned the same symbols and will not be described in detail.

The discussion turns first to an in-mold foam molded article for use as a core for a car bumper.

Figure 15:
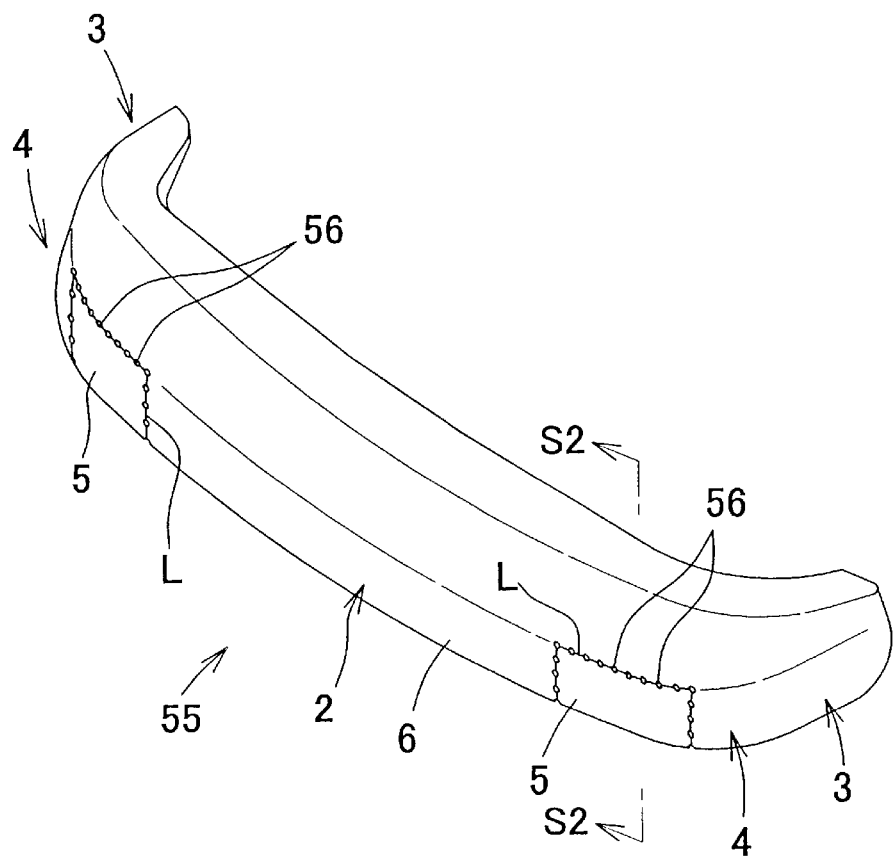
FIG. 15 is a perspective view of an automobile bumper core pertaining to a second embodiment.
Figure 16:
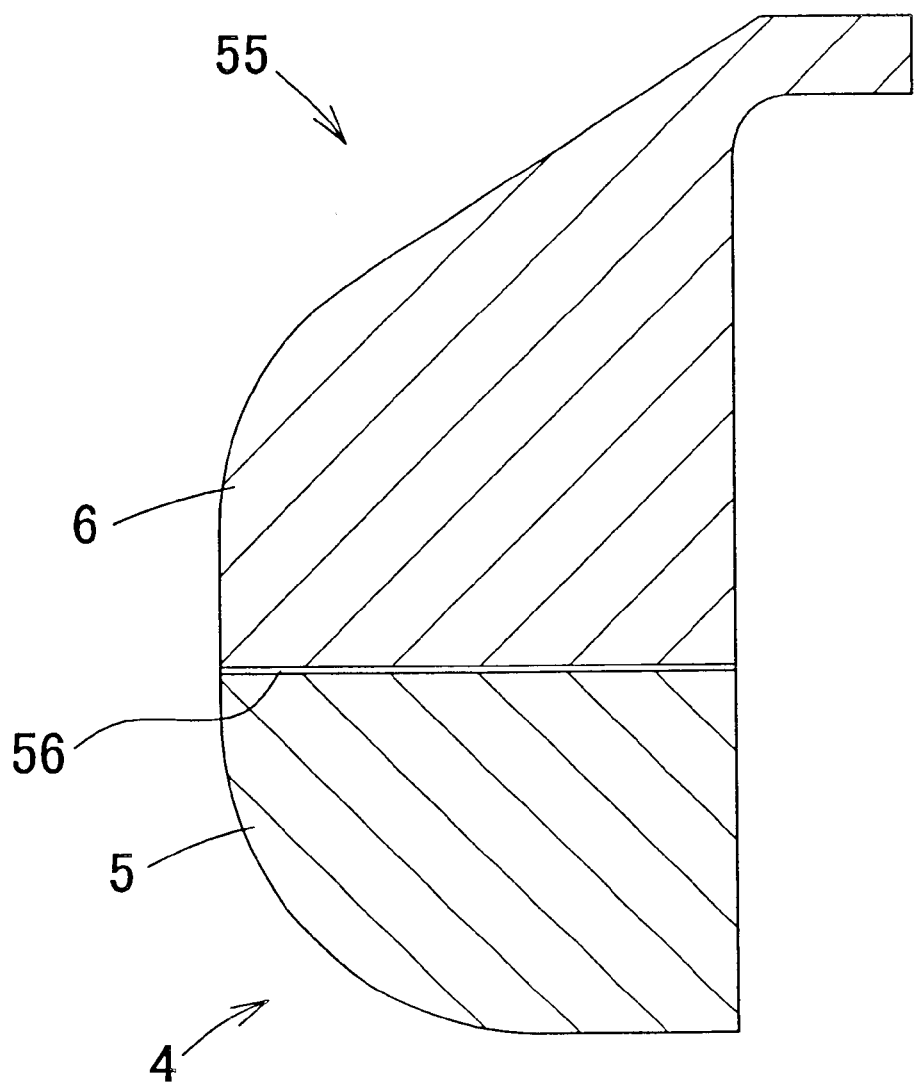
FIG. 16 is a sectional view taken along line S2—S2 in FIG. 15.

Referring to FIGS. 15 and 16, this core 55, like the core 1 of the first embodiment, has a front impact absorbing portion 2 that curves gently backward at the two ends thereof, and side impact absorbing portions 3 that extend backward from the two ends of front impact absorbing portion 2. At the bottom half of each corner portion 4 extending from impact absorbing portion 2 to a side impact absorbing portion 3 is formed a low expansion portion 5 comprising bead starting materials with a low degree of expansion, the remaining portion being composed of a high expansion portion 6 comprising bead starting materials with a higher degree of expansion than low expansion portion 5.

Low expansion portion 5 and high expansion portion 6 are divided at an interface L of approximately "C" shaped configuration when viewed from the front, and a plurality of through-holes 56 passing through core 55 in the front-to-back direction thereof are formed at a given spacing along interface L. These through-holes 56 are formed as a result of core 55 being molded by in-mold foam molding apparatus 57, described later, and alternatively may consist of wells extending from the back face towards the front face of core 55, or from the front face towards the back face thereof.

As noted, while in core 55 there are formed a plurality of through-holes 56 passing through core 55 in the front-to-back direction thereof formed at a given spacing along interface L, flash does not project out from the surface of core 55 along interface L as in the conventional art, thereby allowing core 55 as-molded to be mounted tightly to the mounting face of the front beam of a car, without conducting a flash removal process. Where core 55 is sheathed with a cover member, formation of a gap between core 55 and cover member is prevented.

It is not necessary for interface L to have a "C" shaped configuration when viewed from the front: the core may be divided along an interface of "L" shaped configuration when viewed from the front, a linear configuration, or a curving configuration. In the present embodiment, a core 55 for a car bumper is described; the invention may, however, be embodied analogously in in-mold foam molded articles other than cores, provided that these molded articles have molded portions comprising bead starting materials of different properties. Depending on the molding, bead starting materials differing in properties other than their expansion factor, e.g., bead starting materials differing in properties such as the bulk density of the beads, cell diameter, bead diameter, material, and the like, may be employed to produce molded articles suitable for the conditions under which it will be used. The bead starting materials for core 55 may consist of the materials identical to those used in the first embodiment.

An in-mold foam molding apparatus 57 capable of molding this core 55 is now described. Apart from the partitioning means, the design is the same as in the first embodiment, and accordingly elements analogous to those therein shall be assigned the same symbols and will not described in detail.

Referring to FIGS. 17 to 20, partitioning means 60 comprises a fixed partitioning member 63 having a plurality of teeth 61 and a support member 62 supporting these in cantilever fashion; and a receiving member 65 having retaining orifices 64 for retaining the distal ends of teeth 61. Fixed partitioning member 63 is fixed to the cavity mold 12 and receiving member 65 is fixed to the core mold 11 such that with the molds 11, 12 closed, the mold cavity 13 is partitioned by fixed partitioning members 63 into a plurality of partitioned mold chambers 13A, 13B. Each of the partitioned mold chambers 13A, 13B is supplied with bead starting materials by a corresponding filling unit 14. In the present embodiment, three fixed partitioning members 63 and three receiving members 65 are respectively arranged in "C" configuration; it is alternatively possible to employ partitioning members and receiving members of unitary structure of "C" configuration.

Teeth 61 are composed of elongate rod or pipe members that extend in the direction of parting of molds 11, 12. With the molds 11, 12 closed, the distal end portions thereof are retained inserted into the retaining orifices 64 of receiving member 65, arranged transversely across the mold cavity 13 between molds 11, 12.

Teeth 61 are composed of elongate rod or pipe members, and the exterior shape thereof may be a polygon, circle, oval, or any other exterior shape. The material for teeth 61 may be any material such as a metal material, synthetic resin material, or ceramic material, provided that the material can withstand bead filling pressure and the heat to which it will be subjected during heating and fusing of the bead starting materials. Where partitioning means 60 is employed, core 55 will have formed therein through-holes 56 at locations corresponding to those of the teeth 61, as shown in FIGS. 15 and 16, and thus in preferred practice the diameter of teeth 61 will be as small as possible. Tooth 61 diameter is 1–10 mm and preferably 1.5–5 mm. In preferred practice, teeth 61 will be fabricated of an elastically deformable material. By so doing, teeth 61 can recover to their original shape after undergoing deformation of the teeth due to filling pressure or expansion pressure, thus preventing filling defects or molding defects due to plastic deformation of teeth 61, while at the same time minimizing the sectional area of each tooth 61, whereby diminished appearance and lowered strength in molded articles may be held in check. The gap T between adjacent teeth 61 is such that at least one of the bead starting material materials filling adjacent partitioned mold chambers 13A, 13B cannot pass therethrough. If this gap T is too small, adequate fusion of bead starting materials contained in adjacent partitioned mold chambers 13A, 13B cannot be assured, resulting in diminished strength in the molded article. Accordingly, the gap should be equal to 30–90%, and preferably 50–80%, of the diameter of the bead starting materials whose passage is to be prevented.

In the present embodiment, the cavity mold 12 is provided with an ejector pin (not shown), and therefore the fixed partitioning members 63 are fixed to the cavity mold 12 and the receiving members 65 are fixed to the core mold. However, where the ejector pin is situated in the core mold 11, preferred practice is to fix the fixed partitioning members 63 to the core mold 11 and fix the receiving members 65 to the cavity mold 12. That is, since a mold provided with fixed partitioning members 63 has greater release resistance due to sticking between the teeth 61 and the core 55, by providing the fixed partitioning members 63 to the mold having the ejector pin, it is possible to ensure that the molded article will remain on the mold having the ejector pin when the molds are parted, thus preventing release defects due to the molded article remaining on the mold devoid of an ejector pin. Since adequate release resistance cannot be assured where the teeth 61 are too short or not numerous enough, it may occur that the molded article will not remain on the mold having the ejector pin; accordingly, for the purpose of increasing release resistance of core 55, the medial portions or distal portions of teeth 61 may be provided with release resistance increasing portions of tumescent spherical or conical shape, or by providing teeth 61 with reverse taper, so as to increase the release resistance thereof. Where the teeth 61 are too long or too numerous, release resistance of the molded article becomes excessively high, so release resistance of core 55 may be reduced by adopting a tapered configuration for teeth 61.

The support member 62 may be of any design capable of supporting in cantilever fashion a plurality of teeth 61 arranged at given spacing. Receiving member 65 is intended to prevent changes in teeth 61 spacing due to bending of the teeth 61; however, the element may be dispensed with in cases where bending of the teeth 61 is negligible, and may be omitted where, for example, teeth 61 have large diameter, the molded article being fabricated is rather thin, or the retaining orifices 64 are formed directly in the core mold 11. Teeth 61 may be designed so that the distal ends thereof do not contact the core mold 11; in such cases, the holes produced by the teeth 61 will take the form of wells, as a result of which, at a minimum, the molding surface molded by the core mold 11 will be devoid of holes, so that the appearance of the molded article is not diminished excessively.

The discussion now turns to other embodiments representing partial modifications of the design of the partitioning means 60. Elements analogous to those in the preceding embodiment shall be assigned the same symbols and will not be described in detail.

Figure 21:
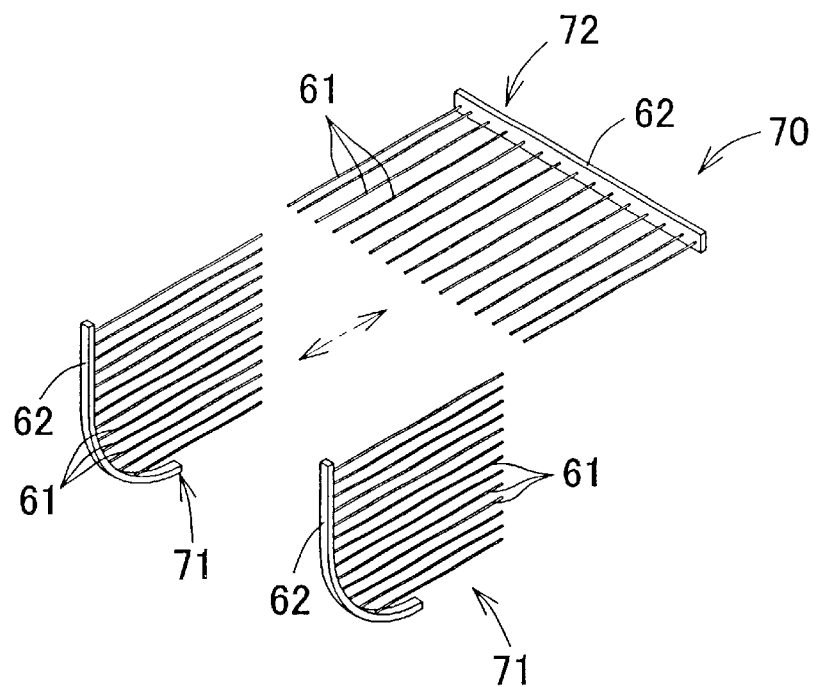
FIG. 21 is a illustrative diagram of partitioning means of another design.

(1) As with the partitioning means 70 depicted in FIG. 21, a set of left and right first fixed partitioning members 71 may be fixed to the cavity mold 12, and a top second fixed partitioning member 72 fixed to the core mold 11. With this arrangement, when the molds 11 and 12 are parted to release the molded article, the teeth 61 of the core mold 11 (which is devoid of an ejector pin) withdraw from the molded article, and the correspondingly lower release resistance facilitates release of the molded article using the ejector pin. By providing the first fixed partitioning member 71 fixed to the cavity mold 12 with teeth 61 in greater numbers than the teeth 61 provided to the second fixed partitioning members 71 fixed to the core mold 11, it is possible to assure that the molded article remains on the cavity mold 12 (which has an ejector pin) when the molds 11, 12 are parted.

Figure 22:
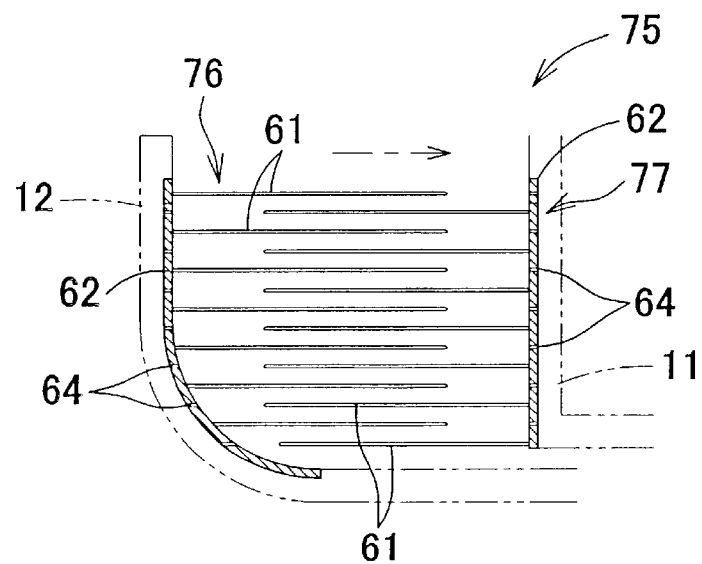
FIG. 22 is an illustrative diagram of partitioning means of yet another design.

(2) Partitioning means 75 wherein the plurality of teeth 61 arranged along interface L in order to partition the mold cavity 13 are fixed in alternating fashion to a first fixed partitioning member 76 fixed to cavity mold 12 and a second fixed partitioning member 77 fixed to core mold 11, as depicted in FIG. 22, may be employed as well. With this arrangement, the withdrawing force of teeth 61 can be made to act on the molded article in a balanced manner when the molds 11, 12 are parted.

Where a first fixed partitioning member 76 and second fixed partitioning member 77 of this kind are employed, in preferred practice, the spacing of the teeth 61 of the first fixed partitioning member 76 and the spacing of the teeth 61 of the second fixed partitioning member 77 will each be such that at least one of the bead starting materials filling partitioned mold chambers 13A, 13B cannot pass therethrough.

By doing so, passage of bead starting materials between adjacent partitioned mold chambers 13A, 13B can be prevented, even without extending the distal ends of the teeth 61 of the first fixed partitioning member 76 and of the second fixed partitioning member 77 as far as the inside wall of the other mold, simply by overlapping by a certain extent the distal ends of the teeth 61 of the fixed partitioning members 76, 77 in the direction of mold parting. It is therefore possible to make the teeth 61 of the fixed partitioning members 76, 77 shorter, thereby improving release of the molded article and minimizing the action of bending moment on the teeth 61, whereby teeth 61 of smaller diameter can be used so that the diameter of the wells formed in the molded article by the teeth 61 is smaller. Since tooth 61 length may be set roughly, it can readily be modified in accordance with a change in the shape of the molded article or the like, and in cases where a crack is maintained between the two molds as they are filled with the bead starting materials (such in cracked filling), by designing the lap of the teeth 61 of the two fixed partitioning members 76, 77 to exceed the width of the crack, adjacent partitioned mold chambers can be kept partitioned.

Distribution of the teeth fixed to the first fixed partitioning member and the teeth fixed to the second fixed partitioning member can be set arbitrarily depending on partition configuration and the like, and is not limited to partitioning means 70, 75 described previously.

Alternatively, as with the partitioning means 80 depicted in FIG. 23, fixed partitioning members 81 of rod shape may be provided in unitary fashion with the core mold 11 or cavity mold 12 at locations corresponding to corners or ends of the interface L between the low expansion portion 5 and the high expansion portion 6; or as with the partitioning means 85 depicted in FIG. 24, a fixed partitioning member 86 of wall form may be provided in unitary fashion with the core mold 11 or cavity mold 12 at a medial location on interface L between the low expansion portion 5 and the high expansion portion 6. With these arrangements, throughholes 87 and recesses 88 are formed in core 55A by fixed partitioning members 81, as shown in FIG. 23, or a throughhole 89 of slot form is formed in core 55B by fixed partitioning member 86, as shown in FIG. 24; however, an offsetting advantage is that thin-wall portions or the like in a molded article, which are difficult to partition using teeth 61, can be partitioned by means of fixed partitioning members 81, 86, and are favorably employed for certain molding configurations. In the preceding embodiment, the plurality of teeth 61 provided to each partitioning member are arranged in the same plane so that the low expansion portion 5/high expansion portion 6 interface produced by each partitioning member is planar. However, by arranging teeth 61 in such a way that the interface formed thereby is of rectangular wave, triangular wave, or sine wave configuration, for example, the area of contact between adjacently located bead starting materials can be increased, improving bond strength between the two. In the preceding description, the interface L of low expansion portion 5 and high expansion portion 6 is of "C" shaped configuration viewed from the front, but other configurations, for example, an "L" shaped, crank, or linear configuration, are also possible within the scope of the invention.

Figure 25:
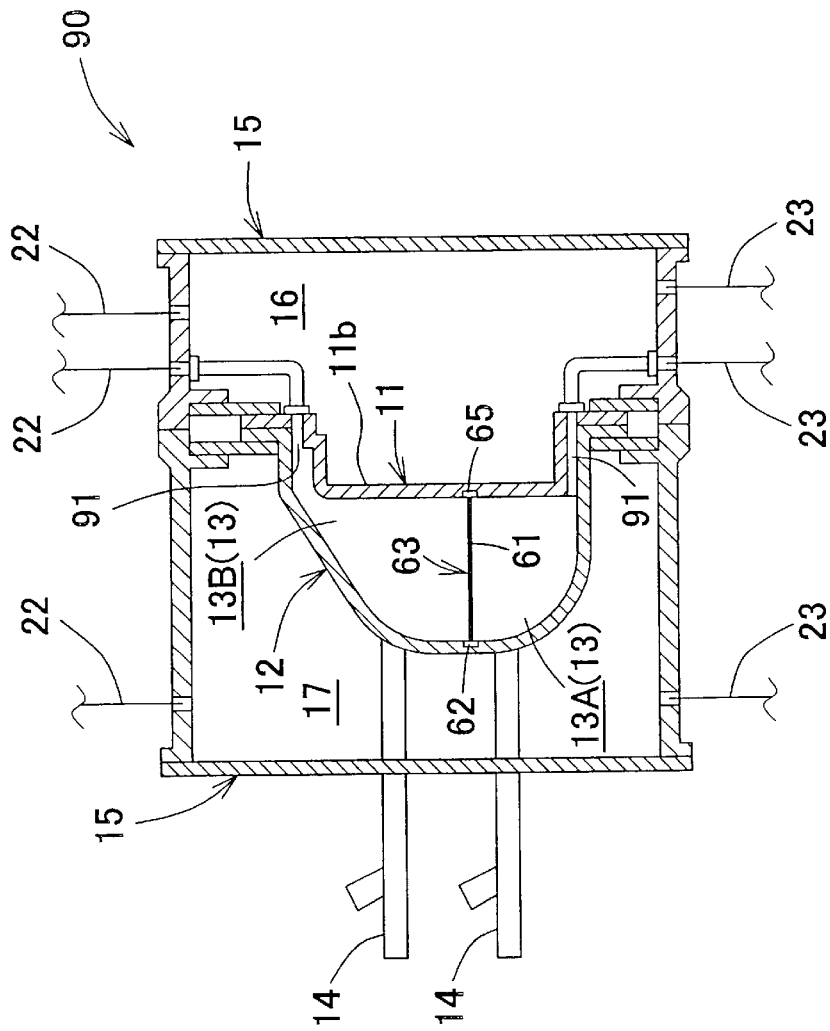
FIG. 25 is a longitudinal sectional view of a molding apparatus of another design.

In place of in-mold foam molding apparatus 57 it is alternatively possible to use the in-mold foam molding apparatus 90 depicted in FIG. 25, wherein the core mold 11 and cavity mold 12 are completely or largely devoid or air orifices 18. With this arrangement, even with the core mold 11 and cavity mold 12 closed, clearance 91 communicating with mold cavity 13 is formed at the parting line of the two molds 11, 12, whereby, via clearance 91 independently of the two chambers 16, 17, steam or other service fluid may be supplied to mold cavity 13, or a drain or the like may be outlet from mold cavity 13. With molding apparatus 90, it is possible to fabricate a core 55 having an attractive surface devoid of marks produced by air orifices 18, and to prevent the decline in strength in molds 11, 12 associated with formation of air orifices 18 therein, thereby allowing the walls of molds 11, 12 to be made thinner, reducing the heat capacity thereof. This has the effect of improving heating and cooling efficiency so as to improve the accuracy of temperature control; drastically reducing the costs associated with machining the air orifices 18 so as to reduce the fabrication costs of molds 11, 12; eliminating heating defects, release defects, and cooling defects due to clogging of air orifices 18, and obviating the need for maintenance operations such as replacement or periodic high pressure washing of the core vents 19; eliminating penetration of cooling water used in cooling processes into the mold cavity 13 so that the water content of core 55 can be held to about 0.5–2% (versus 6–10% in the conventional art), thus obviating the need for a drying process, contributing to shorter cycle time; and providing other advantages.

While the present embodiment describes in-mold foam molding apparatuses 57, 80 used for molding a core 55 for a car bumper, the invention may be embodied analogously in molding apparatuses used to produce molded articles other than cores 55.

Figure 17:
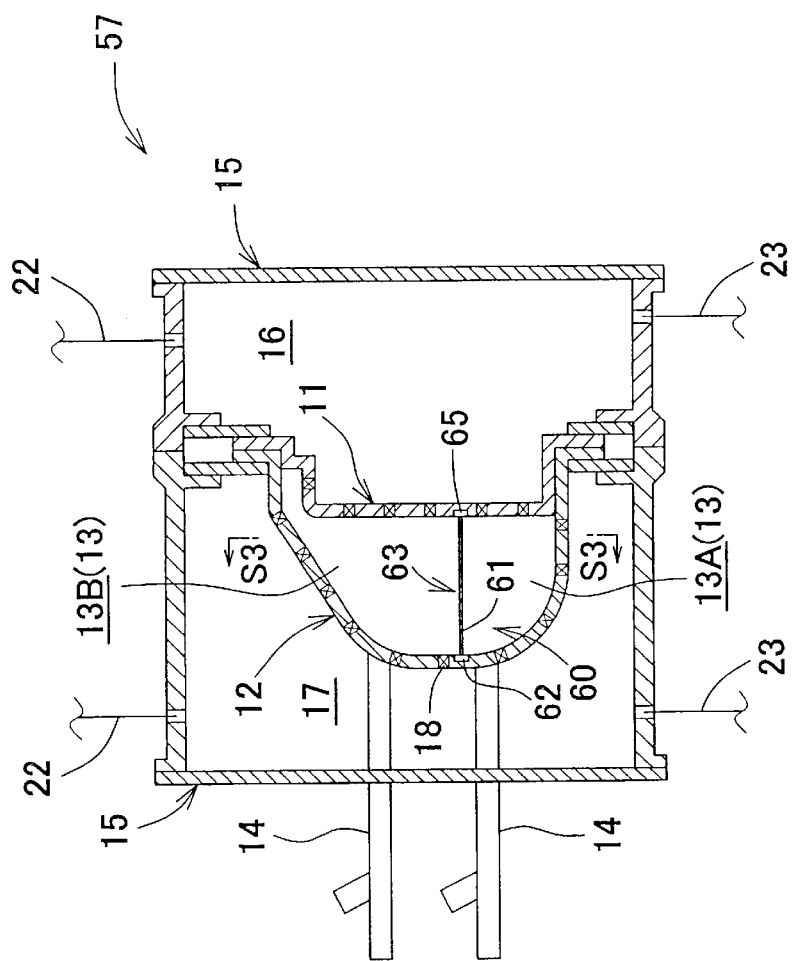
FIG. 17 is a longitudinal sectional view of an in-mold foam molding apparatus pertaining to a second embodiment.
Figure 18:
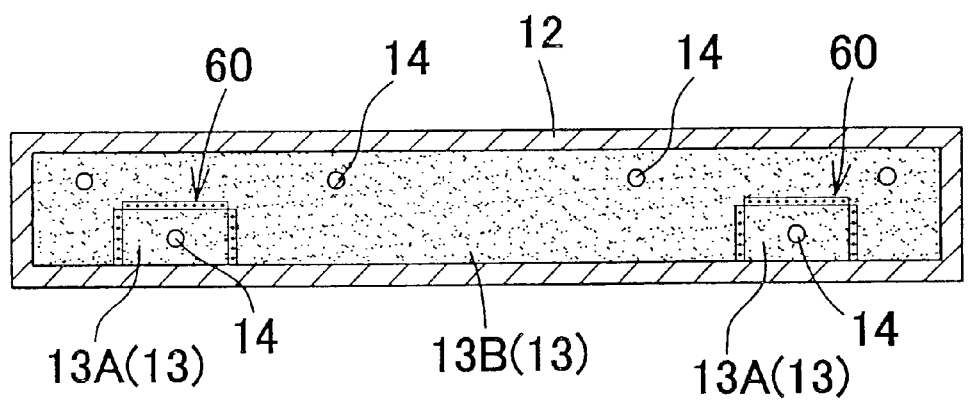
FIG. 18 is a sectional view taken along lines S3—S3 in FIG. 17.
Figure 19:
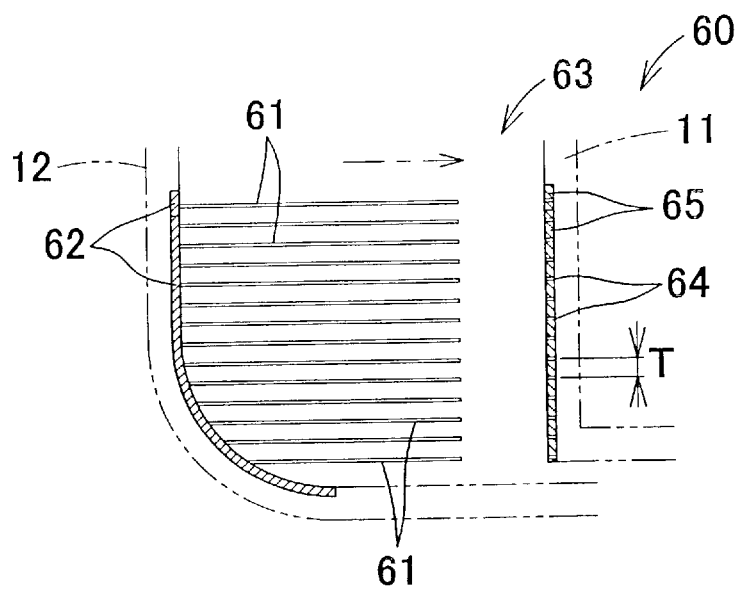
FIG. 19 is a illustrative diagram of partitioning means.
Figure 20:
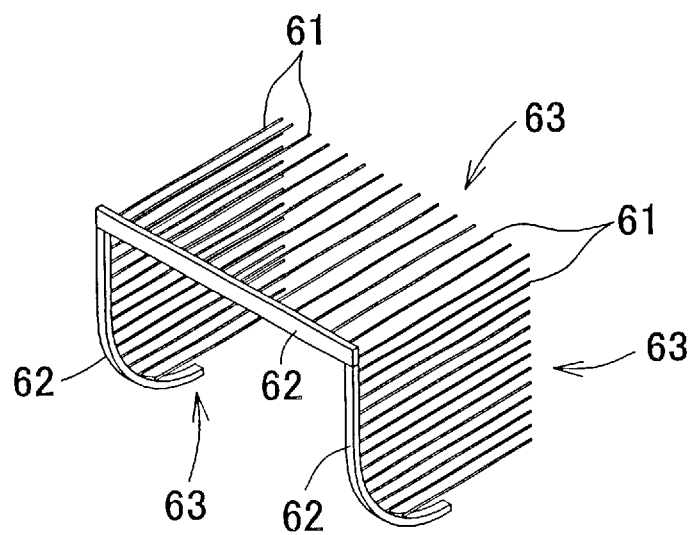
FIG. 20 is a perspective view of a partitioning member.

An exemplary molding method for a core 55 employing the molding apparatus 57 shown in FIG. 17 is now described.

First, to fill partitioned mold chambers 13A, 13B with bead starting materials, core mold 11 and cavity mold 12 are shut, and mold cavity 13 is partitioned into three partitioned mold chambers 13A, 13B by means of moveable partitioning members 63.

Next, bead starting materials of different qualities, having diameters greater than the spacing of teeth 61, are delivered individually by filling units 14 on a stream of air to partitioned mold chambers 13A, 13B to fill the mold cavity 13 with bead starting materials. The bead starting materials filling adjacent partitioned mold chambers 13A, 13B are in contact with one another via the gaps between teeth 61. In the present embodiment, for the purpose of molding a car bumper core 55, partitioned mold chambers 13A are filled with a bead starting material having an expansion factor of 5, and partitioned mold chamber 13B is filled with a bead starting material having an expansion factor of 20 (the expansion factor of the bead starting materials can be selected with reference to considerations such as the strength desired of the core 55). Depending on the intended use of the molded article, the chambers may be filled with bead starting materials differing in properties other than expansion factor, such as bead bulk density, cell diameter, bead diameter, material, and the like. Where polyolefin resin beads are employed as the bead starting materials, the expansion force of the bead starting materials may be increased by first placing the bead starting materials in an inclusion tank (not shown) and injecting a 0.03–0.2 MPa inorganic gas into the bead starting materials prior to packing the bead starting materials into the mold. Various filling methods known in the art, such as cracked filling, pressure filling, compression filling, or the like, may be employed in the bead filling operation.

Next, the bead starting materials are heated by delivering steam to the mold cavity 13 via the two chambers 16, 17 and air orifices 18, and steam pressure is then released to expand the bead starting materials, whereby the bead starting materials fuse together with substantially no spaces therebetween. At this time, some air remains in spaces between bead starting materials, reducing bonding, so an operation to replace the air in the two chambers 16, 17 and in mold cavity 13 with steam is performed in advance. Heating with steam also induces the bead starting materials present in adjacent partitioned mold chambers 13A, 13B to fuse together via the spaces between teeth 61.

Next, cooling water is directed onto core mold 11 and cavity mold 12 from nozzles (not shown) to cool the core 55 within the mold cavity 13. Molds 11, 12 are then parted. Since the cavity mold 12 is provided with fixed partitioning members 63, the release resistance of core 55 with respect to the cavity mold 12 is greater than the release resistance of core mold 11, and thus with molds 11 and 12 parted, the core 55 remains on the cavity mold 12. With the molds 11 and 12 parted and the core 55 remaining on the cavity mold 12 in this way, core 55 is released from the cavity mold 12 using an ejector pin (not shown).

Where the bead starting materials are composed of a first bead starting material of a diameter that cannot pass through teeth 61 and a second bead starting material that can pass through teeth 61, when the molding cavity 13 is being filled with the bead starting materials, the first bead starting material is packed into partitioned mold chamber 13B and the second bead starting material is then packed into partitioned mold chambers 13A. Since some of the first bead starting material moves through teeth 61 and enters partitioned mold chambers 13A, bonding between the first bead starting material and the second bead starting material can be further improved.

Where the in-mold foam molding apparatus 90 described earlier is employed, the core mold 11 and cavity mold 12 are devoid of air orifices 18 in those molding sections which mold prominent areas of the outside face of a core 55, so filling air delivered to the mold cavity 13 together with the bead starting materials during the bead filling operation is expelled from mold cavity 13 via clearance 91. To heat and fuse the bead starting materials with steam, steam is delivered to chambers 16, 17, and steam is also delivered to mold cavity 13 via clearance 91.

While the present embodiment describes an in-mold foam molding method for molding a core 55 for a car bumper, the invention may be embodied analogously in molding of molded articles other than cores 55.

Third Embodiment

This third embodiment pertains to the partitioning means of the preceding first and second embodiments, adapted for a molding apparatus devoid of core vents and core vent holes.

Figure 26:
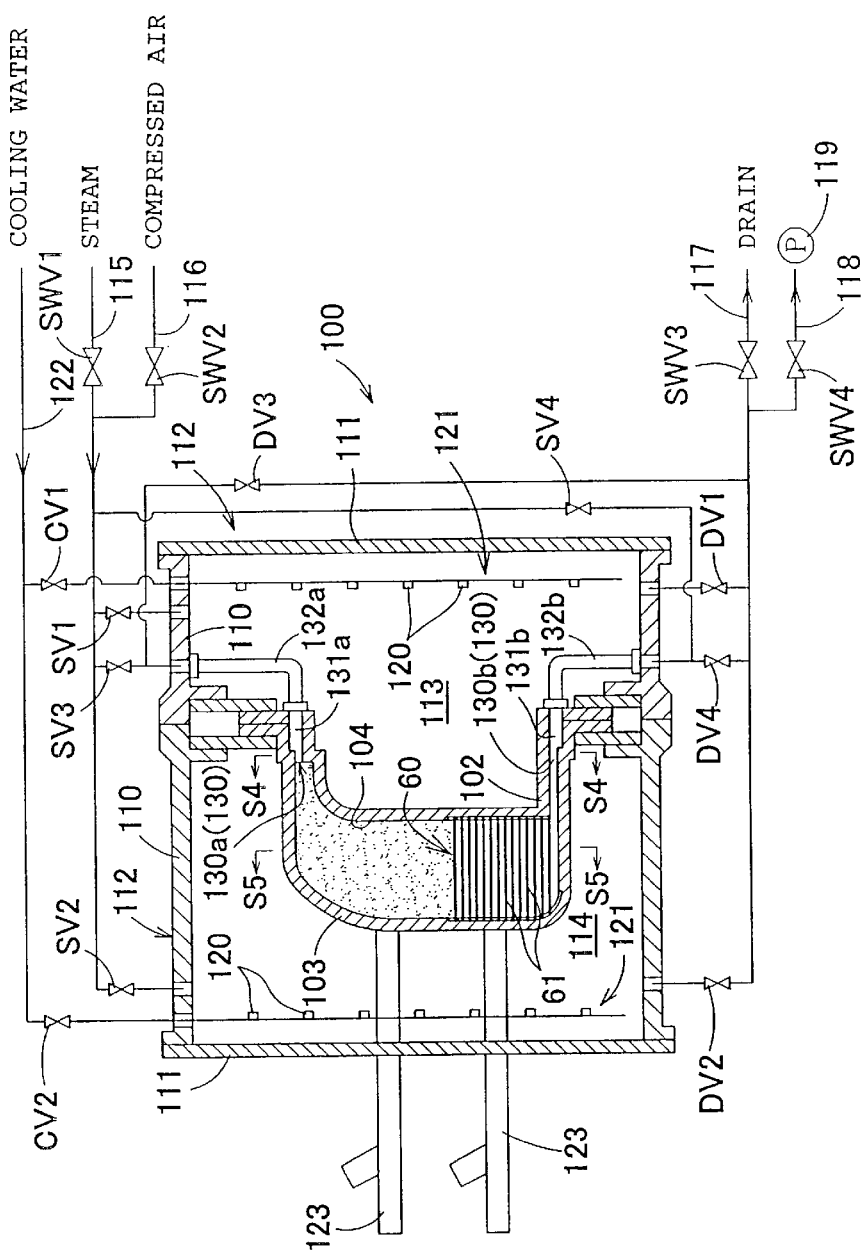
FIG. 26 is an overall view of an in-mold foam molding apparatus pertaining to a third embodiment.
Figure 27:
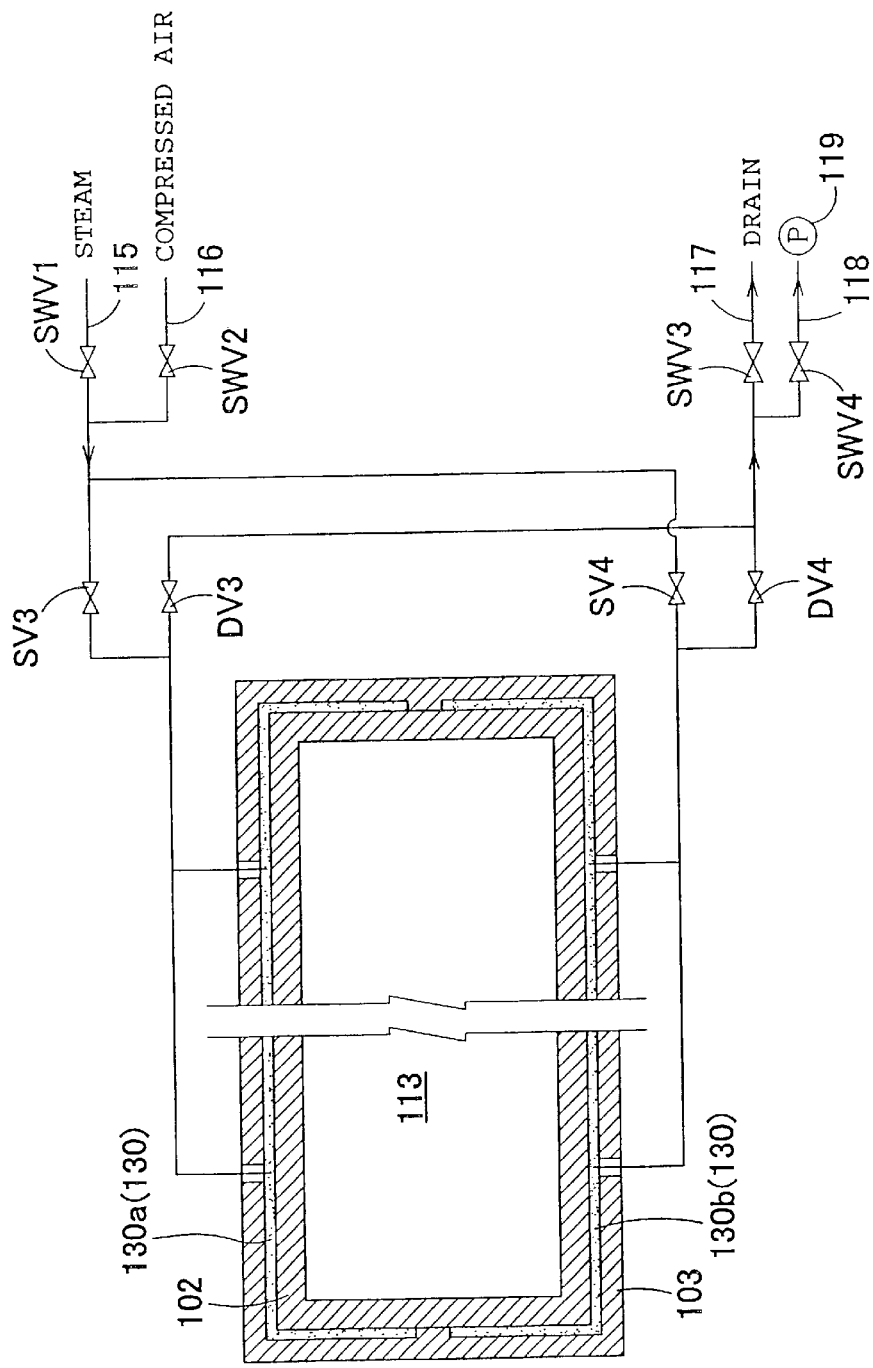
FIG. 27 is a sectional view taken along line S4—S4 in FIG. 26.

Referring to FIGS. 26 and 27, in-mold foam molding apparatus 100 comprises a set of molds composed of a core mold 102 and a cavity mold 103 situated in opposition; bead filling means for filling a mold cavity 104 defined by core mold 102 and cavity mold 103 with bead starting materials carried on an air stream; pressure reducing means for reducing the pressure in mold cavity 104; compressed air feed means for supplying compressed air to the interior of mold cavity 104; and steam feed means for heating and expanding/fusing with steam the bead starting materials filling mold cavity 104. The bead starting materials may consist of materials identical to those used in the first embodiment.

Core mold 102 and cavity mold 103 are each attached to a housing 112 having a rim-like frame 110 and a back panel 111, and a set of chambers composed of a first chamber 113 and a second chamber 114 are defined to the rear of core mold 102 and cavity mold 103, respectively. In contrast to conventional molding apparatuses, core mold 102 and cavity mold 103 and devoid of core vents and core vent holes, so mold cavity 104 and the two chambers 113, 114 constitute independent compartments. While mold cavity 104 and the two chambers 113, 114 are preferably isolated from each other in completely gas-tight fashion, the invention also encompasses cases where these compartments can be controlled independently despite provision of a small number of conventional vent holes for communication among mold cavity 104 and the two chambers 113, 114.

First chamber 113 and second chamber 114 are respectively coupled to a steam feed line 115 and an air feed line 116 via service valves SV1, SV2 and switching valves SWV1, SWV2, and also respectively coupled to a drain line 117 and a vacuum line 118 (which is hooked up to a vacuum pump 119) via drain valves DV1, DV2 and switching valves SWV3, SWV4. The first and second chambers 113, 114 are each provided with a nozzle unit 121 comprising a plurality of nozzles 120 for misting cooling water onto the back faces of core mold 102 and cavity mold 103, the two nozzle units 121 being coupled with a cooling water feed line 122 via cooling water valves CV1, CV2.

As shown in FIGS. 26 to 31, a first element of the in-mold foam molding apparatus which pertains to the third embodiment resides the provision to core mold 102 and cavity mold 103, in molding sections thereof not employed in molding of prominent portions of the molded article, of first openings 130 that communicate with molded article cavity 104, these first openings 130 being provided with communicating passages communicating with external service lines 115–118, whereby service fluids (e.g., steam, compressed air, etc.) may be separately delivered to or vented from molding cavity 104 via the plurality of first openings 130 by operation of service valves SV3–SV6, drain valves DV3, DV4, and switching valves SWV1–SWV4.

Situation of first openings 130 basically takes place under any of three general schemes: situation thereof at or in proximity to the parting line of core mold 102 and cavity mold 103; situation thereof in portions of peripheral components (e.g., the filling unit 123, ejector pin 124 (see FIG. 31), etc.) lying exposed within mold cavity 104; or a combination of these two.

First, situation of first openings 130 at or in proximity to the parting line of core mold 102 and cavity mold 103 will be described through examples of three types.

(1) Referring to FIGS. 26 and 27, in-mold foam molding apparatus 100 of a first type has first openings 130a, 130b of slit form situated along the parting line of core mold 102 and cavity mold 103 and communicating with mold cavity 104. Communicating passages, namely, intermold passages 131a, 131b and internal lines 132a, 132b, provide communication between the first openings 130a, 130b and the external service lines 115–118. Core mold 102 and cavity mold 103 are devoid of conventional air orifices, being designed such that when closed, with mold cavity 104 is isolated in gas-tight fashion from chambers 113, 114, while first openings 130a, 130b leading to external service lines 115–118 are formed in core mold 102 and cavity mold 103.

With this arrangement, the bead starting material preheating/evacuation process and fusing/heating process are conducted as follows, using these first openings 130a, 130b in place of conventional air orifices.

In the preheating/evacuation process, mold cavity 104 may be evacuated directly, conducting evacuation via first opening 130*a* and first opening 130*b*, and steam for preheating then supplied directly in the same manner. In the fusing/heating process, steam for elevating the temperature may be supplied directly to the bead starting materials in mold cavity 104 via first opening 130*a* and first opening 130*b* in the same manner.

To prevent clogging of first openings 130*a*, 130*b* by the bead starting materials, the width of the mold cavity 104 apertures of first openings 130*a*, 130*b* must be smaller than the outside diameter of the bead starting materials, namely, 1 to 10 mm or smaller in diameter. To eliminate squeeze-out, flash marks, and the like in order to improve the finish of foam molded articles, it is desirable to make aperture width as small as possible; however, if aperture width is too small, excessive resistance to passage of service fluids will result. Accordingly, aperture width of 0.1–1.5 mm is appropriate.

In the present invention, first openings 130*a*, 130*b* are appropriately provided along the valley portion of the recess situated at the parting line of the core mold 102 and the cavity mold 103. With this arrangement, as first openings 130*a*, 130*b* of slit form are situated in locations corresponding to convex angular ridgeline portions on the exterior of the foam molded article, appearance suffers negligibly even if a slight amount of flash should remain. Internal lines 132*a*, 132*b* ideally consist of copper pipe 415 mm in diameter.

FIG. 26 depicts a combination of two series of communicating passages, a series of communicating passages comprising a first opening 130*a*, an inter-mold passage 131*a*, and an internal line 132*a*; and a series of communicating passages comprising a first opening 130*b*, an inter-mold passage 131*b*, and an internal line 132*b*. However, the invention is not limited to this arrangement, it being possible to use a combination of three or more series of communicating passages, or a single one only, depending on the size and configuration of the foam molded article.

Where a plurality of first openings 130, for example, a pair of first openings 130*a*, 130*b*, is provided, it is preferable to situate these at the parting line between molds 102, 103 located at opposite sides of two facing ends of mold cavity 104, as shown in FIG. 27. While the length of first openings 130*a*, 130*b* is not critical, this arrangement affords advantages such as permitting the use of service procedures wherein a service fluid such as steam is delivered from one first opening to the other first opening after passing through mold cavity 104 (particularly the procedure by which air present between the beads in mold cavity 104 is replaced with steam); allowing the bead heating procedure to be carried out rapidly, and the like.

The advantages of the first type may be summarized as follows.

[1] Since the air orifices employed conventionally may be eliminated from molds 102, 103, there is no risk of lowered strength, so conventional aluminum alloy mold material can be reduced in thickness from 8–12 mm to 4–8 mm. This reduces the heat capacity, improving heating/cooling efficiency, improving the accuracy of temperature control, and reducing materials costs.

[2] The need for processes to produce the air orifices and install the core vents is obviated, significantly reducing machining costs and reducing fabrication costs for molds 102, 103.

[3] Heating defects, release defects, and cooling defects due to clogging are eliminated, thereby obviating the need for maintenance operations such as replacement or periodic high pressure washing of the core vents.

[4] Product surfaces are free from marks produced by core vents and core vent holes, thereby improving appearance and eliminating any difficulties in processes such as printing the surface or applying adhesive labels.

[5] Cooling water used in cooling processes does not penetrate into the mold cavity, whereby the water content of products can be held to about 0.5–4% (versus 6–10% in the conventional art), thus obviating the need for a drying process, contributing significantly to shorter cycle time.

[6] The greatest advantage of the invention is the ability to conduct service operations not possible with conventional molds. In conventional practice, in order to subject bead starting materials to the action of steam or other service fluid, a service fluid coming from a service line must first be made to act on one of the chambers, from whence it can act on the bead starting materials via the vent holes. In the present invention, however, the service passages for chambers 113, 114 and mold cavity 104 are separate and independent, whereby service fluids such as pressurized air, steam, decompression air, cooling water, or the like can be made to act directly on mold cavity 104 via first openings 130*a*, 130*b*, thus expanding the degree of freedom in service operations.

For example, where it is desired to reduce pressure in mold cavity 104, with conventional molds it is necessary to reduce pressure in both chambers as well, whereas in the present invention, the pressure reduction operation can be performed on mold cavity 104 exclusively, which has a capacity on the order of one-tenth chamber capacity. Advantages include significantly improved control, since, conventionally, response is conducted rapidly.

Further, since chambers 113, 114 and mold cavity 104 are independent compartments, heating conditions for each can be controlled independently, whereby the temperatures of the set of molds 102, 103 can be controlled independently through the medium of steam supplied to the two chambers 113, 114, allowing the qualities of the surfaces molding contacting molds 102, 103 to be controlled. Fusion of the bead starting materials can be controlled independently of surface qualities by heating, expanding, and fusing the bead starting materials filling the mold cavity 104 through the medium of steam supplied to the mold cavity 104. In this way, fusion in the interior of a molded article can be held to a low level, molded article cycle time can be shortened, and molded articles with attractive surfaces can be produced, affording both enhanced throughput and product value.

Figure 28:
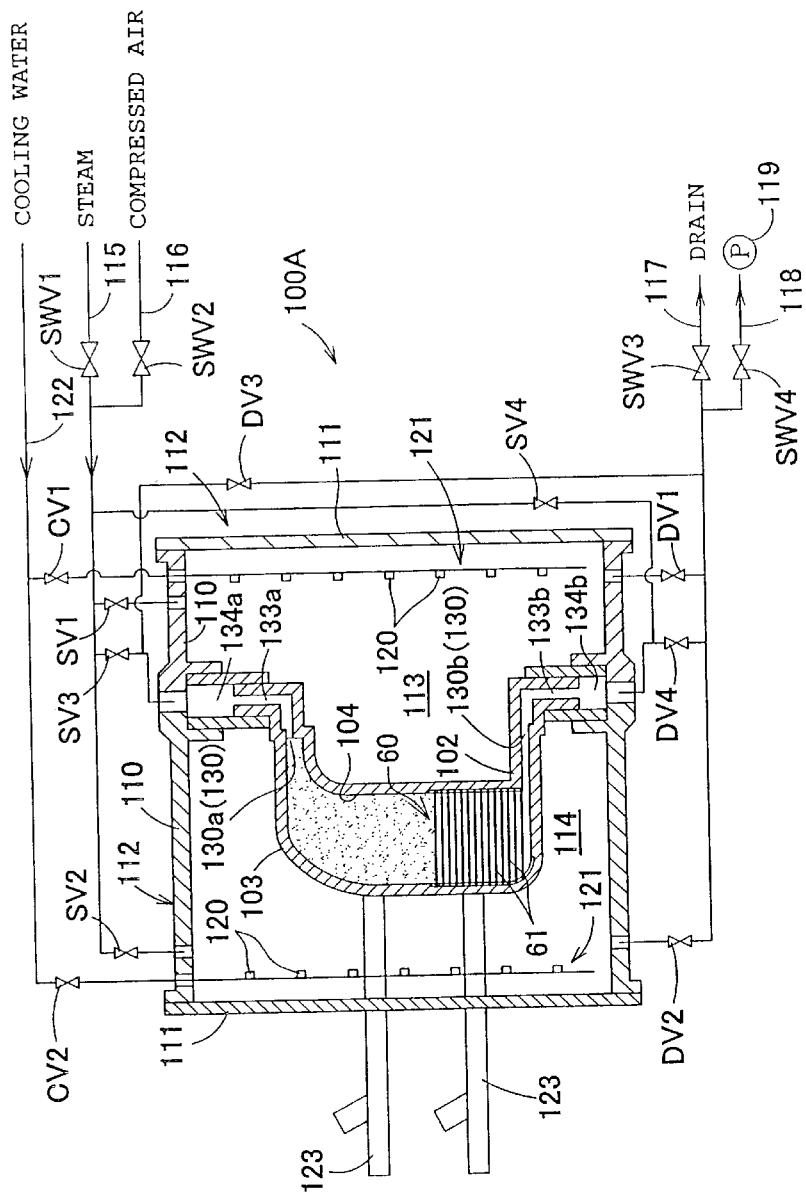
FIG. 28 is an overall view of an in-mold foam molding apparatus of another design.

(2) Referring to FIG. 28, in-mold foam molding apparatus 100A of a second type has first openings 130*a*, 130*b* of slit form communicating with external service lines 115–118 via communicating passages composed of inter-mold passages 133*a*, 133*b* that, with the molds closed, extend outwardly from mold cavity 104 along the parting line of molds 102, 103; and inter-mold passages 134*a*, 134*b* enclosed at the parting line of the rim-like frames 110. Other elements are identical to those in the in-mold foam molding apparatus 100 described earlier, and as such are assigned the same symbols and not described in any detail.

In this in-mold foam molding apparatus 100A, molds 102, 103 are devoid of conventional air orifices, being designed such that when closed, the mold cavity 104 is isolated in gas-tight fashion from chambers 113, 114, while first openings 130*a*, 130*b* and the communicating passages via which these first openings 130*a*, 130*b* communicate with service lines 115–118, namely, inter-mold passages 133*a*, 133*b* and inter-mold passages 134*a*, 134*b*, extend outwardly from mold cavity 104 along the parting line of molds 102, 103 and rim-like frames 110, arranged in a different configuration than in the preceding in-mold foam molding apparatus 100 of the first type.

In the foam molding apparatus 100A depicted in FIG. 28, as in in-mold foam molding apparatus 100, service fluids can be controlled during foam molding, thereby affording advantages [1] to [6] listed earlier. An additional advantage is that internal lines 132a, 132b (which require a pipe installation operation during fabrication) can be dispensed with, thereby holding down the fabrication costs of the foam molding apparatus and obviating the need for maintenance.

Figure 29:
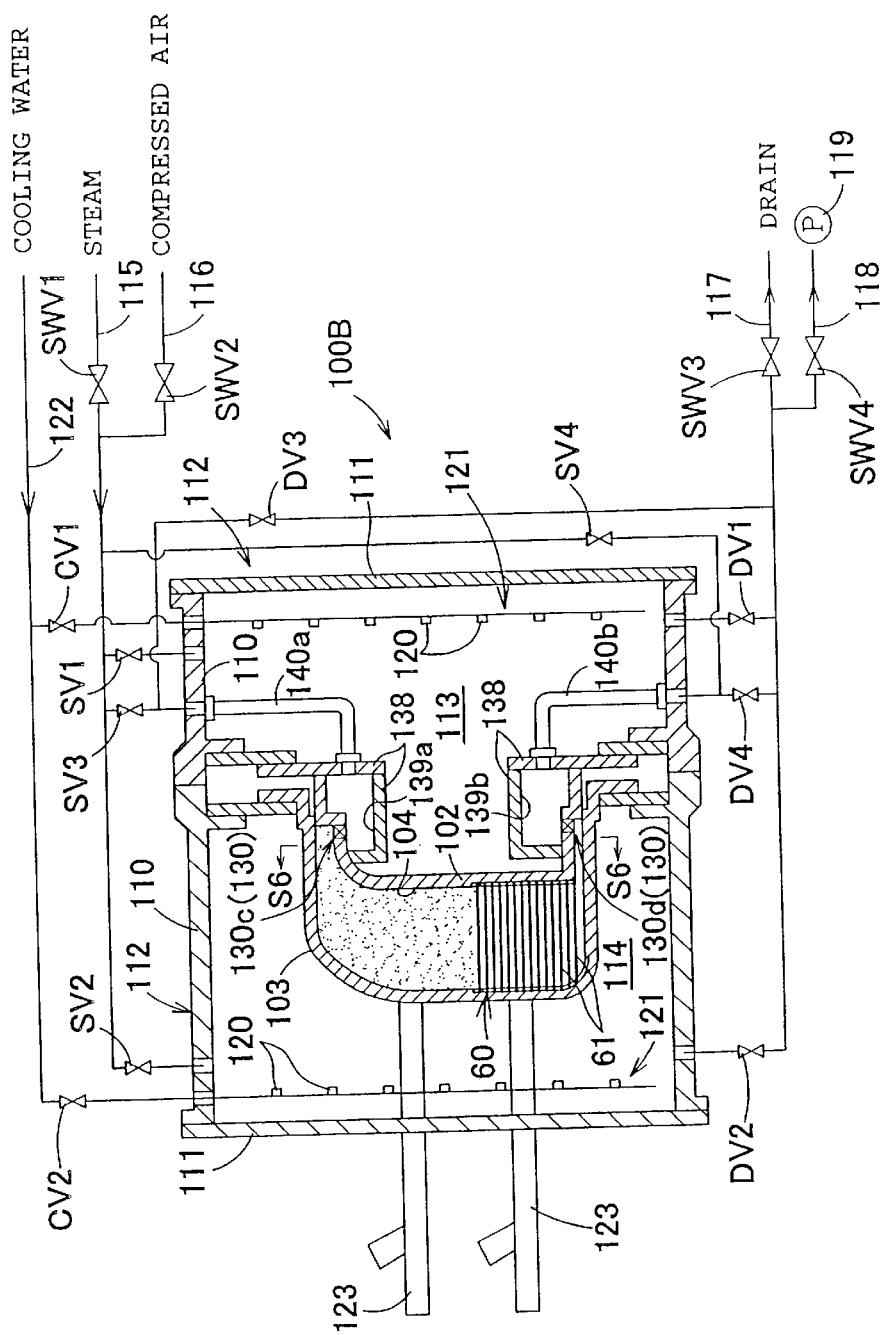
FIG. 29 is an overall view of an in-mold foam molding apparatus of another design.
Figure 30:
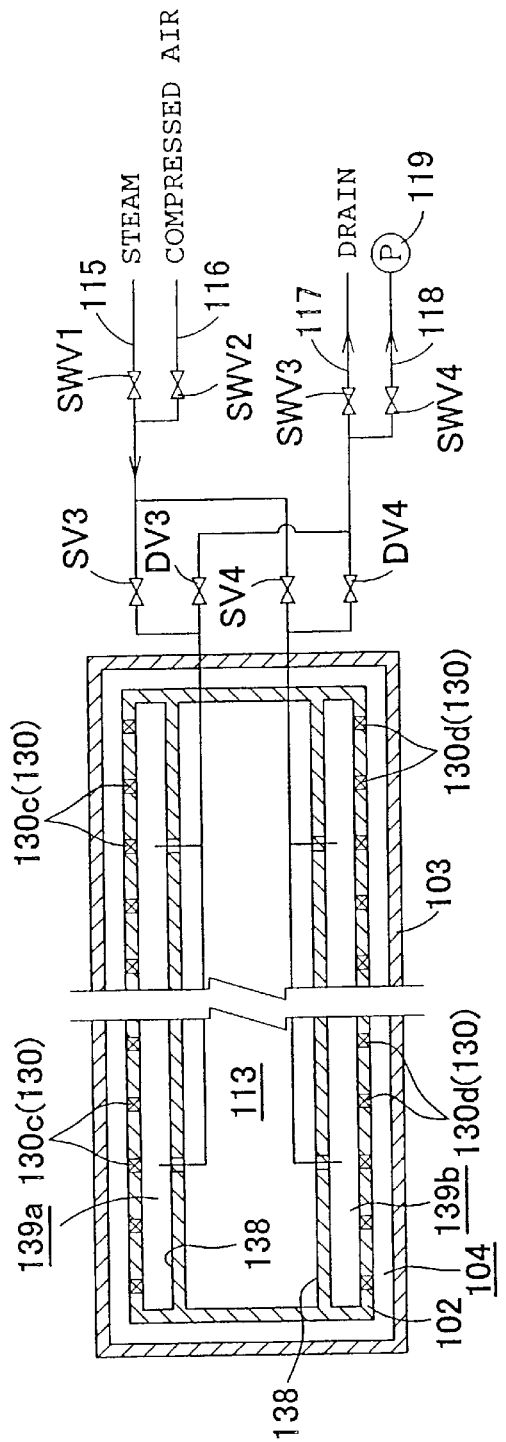
FIG. 30 is a sectional view taken along line S6—S6 in FIG. 29.

(3) Referring to FIGS. 29 and 30, in-mold foam molding apparatus 100B of a third type has first openings 130c, 130d, provided to core mold 102, situated in proximity to the parting line of core mold 102 and cavity mold 103 and communicating with the interior of the mold cavity 104. First openings 130c, 130d communicate with external service lines 115–118 via communicating passages composed of communicating spaces 139a, 139b defined by passage defining members 138 secured to the inside of core mold 102 so as to enclose first openings 130c, 130d, and internal lines 140a, 140b via which communicating spaces 139a, 139b communicate with external service lines 115–118. Via communicating spaces 139a, 139b and internal lines 140a, 140b working fluids may be individually supplied to or vented from the first openings 130c, 130d. Other elements are identical to those in the in-mold foam molding apparatus 100 described earlier, and as such are assigned the same symbols and not described in any detail.

In this in-mold foam molding apparatus 100B, molds 102, 103 are devoid of conventional air orifices connecting mold cavity 104 with chambers 113, 114, being designed such that when closed, the mold cavity 104 is isolated in gas-tight fashion from chambers 113, 114, while first openings 130c, 130d and the communicating passages via which these first openings 130c, 130d communicate with service lines 115–118, namely, communicating spaces 139a, 139b and internal lines 140a, 140, are arranged in a different configuration than in the preceding two cases.

First openings 130c, 130d may take the form of through-holes or slits made directly in core mold 102; however, since it is conceivable that the inside faces could experience wear due to the passage of steam, in preferred practice core vent mounting holes will be made for first openings 130c, 130d and detachable core vents will be installed therein, as in conventional molding apparatuses.

In the foam molding apparatus 100B depicted in FIGS. 29 and 30, as in in-mold foam molding apparatus 100, service fluids can be controlled during foam molding, thereby affording advantages [5] and [6] listed earlier. Since core vents connecting mold cavity 104 and communicating spaces 139a, 139b are provided, this arrangement has a number of disadvantages relative to advantages [1] to [4] listed earlier, but since core vents and core vent holes need not be produced uniformly over the entire face of the mold, the number of core vents can be reduced appreciably. Further, measures to prevent wear of first openings 130c, 130d by steam can be readily taken, providing a more practical design. In this foam molding apparatus 100B of the third type, the mold cavity can be formed between the parting line of the left and right rimlike frames 110, as in the foam molding apparatus 100A of the second type, and internal lines 132a, 132b dispensed with.

In the case depicted in FIG. 29, first openings 130c, 130d are provided to the core mold 102; however, where the inside face (core mold 102 side) of the molded article will be exposed to the outside, it is preferable in terms of the appearance of the molded article to locate the first openings 130c, 130d in the cavity mold 103.

Figure 31:
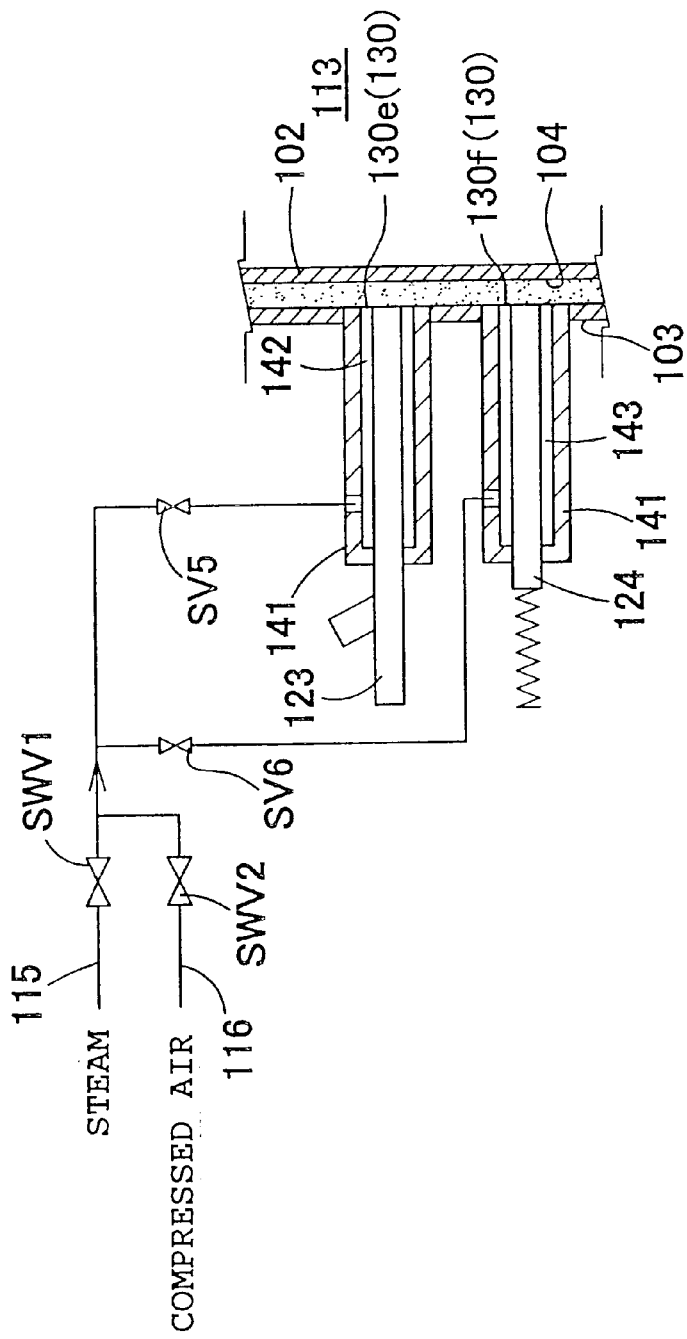
FIG. 31 is a illustrative diagram of an in-mold foam molding apparatus of another design.

Next, a case wherein first openings 130 are situated in proximity to peripheral components such as a filling unit 123 or ejector pin 124 is described.

Where first openings 130 are to be situated in proximity to peripheral components as shown in FIG. 31, housing members 141 of approximately tubular configuration are attached to cavity mold 103 at locations corresponding to filling unit 123 and ejector pin 124, and filling unit 123 and ejector pin 124 are accommodated fitting within these housing members 141. Communicating passages 142, 143 communicating individually with service lines 115–118 are formed between filling unit 123/ejector pin 124 and the housing members 141, first openings 130e, 130f that open into mold cavity 104 are formed at the distal ends of communicating passages 142, 143, and communicating passages 142, 143 are coupled to service lines 115–118 via service valves SV5, SV6 so that, as with first openings 130a–130d described previously, operations such as steam or pressurized air delivery or pressure reduction may be carried out.

With this arrangement, objects of the invention may be achieved in a configuration provided with first openings 130e, 130f alone, without concomitantly providing the first openings 130a–130d described previously. In preferred practice, however, the first openings 130a–130d described previously will be provided as well.

First openings 130e, 130f situated in proximity to the distal ends of filling unit 123 and ejector pin 124 may be provided concomitantly with the first openings 130a–130d described previously to provide individual passages leading from each of the first openings 130 to external service lines 115–118. With this arrangement, first openings 130 capable of delivering service fluids are provided at a minimum of three locations: two opposing end portions of mold cavity 104, and the central portion of mold cavity 104, whereby service fluids may be delivered in a manner appropriate for the quality required, and there is afforded a greater degree of freedom in control operations such as service fluid feed or stop, so that service operations may be optimized with reference to foam molding type, configuration, and other factors.

In the case shown in FIG. 31, first openings 130e, 130f are situated in proximity to the distal ends of filling unit 123 and ejector pin 124, but the invention is not limited to this configuration, it being alternatively possible to use other peripheral components attached to the mold, such as cooling water line fixtures and the like. Given an arrangement wherein steam can move uniformly through all of the bead starting material in the mold cavity 104, there is no need to provide any communicating passages 142, 143 to the outside of filling unit 123 and ejector pin 124, and first opening 130e, 103f, or both may be dispensed with, providing first openings 130e, 103f only where appropriate for the configuration of the molded article being molded. Alternatively, first openings 103a–103d may be employed exclusively for venting of steam supplied to mold cavity 104 via first openings 130e, 103f. In FIG. 31, filling unit 123 and ejector pin 124 are shown provided to the cavity mold 103; however, where the outside face (cavity mold 103 side) of the molded article will be exposed to the outside, it is preferable in terms of the appearance of the molded article to locate the filling unit 123 and ejector pin 124 on the core mold 102.

Figure 33:
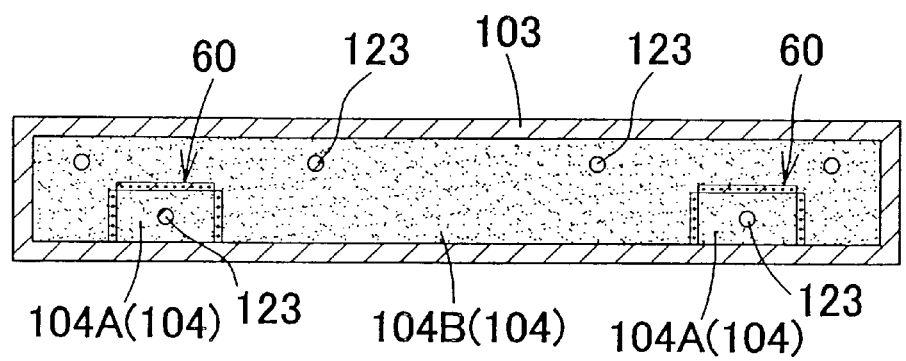
FIG. 33 is a sectional view taken along line S5—S5 in FIG. 26.
Figure 35:
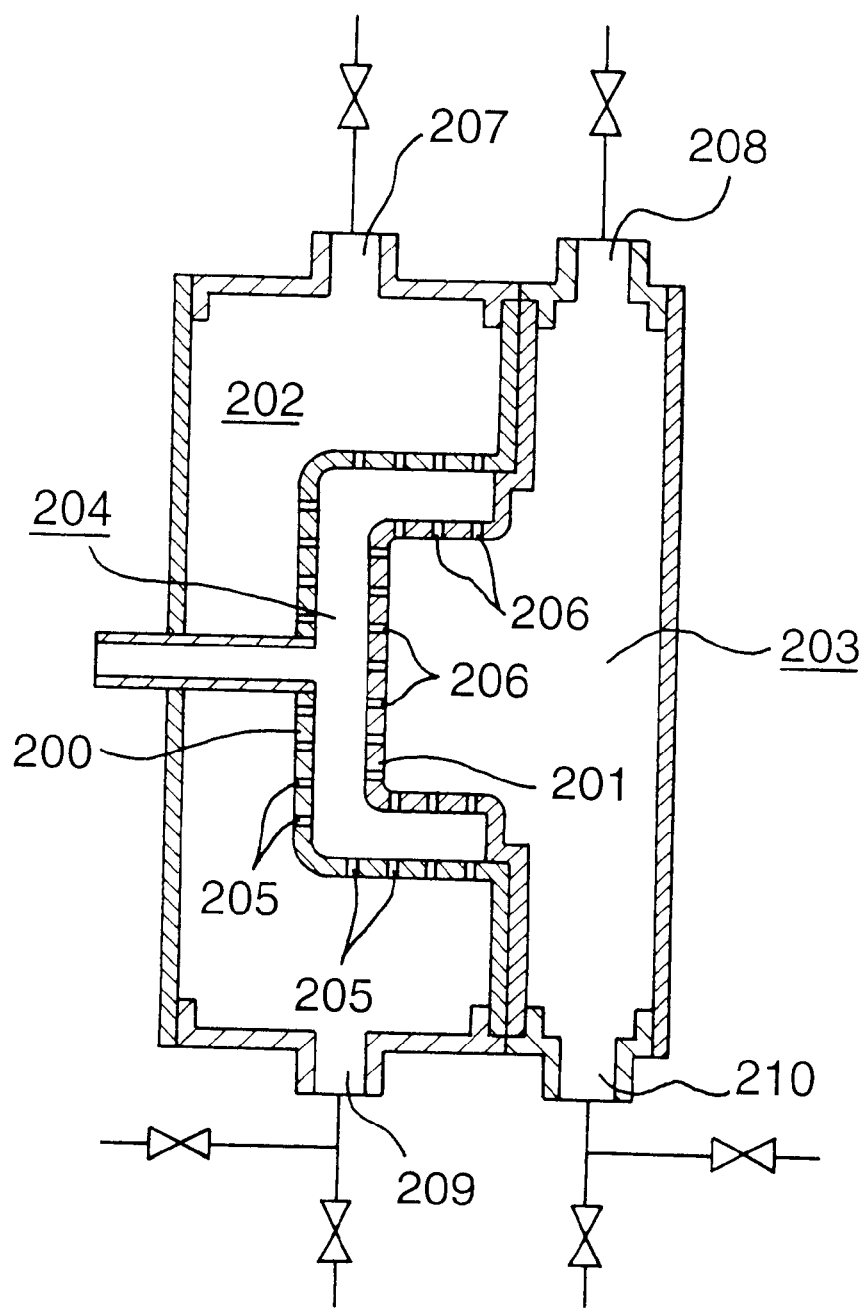
FIG. 35 is an overall view of an in-mold foam molding apparatus of the conventional art.
Figure 36:
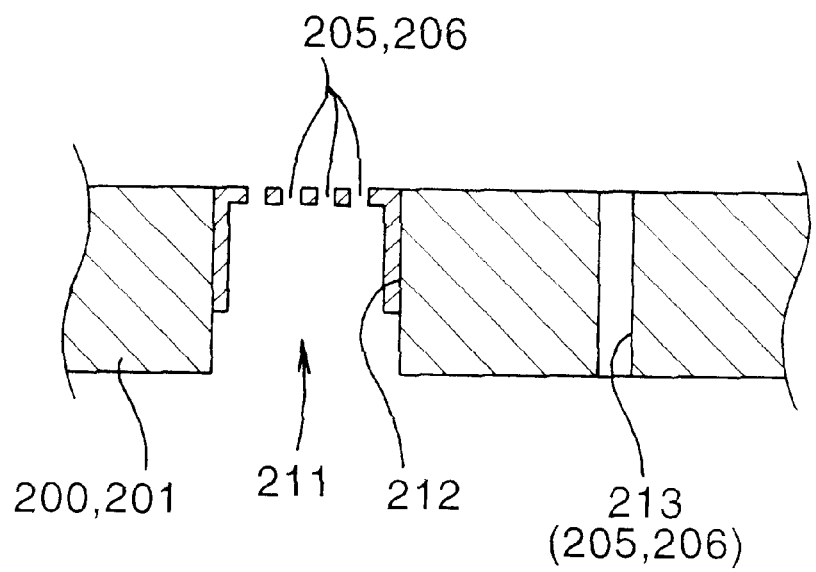
FIG. 36 is a longitudinal sectional view of a section of a conventional mold containing air orifices.
Figure 37:
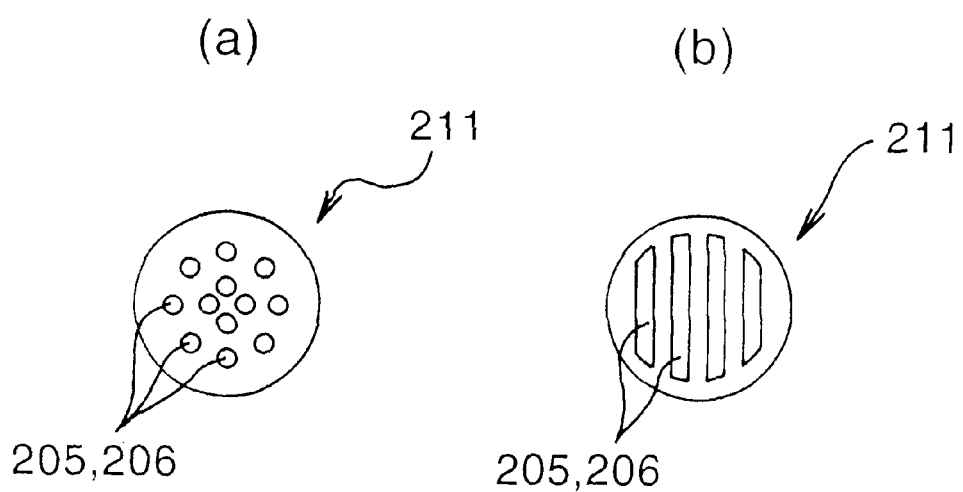
FIG. 37 are plan views of a core vent in the conventional art.

As shown in FIGS. 26 and 33, the second element of the in-mold foam molding apparatus pertaining to the third embodiment resides in an arrangement wherein the mold cavity 104 is partitioned into a plurality of partitioned mold chambers by the partitioning means 60 of the second embodiment, with adjacent partitioned mold chambers 104B, 104B being filled with bead starting materials of different properties.

Figure 32:
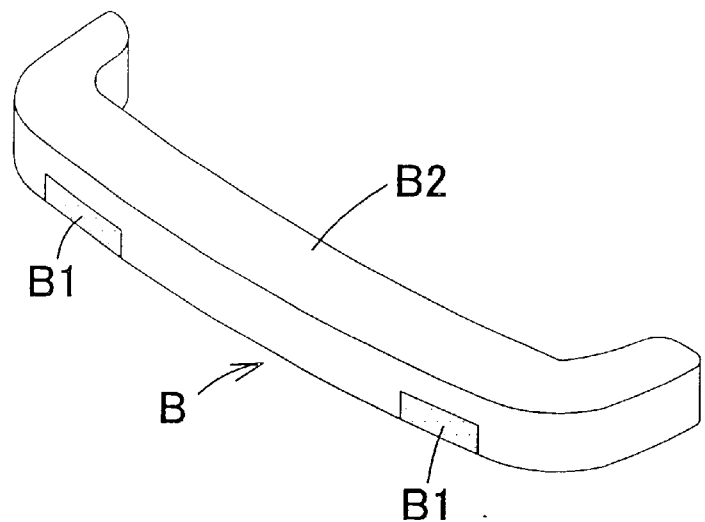
FIG. 32 is a perspective view of an automobile bumper core.

The configuration, number, and locations of partitions within mold cavity 104 may be selected arbitrarily with reference to the qualities desired of the molded article, and the like. For example, in a core B for a car bumper like that depicted in FIG. 32, as in the preceding second embodiment, greater strength is required in the lengthwise end portions than in the central portion, and accordingly portions B1 situated in the lower portions at the ends of core B are designed to be stronger than other portions B2, thereby assuring adequate strength while holding down the weight of core B.

The bead starting materials used to fill adjacent partitioned mold chambers 104A, 104B may differ in properties such as expansion factor, bead bulk density, cell diameter, bead diameter, material, and so on.

FIGS. 26, 28, 29, and 33 show examples of partitioning means 60 assembled in molds 102, 103; however, it would be possible assemble therein the partitioning means 30, 30A–30E described in the first embodiment or the partitioning means 70, 75, 80, 85 described in the second embodiment. These partitioning means, having been described in some detail in the first and second embodiments, will not be discussed further here.

The discussion now turns to an example of a method for molding molded articles using the foam molding apparatus 100 shown in FIG. 26.

This molding method can be divided into the following four steps: an inclusion step wherein an inorganic gas is forced into bead starting materials; a filling step wherein a mold cavity 104 is filled with the bead starting materials having an inorganic gas forced therein; a heating step for foaming and fusing the bead starting materials filling the mold cavity 104; and a cooling step wherein the molded article is cooled.

First, in the inclusion step, bead starting materials are packed into an inclusion tank (not shown) and a 0.03–0.2 MPa inorganic gas is forced into the bead starting materials. The bead starting materials employed in the invention comprise polyolefin resin and typically have lower expanding power than polystyrene resins, and thus it is conceivable that the bead starting materials will not expand sufficiently when heated with steam, resulting in large spaces between beads and diminished appearance, or in depressed quality of the molded article. Accordingly, it is desirable to raise the expanding powder of the bead starting materials by forcing an inorganic gas into them. Depending on the resin used, the inclusion step may be omitted.

The bead starting material filling step is now described.

In this step, the core mold 102 and cavity mold 103 are opened, the mold cavity 104 is partitioned into a plurality of partitioned mold chambers 104A, 104B by means of the fixed partitioning members 63 of first partitioning means 60, drain valves DV3, DV4 are opened, and bead starting materials of different qualities, carried on a stream of air, are delivered individually from filling units 123 to the partitioned mold chambers 104A, 104B while at the same time venting the air delivered to partitioned mold chambers 104A, 104B from the mold cavity 104 via first openings 130a, 103b so that the mold cavity 104 is filled with the bead starting materials.

Specific filling methods include cracked filling, pressure filling, and compression filling, described below.

[1] In the cracked filling method, during filling, the core mold 102 and the cavity mold 103 are not completely closed (i.e., cracking), so as to leave a gap equal to about 10% of the bottom wall thickness of the molded article, for example. As the bead starting materials are packed in, the air used for filling is vented through the gap between the core mold 102 and the cavity mold 103.

[2] In the pressure filling method, the interior of a starting material tank housing the bead starting materials is pressurized to about 0.02–0.15 MPa, and the mold cavity 104 is brought to atmospheric pressure. Utilizing this pressure differential between the starting material tank and the mold cavity 104, the bead starting materials are transported to and packed into the mold cavity 104.

[3] In the compression filling method, the pressure p in a starting material tank is increased to a higher level than with the pressure filling method, namely, about 0.1–0.5 MPa, and while maintaining a pressure differential (p–p1) with respect to the internal pressure p1 within the mold cavity 104, the bead starting materials are transported and packed.

The process of heating with steam the bead starting materials filling the mold cavity 104 is now described.

First, with drain valves DV1, DV2 open, service valves SV1, SV2 are opened to cause steam to flow into chambers 113, 114 so that air present in chambers 113, 114 is replaced with steam. This step may be conducted during the filling step.

Next, drain valves DV1, DV2 are shut, and while controlling service valves SV1, SV2 in such a way that chambers 113, 114 reach a predetermined steam pressure, steam is supplied to chambers 113, 114 for a heating period of predetermined length to heat the core mold 102 and cavity mold 103, thereby expanding and fusing the bead starting materials contacting the core mold 102 and cavity mold 103 so as to form a skin on the molded article.

The steps of heating the bead starting materials filling the mold cavity 104 can be conducted in parallel; however, the steps can be broadly divided into three.

In the first step, drain valve DV4 is opened, drain valve DV3 is closed, service valve SV3 is opened, and service valve SV4 is closed to create a flow of steam through the mold cavity 104 so that air present between beads is replaced with steam. With the arrangement depicted in FIG. 31, service valves SV5, and SV6 are opened in addition to service valve SV3.

In the second step, in the reverse of the first step, drain valve DV4 is closed, drain valve DV3 is opened, service valve SV3 is closed, and service valve SV4 is opened to create a flow of steam through the mold cavity 104 so that air present between beads is replaced with steam. This second step may be omitted. With the arrangement depicted in FIG. 31, service valves SV5, and SV6 are opened in addition to service valve SV4.

In the third step, drain valves DV3, DV4 are closed, and while controlling service valves SV3, SV4 in such a way that mold cavity 104 reaches a predetermined steam pressure, steam is supplied to mold cavity 104 for a heating period of predetermined length to expand and fuse the bead starting materials to form the interior of the molded article. With the arrangement depicted in FIG. 31, service valves SV5, and SV6 are controlled in addition to service valves SV3, SV4.

The steam supplied to chambers 113, 114 and the steam supplied to mold cavity 104 allow the surface portions of the molded article and the interior of the molded article to be heated independently, thereby allowing the surface qualities of the molded article and fusion of the molding interior to be controlled separately.

In the subsequent cooling step, cooling water valves CV1, CV2 are opened and cooling water is sprayed onto core mold 102 and cavity mold 103 from nozzles 120 to cool the molded article in the mold cavity 104 via the core mold 102 and cavity mold 103. Since the core mold 102 and cavity mold 103 are devoid of core vents and core vent holes, cooling is brought about without the cooling water touching the molded article. In this way, the water content of the molded article is due solely to steam drained in the mold cavity 104, and the amount thereof is about one-fifth to one-tenth that with conventional methods.

When cool, compressed air is supplied to a gas orifice 145 while parting the molds 102, 103, and with the molded article remaining on the cavity mold 103, the molded article is ejected from the mold using the ejector pin 124.

With this molding method, qualities in selected areas of a molded article can be manipulated so as to differ from qualities in other areas, and since heating of the surface portions of a molded article and heating of the interior thereof can be carried out independently during the heating process, a molded article having, for example, low mechanical strength requirements can be given lower fusion in the molding interior while maintaining satisfactory surface properties, thus reducing molding cycle time and improving both product value and throughput.

Molded articles produced in this way have attractive surfaces free of markings caused on exterior surfaces by core vents and core vent holes. Since qualities in selected areas of a molded article can be manipulated so as to differ from qualities in other areas, it is possible, taking the example of the car bumper core B shown in FIG. 32, to increase the strength of the molded article in portions B1 situated to the front of the front side frame by using a bead starting material with a low expansion factor, while at the same time lowering the overall weight of the molded article by using a bead starting material with a high expansion factor for the other portions B2, thereby affording a molded article having both improved strength and low weight.

Surface qualities of these molded articles may be maintained at levels equivalent to those of isothermal molded articles produced by conventional molding techniques while manipulating the extent of fusion in the interior to a lower or higher level than in an isothermal molded article of the same given surface qualities. That is, with conventional molding methods, when the bead starting materials are heated, expanded and fused, since the surfaces and interior of the bead starting materials are heated under identical heating conditions, lowering the extent of fusion in the interior of molded article has the result of gaps forming at interfaces of the beads 105A and surface depressions 107 forming on the surface portions of the molded article, as shown in FIG. 34(a). With the molding method of the present invention, however, the surface and interior can be heated independently, so while gaps 106 do form at interfaces of the beads 105A, the interfaces of the beads 105B situated at the surface of the molded article are substantially devoid of depressions 107, as shown in FIG. 34(b), affording a molded article with a smooth and attractive surface. A low extent of fusion in the interior of a molded article is suitable in cases where there are rather stringent requirements as regards surface qualities, but no need for high mechanical strength, as with decorative frames for fill-up concrete block surfaces, container lids, or heat insulation materials, whereas a high extent of fusion of the interior of a molded article is suitable in cases where requirements as regards surface qualities are not particularly stringent, but there is a need for high mechanical strength or ability to withstand repeated use, as with automotive parts and goods-delivery boxes. The invention is according more advantageous and useful for molded articles of relatively large size and complex shape than for small molded article of simple shape, such as an instant noodle container. The advantages thereof are particularly apparent in molded articles having both thick and thin sections.

In-mold Foam Molding Apparatus

The in-mold foam molding apparatus of the invention offers a number of advantages, such as ability to select appropriate partitioned mold chamber molding location and size, and the properties of the bead starting materials packed therein so as to improve functionality and quality in molded articles; and since the molding sections constituting the partitioned mold chambers in the mold are provided by means of partitioning members that are unified at least in part, relative motion of adjacent partitioned mold chambers due to expansion or contraction of the mold can be prevented, thus improving the precision of molding for molded articles.

First Type:

In-mold foam molding apparatus equipped with both fixed partitioning members and moveable partitioning members.

In this in-mold foam molding apparatus, adjacent partitioned mold chambers can be filled with bead starting materials of different properties, whereby functionality and quality of molded articles can be improved through appropriate selection of partitioned mold chamber molding location and size, properties of the bead starting materials, and so on.

Once the bead starting materials have been packed into the mold cavity, the moveable partitioning members are withdrawn prior to fusing together the bead starting materials with steam, so adequate molding strength at the interfaces is assured.

Since molding sections are unified at locations corresponding to fixed partitioning members, relative motion of adjacent partitioned mold chambers due to expansion or contraction of the mold is prevented, as is change in the aperture width of the passage orifices. Smooth motion of the moveable partitioning members is assured, and passage orifice aperture width can be made quite small, effectively preventing formation of flash by infiltration of bead starting materials between the mold and the moveable partitioning members.

Where fixed partitioning members are used, through-holes are formed in the molded article at locations corresponding to those of the fixed partitioning members, which may diminish the strength or appearance of molded articles, so in preferred practice the fixed partitioning members will be of small cross section. Where fixed partitioning members of pillar form are employed, it is possible to prevent change in passage orifice aperture width and deformation of through-holes by providing fixed partitioning members only at the necessary locations, so through-hole aperture area can be minimized. Where fixed partitioning members of wall form are employed, through-hole aperture area will be larger, but complex mold design may be avoided. Where fixed partitioning members of comb configuration are employed, a multitude of through-holes will form, but through-hole aperture area can be minimized to check any decline in strength or appearance of molded articles.

Second Type:

In-mold foam molding apparatus equipped with moveable partitioning members only.

In this in-mold foam molding apparatus, as in the preceding in-mold foam molding apparatus, functionality and quality of molded articles can be improved through appropriate selection of partitioned mold chamber molded article location and size, properties of the bead starting materials, and so on. Additionally, there is adequate fusion of bead starting materials at interfaces between bead starting materials of different qualities, so adequate molded article strength at interfaces is assured.

With this in-mold foam molding apparatus, the plurality of partitioned mold chambers provided in the core mold and cavity mold are unified, assuring smooth movement of the moveable partitioning members even if the mold should expand or contract. Additionally, in this in-mold foam molding apparatus the partitioned mold chambers are partitioned by moveable partitioning members exclusively, thereby avoiding formation of through-holes in molded articles at locations corresponding to those of fixed partitioning members, as occurs when fixed partitioning members are employed, thereby preventing any decline in strength or appearance of molded articles.

By providing projecting portions along passage orifices in the core mold or cavity mold such that the passage orifice openings on the mold cavity side are situated at medial locations in the cross direction of the projecting portions, while flash will form on molding surfaces along the passage orifices, this flash will project from the bottom of a recess, and thus by making the recess deeper than the height of the flash it is possible to prevent flash from projecting from visible surfaces of the molded article. This obviates the need for subsequent flash removal processes while allowing the molded article to be attached tightly to the mounting face of a mounting object at the proper location with substantially no gap therebetween, and allows the molded article to be sheathed tightly by a cover member tightly attached thereto with substantially no gap therebetween.

According to an in-mold foam molding apparatus of another design furnished with a flash countermeasure, with the mold cavity partitioned into a plurality of partitioned mold chambers by means of moveable partitioning members, adjacent partitioned mold chambers can be filled with bead starting materials of different properties, allowing functionality and quality of molded articles to be improved through appropriate selection of partitioned mold chamber molding location and size, the properties of the bead starting materials packed therein, and so on.

By retracting the moveable partitioning members after the mold cavity has been filled with bead starting materials and prior to fusing together the bead starting materials with steam, it is possible to achieve sufficient bonding among bead starting materials at the interfaces of bead starting materials having different properties, and to thereby assure adequate molding strength at these interfaces.

While flash situated along passage orifices does form on molded articles molded by means of this in-mold foam molding apparatus, as in the preceding arrangement, it is possible to prevent flash from projecting from visible surfaces of the molded article by making the recess deeper than the height of the flash.

By making passage orifice aperture width smaller than the diameter of the bead starting materials, infiltration of bead starting materials into the passage orifices can be prevented so that large flash does not project from locations on the molded article corresponding to the passage orifices.

By making the projecting portions higher than the height of the flash produced by the passage orifices, flash produced by passage orifices can be preventing from projecting from visible surfaces of molded articles.

By employing an in-mold foam molding apparatus furnished with yet another flash countermeasure technique wherein the length of the moveable partitioning members is such that, with the moveable partitioning members retracted, the front edges of the moveable partitioning members are coplanar with or project beyond the inside face of mold into the mold cavity of the mold provided with the moveable partitioning members, functionality and quality of molded articles may be improved through appropriate selection of partitioned mold chamber molding location and size, the properties of the bead starting materials packed therein, and so on; and by retracting the moveable partitioning members prior to fusing together the bead starting materials with steam, it is possible to achieve sufficient bonding among bead starting materials at the interfaces of bead starting materials having different properties, and to thereby assure adequate molding strength at these interfaces.

Since the length of the moveable partitioning members is such that, with the moveable partitioning members retracted, the front edges of the moveable partitioning members are coplanar with or project beyond the inside face of mold into the mold cavity of the mold provided with the moveable partitioning members, passage orifices are prevented from filling with bead starting materials, thus reliably preventing formation of flash.

While the moveable partitioning members may be of comb configuration, moveable partitioning members of comb configuration require forming a multitude of passage orifices in the mold for passage of the teeth, resulting in a complex mold machining process. Accordingly, tabular members are preferred.

Where the moveable partitioning members are composed of tabular members having through-holes or slits of a size not permitting passage of the bead starting materials, air used for filling can be expelled smoothly during filling with the bead starting materials, thus preventing filling defects and the like.

Third Type:

In-mold foam molding apparatus equipped with fixed partitioning members only.

According to this in-mold foam molding apparatus, with the mold cavity partitioned into a plurality of partitioned mold chambers by means of fixed partitioning members, adjacent partitioned mold chambers can be filled with bead starting materials of different properties, allowing functionality and quality of molded articles to be improved through appropriate selection of partitioned mold chamber molding location and size, the properties of the bead starting materials packed therein, and so on.

Molded articles produced using this molding apparatus contain through-holes or wells at locations corresponding to the teeth of the fixed partitioning members, but since the fixed partitioning members are provided fixedly to the core mold or cavity mold, there are afforded a number of advantages, such as: the need for a drive system for driving the partitioning members is obviated, allowing the design of the in-mold foam molding apparatus to be appreciably simplified, reducing the costs of fabrication thereof; since the partitioned zones within the mold cavity can be easily changed by modifying the fixed partitioning member attachment locations, modifications in molding design and the like can be readily accommodated; since bead starting materials of different properties filling adjacent partitioned mold chambers fuse to a sufficient extent through the spaces between the teeth, adequate bond strength between molded portions consisting of bead starting materials of different properties in a molded article is assured; and since there is no need to provide the mold with passage orifices for passage of fixed partitioning members, the problem of flash formation due to infiltration of bead starting materials into the passage orifices or infiltration between passage orifices and fixed partitioning members is prevented, the problem of flash formation is reliably prevented, localized reductions in mold strength due to passage orifices is prevented, and molding precision may be improved.

Where the teeth are rod-like elements 1 to 10 mm in diameter, adequate strength of the teeth can be assured so that breakage or deformation of teeth is prevented, while at the same time minimizing the decline in strength and appearance of molded articles due to formation of large through-holes or wells.

Where the gaps between the teeth are equal to 30–90% of the diameter of the bead starting materials whose passage is to be prevented, adequate fusion of bead starting materials in adjacent partitioned mold chambers is assured, thereby improving bond strength at the interfaces while at the same time preventing the problems of bead starting materials migrating into adjacent partitioned mold chambers through the teeth of the fixed partitioning members.

By fabricating the teeth from an elastically deformable material, the teeth can be designed to recover to their original shape after undergoing deformation due to filling pressure or expansion pressure, thus preventing molding defects due to plastic deformation of the teeth, while at the same time minimizing the sectional area of each tooth, whereby diminished appearance and lowered strength in molded articles may be held in check.

By arranging the teeth in a rectangular wave, triangular wave, or sine wave arrangement, boundaries of adjacent molded sections formed in a molded article by adjacent partitioned mold chambers will be imparted with a rectangular wave, triangular wave, or sine wave configuration, which improves bond strength at the interfaces in the molded article.

Where the fixed partitioning members are provided to a mold having an ejector pin, the molded article can be induced to remain on the mold having the ejector pin when the molds are parted, thus effectively preventing release defects on the molded article due to it remaining on the mold devoid of an ejector pin.

Where the fixed partitioning members are composed of first fixed partitioning members fixed to a mold having an ejector pin and second fixed partitioning members fixed to the mold devoid of an ejector pin, release of the molded article from the two sets of fixed partitioning members is improved. In this molding apparatus, where the teeth of the first fixed partitioning members and the teeth of the second fixed partitioning members are additionally arranged in alternating fashion, there is afforded good balance when the teeth of the first fixed partitioning members and the teeth of the second fixed partitioning members are pulled apart from each other as the molds are parted, preventing the molded article from being subjected to unnecessary force. Where additionally the number of teeth of the first fixed partitioning members fixed to the mold having an ejector pin is greater than the number of teeth of the second fixed partitioning members fixed to the mold devoid of an ejector pin, it may be assured that the molded article will remain on the mold having an ejector pin when the molds are parted.

Where the gaps between the teeth of the first fixed partitioning members and the second fixed partitioning members are such that at least one of the bead starting materials being used cannot pass therethrough, the teeth of the two sets of fixed partitioning members can be made shorter, and teeth of smaller diameter may be used, so that the diameter of the wells formed in the molded article by the teeth is smaller. Since tooth length may be set roughly, it can readily be modified in accordance with a change in the shape of the molded article or the like, and in cases where a crack is maintained between the two molds as they are filled with the bead starting materials (such in cracked filling), by designing the lap of the teeth of the two sets of fixed partitioning members to exceed the width of the crack, adjacent partitioned mold chambers can be kept partitioned.

While tooth configuration may be selected arbitrarily, by providing to the distal end or medial portion of fixed partitioning members fixed to the ejector pin-equipped mold a release-resistance increasing portion for the purpose of increasing resistance to release of the molded article from the teeth, it is possible to assure that when the molds are parted, the molded article remains on the mold having an ejector pin.

By fixing the fixed partitioning members to the ejector pin-equipped mold, the molded article can be induced to remain on the mold having the ejector pin when the molds are parted, thus effectively preventing release defects on the molded article due to the molded article remaining on the mold devoid of an ejector pin.

In-mold Foam Molding Method

According to the in-mold foam molding method pertaining to a first embodiment of the invention, molding sections for molding prominent areas of the outside face of a molded article are devoid of air orifices, whereby marks produced by air orifices are situated in non-prominent areas of the surfaces of the molded article, thus improving the surface appearance of the molded article. As air orifices are completely or largely eliminated, service fluids for the chamber behind the core mold, the chamber behind the cavity mold, and the mold cavity may be controlled separately, allowing heating conditions for these three compartments to be controlled independently, thereby making it possible, for example, to hold down fusion in the interior of a molded article and shorten molding cycle time while at the same time producing a molded article with attractive surfaces, thus improving both throughput and product value.

Where bead starting materials comprising polyolefin resins are used, the mold can be largely or completely devoid of air orifices, thus improving the precision of control of service fluids vis-à-vis the two chambers and the mold cavity, while at the same time effectively preventing a drop in packing of bead starting materials.

With this molding method, each of the partitioned mold chambers can be filled with bead starting materials of different properties, making it possible to achieve both improved strength and lighter weight in molded articles, and improving functionality and quality in molded articles without higher fabrication costs.

The second in-mold foam molding method of the invention affords the same advantages as the first in-mold foam molding method. In contrast to the first in-mold foam molding method, however, fixed partitioning members are provided fixedly to the core mold or cavity mold, imparting to the molding apparatus an appreciably simpler design and significantly reducing fabrication costs thereof. Further, modifications in molding design and the like can be readily accommodated by changing the fixed partitioning member attachment locations to change the partitioned zones within the mold cavity.

By completely or largely eliminating air orifices from the core mold or cavity mold, heating conditions in the mold cavity and the chambers located behind the core mold and cavity mold, respectively, can be set precisely, and molded articles imparted with attractive surfaces devoid of marks produced by air orifices. The lack of air orifices also prevents cooling water sprayed into the chambers during cooling from contacting the molded article, so that the molded article will have lower water content and can be maintained in a sanitary state.

According to a third in-mold foam molding method of the invention, functionality and quality in molded articles can be improved through appropriate selection of partitioned mold chamber molding location and size, the properties of the bead starting materials packed therein, and so on. For example, bead starting materials with a low degree of expansion may be used in regions requiring strength so as to increase the strength/rigidity of the molded article, while bead starting materials with a high degree of expansion may be used in other regions in order to reduce the weight of the molded article, so as to impart both improved strength and reduced weight to the molded article.

Since the moveable partitioning members are retracted after the bead starting material filling operation and before the bead starting materials are fused together with steam, it is possible to achieve sufficient bonding among bead starting materials at the interfaces of bead starting materials having different properties, and to thereby assure adequate molding strength at these interfaces.

Further, the use of an in-mold foam molding apparatus wherein adjacent partitioned molding segments are unitary prevents relative motion of adjacent partitioned molding sections occurring with mold expansion or contraction, thereby preventing change in width in passage orifice apertures. It is possible to adopt, for example, a simple linear configuration as the configuration for the passage orifices through which the moveable partitioning members pass, thus preventing expansion/contraction of passage orifice aperture width or deformation of passage orifices due to mold expansion or contraction, and assuring smooth movement of the moveable partitioning members.

In this third molding method, it is a simple matter to set the timing at which the moveable partitioning members are retracted by retracting the moveable partitioning members after packing the bead starting materials and before delivering steam to the mold cavity in order to heat and fuse the bead starting materials contained therein.

According to a fourth in-mold foam molding method of the invention, an in-mold foam molding apparatus of the third type is used, thereby affording the advantages noted earlier. Additionally, the gaps between the teeth of the fixed partitioning members are of a size that does not allow passage of the bead starting materials, whereby the plurality of partitioned mold chambers can be filled with bead starting materials of different properties, and bead starting materials can be packed in without prolonging the time needed to pack in the bead starting materials.

According to a fifth in-mold foam molding method of the invention, an in-mold foam molding apparatus of the third type is used, thereby affording the advantages noted earlier. Additionally, since a first bead starting material that cannot pass through the teeth is packed first, followed by a second bead starting material that can pass through the teeth, while the filling process is more time consuming, improved bond strength between the first beads and the second beads is afforded, since a portion of the second beads pass through the teeth and migrate to adjacent partitioned mold chambers.

Where adjacent partitioned mold chambers partitioned by means of partitioning members are filled with bead starting materials of different degrees of expansion, it becomes possible, for example, to use bead starting materials with a low degree of expansion in regions requiring strength so as to increase the strength/rigidity of the molded article, while using bead starting materials with a high degree of expansion in other regions in order to reduce the weight of the molded article, so as to impart both improved strength and reduced weight to the molded article.

In-mold Foam Molded Articles

The first in-mold foam molded article of the invention has molded sections molded from bead starting materials of different properties, thereby allowing qualities required of the molded article, such as mechanical strength, to be set precisely for each portion of the molded article, affording molded articles of good functionality and quality. In this molded article, since the visible surfaces of the molded article are devoid of projecting flash at the boundaries of molded sections consisting of bead starting materials of different properties, it is possible, without a subsequent flash removal process, to tightly attach the molded article to the mounting face of a mounting object at the proper location with substantially no gap therebetween, or to tightly sheath the molded article with a cover member tightly attached thereto with substantially no gap therebetween.

The second in-mold foam molded article of the invention has formed therein a plurality of through-holes or wells extending in the direction of mold parting at predetermined intervals along the boundaries of a plurality of molded sections molded from bead starting materials of different properties, but employs the in-mold foam molding apparatus of the third type, whereby the design of the molding apparatus may be simplified, and the need to provide the mold with passage orifices for extension/retraction of partitioning members is obviated, so that formation of flash projecting from visible surfaces of the molded article by the passage orifices is avoided.

Since recesses are formed along the boundaries at those boundaries that are devoid of through-holes so that flash forms at the bottom of these recesses and does not project out from visible surfaces of the molded article, it is possible, without a subsequent flash removal process, to tightly attach the molded article to the mounting face of a mounting object at the proper location with substantially no gap therebetween, or to tightly sheath the molded article with a cover member tightly attached thereto with substantially no gap therebetween.

Where a car bumper core is constructed of this in-mold foam molded article, portions of the core susceptible to localized impact stress acting on the core during automobile frontal collisions of various kinds may be composed of low-expansion portions comprising a bead starting material having a low degree of expansion, while other portions are composed of high-expansion portions comprising a bead starting material having a high degree of expansion, thereby minimizing core weight while providing effective absorption of energy of impact during frontal collisions of various kinds.

What is claimed is:

1. An in-mold foam molding apparatus comprising:

partitioning members for partitioning into a plurality of partitioned mold chambers a mold cavity defined by a core mold and a cavity mold, said partitioning members being arranged such that at least a portion of the plurality of partitioned molding sections constituting the partitioned mold chambers within the mold are unitary;

filling units provided to each partitioned mold chamber for filling the same with a bead starting material, adjacent partitioned mold chambers being fillable with bead starting materials of different properties;

wherein the mold cavity is partitionable into a plurality of partitioned mold chambers by means of moveable partitioning members extendable and retractable with respect to the mold cavity through the core mold or cavity mold, and fixed partitioning members provided integrally to the core mold or cavity mold, the partitioned molding sections constituting the partitioned mold chambers of the mold into which the moveable partitioning members extend and retract being unitary at locations corresponding to fixed partitioning members, and said fixed partitioning members are of pillar form.

2. An in-mold foam molding apparatus comprising:

partitioning members for partitioning into a plurality of partitioned mold chambers a mold cavity defined by a core mold and a cavity mold, said partitioning members being arranged such that at least a portion of the plurality of partitioned molding sections constituting the partitioned mold chambers within the mold are unitary;

filling units provided to each partitioned mold chamber for filling the same with a bead starting material, adjacent partitioned mold chambers being fillable with bead starting materials of different properties, wherein the mold cavity is partitionable into a plurality of partitioned mold chambers by means of moveable partitioning members extendable and retractable with respect to the mold cavity through the core mold or cavity mold, and fixed partitioning members provided integrally to the core mold or cavity mold, the partitioned molding sections constituting the partitioned mold chambers of the mold into which the moveable partitioning members extend and retract being unitary at locations corresponding to fixed partitioning members, and wherein said fixed partitioning members are of comb configuration having a plurality of teeth extending in cantilever fashion in the mold parting direction, arranged at intervals small enough to prevent passage of at least one of the bead starting materials filled into adjacent partitioned mold chamber.

3. An in-mold foam molding apparatus comprising:

movable partitioning members for partitioning into a plurality of partitioned mold chambers a mold cavity defined by a core mold and a cavity mold, said partitioning members being arranged such that at least a portion of the plurality of partitioned molding sections constituting the partitioned mold chambers within the mold are unitary, filling units provided to each partitioned mold chamber for filling the same with a bead starting material, adjacent partitioned mold chambers being fillable with bead starting materials of different properties;

wherein said movable partitioning members for partitioning the mold cavity into a plurality of partitioned mold chambers are extendable and retractable with respect to the mold cavity, the plurality of movable partitioning members constituting said partitioned mold chambers being divided into two sets, first moveable partitioning members arranged on the core mold and second moveable partitioning members arranged on the cavity mold, the plurality of core mold partitioned molding sections constituting the partitioned mold chambers being unitary at locations corresponding to the second moveable partitioning members provided to the cavity mold, and the plurality of cavity mold partitioned molding sections constituting the partitioned mold chambers being unitary at locations corresponding to the first moveable partitioning members provided to the core mold.

4. An in-mold foam molding apparatus comprising:

partitioning members for partitioning into a plurality of partitioned mold chambers a mold cavity defined by a core mold and a cavity mold, said partitioning members being arranged such that at least a portion of the plurality of partitioned molding sections constituting the partitioned mold chambers within the mold are unitary;

filling units provided to each partitioned mold chamber for filling the same with a bead starting material, adjacent partitioned mold chambers being fillable with bead starting materials of different properties, wherein the mold cavity is partitionable into a plurality of partitioned mold chambers by means of moveable partitioning members extendable and retractable with respect to the mold cavity through the core mold or cavity mold, and fixed partitioning members provided integrally to the core mold or cavity mold, the partitioned molding sections constituting the partitioned mold chambers of the mold into which the moveable partitioning members extend and retract being unitary at locations corresponding to fixed partitioning members, wherein a core mold or cavity mold provided with said moveable partitioning members has formed therein passage orifices for passage of the moveable partitioning members, and projecting portions that project into the mold cavity are formed along the passage orifices, with apertures of passage orifices on the mold cavity side being situated medially in the cross direction of projecting portions.

5. An in-mold foam molding apparatus wherein:

moveable partitioning members for partitioning a mold cavity into a plurality of partitioned mold chambers are provided so as to be extendable and retractable with respect to the mold cavity via passage orifices provided to at least one mold selected from a core mold and a cavity mold;

projecting portions are formed along the passage orifices in the mold having said passage orifices such that the projecting portions project into the mold cavity; and apertures of said passage orifices on the mold cavity side are situated medially in the cross direction of projecting portions.

6. The in-mold foam molding apparatus according to claim 4 or 5, wherein aperture width of said passage orifices is smaller than the diameter of the bead starting materials.

7. The in-mold foam molding apparatus according to claim 4 or 5, wherein the height of said projecting portions is greater than the height of flash formed by the passage orifices.

8. The in-mold foam molding apparatus according to any of claims 1, 2 or 3, wherein the length of said moveable partitioning members is defined such that, with the moveable partitioning members retracted, the front edges of the moveable partitioning members are coplanar with, or project beyond, the inside face of the mold cavity of the mold provided with moveable partitioning members.

9. The in-mold foam molding apparatus according to any of claims 1, 2, 3 or 5, wherein tabular members are used as said moveable partitioning members.

10. The in-mold foam molding apparatus according to claim 9, wherein tabular members having formed therein through-holes or slits of size preventing passage of bead starting materials are used as said moveable partitioning members.

11. An in-mold foam molding apparatus comprising:
partitioning members for partitioning into a plurality of partitioned mold chambers a mold cavity defined by a core mold and a cavity mold, said partitioning members being arranged such that at least a portion of the plurality of partitioned molding sections constituting the partitioned mold chambers within the mold are unitary;
filling units provided to each partitioned mold chamber for filling the same with a bead starting material, adjacent partitioned mold chambers being fillable with bead starting materials of different properties;
wherein said fixed partitioning members for partitioning the mold cavity into a plurality of partitioned mold chambers are fixed to at least one mold selected from the core mold and the cavity mold; and fixed partitioning members of comb configuration having a plurality of teeth extending in cantilever fashion in the mold parting direction, arranged at intervals small enough to prevent passage of at least one of the bead starting materials filled into adjacent partitioned mold chambers, are used as the fixed partitioning members.

12. The in-mold foam molding apparatus according to claim 2 or 11, wherein rod-like elements of 1 to 10 mm in diameter are used as said teeth.

13. The in-mold foam molding apparatus according to claim 2 or 11, wherein gaps between adjacent teeth are set to 30–90% of the diameter of the bead starting material whose passage is to be prevented.

14. The in-mold foam molding apparatus according to claim 2 or 11, wherein said teeth are composed of an elastically deformable material.

15. The in-mold foam molding apparatus according to claim 2 or 11, wherein said teeth are arranged in a rectangular wave, triangular wave, or sine wave configuration.

16. The in-mold foam molding apparatus according to claim 2 or 11, wherein said fixed partitioning members are fixed to a mold having an ejector pin.

17. The in-mold foam molding apparatus according to claim 2 or 11, wherein said fixed partitioning members are composed of first fixed partitioning members fixed to a mold having an ejector pin and second fixed partitioning members fixed to a mold devoid of an ejector pin.

18. The in-mold foam molding apparatus according to claim 17, wherein the teeth of said first fixed partitioning members and the teeth of said second fixed partitioning members are arranged in alternating fashion.

19. The in-mold foam molding apparatus according to claim 17, wherein the number of teeth of said first fixed partitioning members is greater than the number of teeth of said second fixed partitioning members.

20. The in-mold foam molding apparatus according to claim 17, wherein gaps between teeth of first fixed partitioning members and second fixed partitioning members are small enough to prevent passage of at least one of the bead starting materials.

21. The in-mold foam molding apparatus according to claim 17, wherein release resistance increasing portions for increasing release resistance of a molding from the teeth are formed in distal portions or medial portions of teeth of fixed partitioning members fixed to a mold having an ejector pin.

* * * * *